(12) United States Patent
Sasaki et al.

(10) Patent No.: US 6,195,470 B1
(45) Date of Patent: Feb. 27, 2001

(54) SPECIAL EFFECT SYSTEM, IMAGE PROCESSING METHOD, AND SYMMETRICAL IMAGE GENERATING METHOD

(75) Inventors: Yutaka Sasaki; Nobuyuki Minami; Ryosuke Hayashi, all of Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/051,048

(22) PCT Filed: Sep. 11, 1997

(86) PCT No.: PCT/JP97/03205

§ 371 Date: Aug. 10, 1998

§ 102(e) Date: Aug. 10, 1998

(87) PCT Pub. No.: WO98/11720

PCT Pub. Date: Mar. 19, 1998

(30) Foreign Application Priority Data

Sep. 11, 1996 (JP) .................................. 8-240849

(51) Int. Cl.$^7$ ...................................... G06K 9/36
(52) U.S. Cl. .................... 382/277; 382/154; 345/433; 348/578
(58) Field of Search .................... 345/437–440, 345/419, 433, 302, 328, 427, 430, 425; 348/239, 578–588, 594; 382/276–277, 295–297, 285, 154

(56) References Cited

U.S. PATENT DOCUMENTS

| | | | |
|---|---|---|---|
| 4,086,619 | * | 4/1978 | Miyake et al. .................. 348/594 |
| 4,220,965 | * | 9/1980 | Heitmann et al. ................ 348/581 |
| 4,700,228 | * | 10/1987 | Heerah ........................... 348/580 |
| 4,797,842 | * | 1/1989 | Nackman et al. .................. 716/20 |
| 4,860,217 | * | 8/1989 | Sasaki et al. .................... 345/425 |
| 5,664,081 | * | 9/1997 | Saito ............................. 345/433 |
| 5,682,326 | * | 10/1997 | Klingler et al. .................. 345/302 |
| 5,877,774 | * | 3/1999 | Saito ............................. 345/440 |
| 6,018,352 | * | 1/2000 | Saito ............................. 345/438 |
| 6,021,229 | * | 2/2000 | Takashima et al. ................ 382/285 |

FOREIGN PATENT DOCUMENTS

| | | | |
|---|---|---|---|
| 60-102068 | 6/1985 | (JP) | ............................. H04N/5/265 |
| 2-132980 | 5/1990 | (JP) | ............................. H04N/5/265 |
| 4-40176 | 2/1992 | (JP) | ............................. H04N/5/262 |
| 6-203135 | 7/1994 | (JP) | ............................. G06F/15/62 |
| 7-113766 | 5/1995 | (JP) | ............................. G01N/21/89 |
| 7-123335 | 5/1995 | (JP) | ............................. H04N/5/45 |
| 7-312721 | 11/1995 | (JP) | ............................. H04N/5/262 |

* cited by examiner

*Primary Examiner*—Leo H. Boudreau
*Assistant Examiner*—Ishrat Sherali
(74) *Attorney, Agent, or Firm*—Frommer Lawrence & Haug, LLP.; William S. Frommer; Glenn F. Savit

(57) ABSTRACT

Specified image transformation is applied to a first source video signal to generate a main image and symmetric image transformation is applied to a second source video signal same as or different from the first source video signal in accordance with the image transformation applied to the main image and the point, line, or plane specified as a symmetry yardstick to generate a symmetric image point-symmetric, line-symmetric, or plane-symmetric to the main image. Thereby, it is possible to easily obtain a symmetric image symmetric to a main image to which image transformation is applied only by specifying a point, line, or plane serving as a symmetry yardstick.

13 Claims, 24 Drawing Sheets

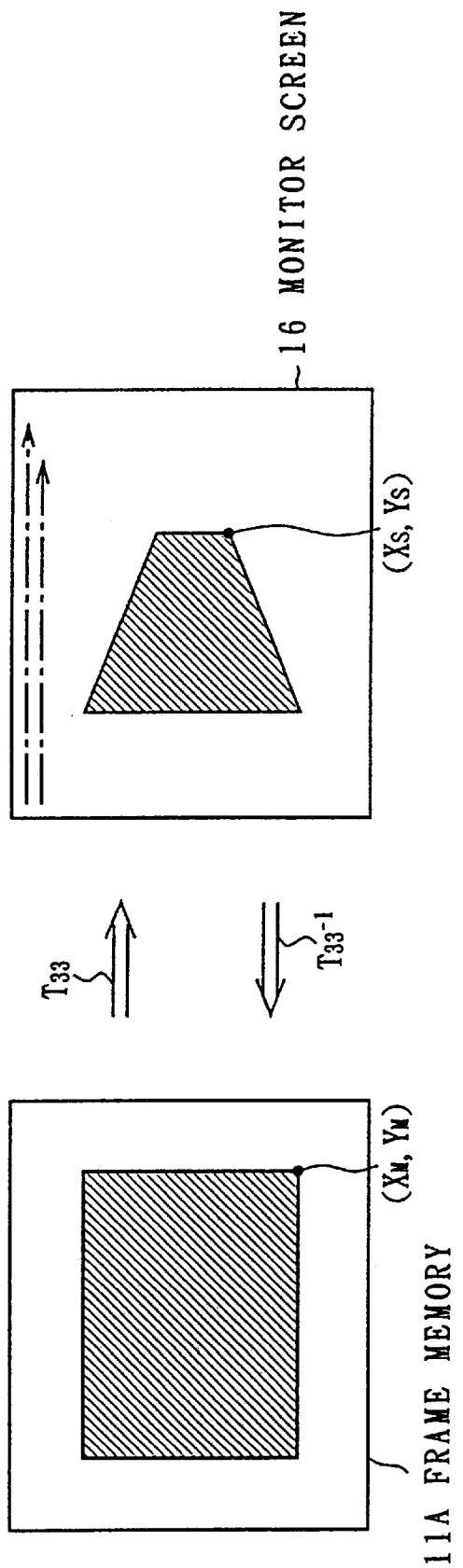

| KEY FRAME NO. | KEY FRAME DATA | | | | SYMMETRIC MODE | | | | | |
|---|---|---|---|---|---|---|---|---|---|---|
| | SIZE DATA Size(S) | POSITION DATA Loc (x,y,z) | ROTATION DATA Rot (x,y,z) | | ORIGIN SYMMETRY | x-AXIS SYMMETRY | y-AXIS SYMMETRY | z-AXIS SYMMETRY | xy-PLANE SYMMETRY | yz-PLANE SYMMETRY | xz-PLANE SYMMETRY |
| KF1 | Size (0.3) | Loc (-1,1,0) | Rot (0,0,0) | | OFF | OFF | OFF | OFF | OFF | OFF | OFF |

FIG. 36

| KEY FRAME NO. | KEY FRAME DATA | | | SYMMETRIC MODE | | | | | | |
|---|---|---|---|---|---|---|---|---|---|---|
| | SIZE DATA Size(S) | POSITION DATA Loc (x,y,z) | ROTATION DATA Rot (x,y,z) | ORIGIN SYMMETRY | x-AXIS SYMMETRY | y-AXIS SYMMETRY | z-AXIS SYMMETRY | xy-PLANE SYMMETRY | yz-PLANE SYMMETRY | xz-PLANE SYMMETRY |
| KF1 | Size (0.3) | Loc (-1,1,0) | Rot (0,0,0) | OFF | OFF | OFF | OFF | OFF | OFF | OFF |
| KF2 | Size (0.3) | Loc (-0.5,0,0) | Rot (0,0,0) | OFF | OFF | OFF | OFF | OFF | OFF | OFF |
| KF3 | Size (0.3) | Loc (0,0,0) | Rot (0,0,0) | OFF | OFF | OFF | OFF | OFF | OFF | OFF |

FIG. 37

| KEY FRAME NO. | KEY FRAME DATA ||| SYMMETRIC MODE |||||||
|---|---|---|---|---|---|---|---|---|---|---|
| | SIZE DATA Size(S) | POSITION DATA Loc (x,y,z) | ROTATION DATA Rot (x,y,z) | ORIGIN SYMMETRY | x-AXIS SYMMETRY | y-AXIS SYMMETRY | z-AXIS SYMMETRY | xy-PLANE SYMMETRY | yz-PLANE SYMMETRY | xz-PLANE SYMMETRY |
| KF1' | Size (0.3) | Loc (-1,1,0) | Rot (0,0,0) | OFF | OFF | ON | OFF | OFF | OFF | OFF |
| KF2' | Size (0.3) | Loc (-0.5,0,0) | Rot (0,0,0) | OFF | OFF | ON | OFF | OFF | OFF | OFF |
| KF3' | Size (0.3) | Loc (0,0,0) | Rot (0,0,0) | OFF | OFF | ON | OFF | OFF | OFF | OFF |

FIG. 39

SPECIAL EFFECT SYSTEM, IMAGE PROCESSING METHOD, AND SYMMETRICAL IMAGE GENERATING METHOD

TECHNICAL FIELD

The present invention relates to a special effect system, particularly to a special effect system capable of easily generating a symmetric image point-symmetric, line-symmetric, or plane-symmetric to a main image to which a special effect is applied.

BACKGROUND ART

Conventionally, in the field of image processing, a special effect such as three-dimensional transformation, rotation, or movement is frequently applied to a source image. Moreover recently, a symmetric image point-symmetric, line-symmetric, or plane-symmetric to a main image generated by applying a special effect to a source image is obtained and it is displayed together with the main image. For example, as shown in FIG. 1, by displaying a main image 1 generated by applying three-dimensional rotational processing to the main image 1 and a symmetric image 1A line-symmetric to the main image 1, it is possible to provide an image 2 in which two persons seemingly talk to each other for audiences.

To generate the above image 2, a conventional special-effect system first obtains the main image 1 by three-dimensionally rotating a first source image by a predetermined angle and displays the image 1 at a predetermined position in the screen shown in FIG. 1. Moreover, the special effect system displays the symmetric image 1A by rotating a second source image by an angle equal to the case of the first source image in the direction opposite to the case of the first source image and thereafter, displaying the second source image at a line-symmetric position designated by an operator. Thereby, the conventional special-effect system obtains the image 2 in which the main image 1 and the symmetric image 1A are displayed at the same time.

In this case, to designate a symmetric position, the operator calculates the symmetric position of the main image 1 and inputs the position to the special effect system through an input unit such as a ten-key pad or slowly inputs positional information through an input unit such as a track ball, joy stick, or mouse to designate a symmetric position by eye measure. Therefore, the conventional special-effect system is problematic in that it takes a lot of time to designate the symmetric position thus burdening the operator. Moreover, to designate the symmetric position by an input unit such as a track ball, joy stick, or mouse, the operator designates the symmetric position by eye measure while viewing the screen in which the symmetric image 1A is displayed. Therefore, there are problems that the symmetric position cannot be accurately designated and therefore, the symmetric image 1A cannot be accurately obtained.

Furthermore, as depicted in FIG. 2, to display the main image 1 and the symmetric image 1A line-symmetric to the main image 1 and obtain an image 3 in which the symmetric image 1A is moved in accordance with the movement of the main image 1 (note the symmetrical movement of image 1A as the main image 1 moves in FIG. 2), there are problems that the symmetric position of the main image 1 must be designated each time and thereby, a lot of time is required.

DISCLOSURE OF THE INVENTION

The present invention is made to solve the above problems and i its object is to provide a special effect system capable of easily obtaining a symmetric image by designating a point, line, or plane serving as a symmetry yardstick without designating a symmetric position by an operator.

To solve the above problems, the present invention uses a special effect system for applying image transformation to an input source video signal, which comprises first image processing means for applying specified image transformation to an input first source video signal to generate the video signal of a main image and second image processing means for generating the video signal of a symmetric image point-symmetric, line-symmetric, or plane-symmetric to the main image by receiving a second source video signal same as or different from the first source video signal and applying symmetric image transformation to the second source video signal in accordance with the image transformation applied to the main image and a point, line, or plane specified as a symmetry yardstick. Thereby, only by specifying a point, line, or plane serving as a symmetry yardstick, it is possible to easily obtain a symmetric image symmetric to a main image to which image transformation is applied.

Moreover, the present invention uses a special effect system for applying image transformation to an input source video signal, which comprises control means for computing a first matrix parameter for image transformation in accordance with a specified special-effect parameter and computing a second matrix parameter for obtaining a point-symmetric line-symmetric or plane-symmetric image in accordance with the special effect parameter and a point, line, or plane serving as a specified symmetry yardstick, a first read address generation means for generating a first read address for image transformation in accordance with the first matrix parameter received, second read address generation means for generating a second read address for obtaining a point-symmetric, line-symmetric, or plane-symmetric image in accordance with the second matrix parameter received, first memory means for generating the video signal of a main image by successively storing the input first source video signal in an internal storage area and reading the first source video signal from the storage area specified by the first read address in order and thereby, applying image transformation specified by the special effect parameter to the first source video signal, and second memory means for generating the video signal of a symmetric image point-symmetric, line-symmetric, or plane-symmetric to the main image by receiving a second source video signal same as or different from the first source video signal and successively storing the second source video signal in an internal storage area and reading the second source video signal from the storage are a specified by the second read address.

Thus, it is possible to easily obtain a symmetric image symmetric to a main image to which image transformation is applied only by specifying a point, line, or plane serving as a symmetry yardstick by computing a second matrix parameter in accordance with a special effect parameter to be applied to a main image and a point, line, or plane specified as a symmetry yardstick, making the matrix parameter work on a second read address, and reading a second source video signal from a memory in accordance with the second read address.

BRIEF DESCRIPTION OF DRAWINGS

FIGS. 7A and 7B are schematic diagrams showing the relation between address on a frame memory and address on a monitor screen;

FIG. 36 is a schematic diagram for explaining an effect file;

FIG. 37 is a schematic diagram for explaining a case in which a plurality of key frames are entered in an effect file;

FIG. 39 is a schematic diagram for explaining an effect file related to a symmetric image.

BEST MODE FOR CARRYING OUT THE INVENTION (1) Entire structure of special effect system First, a special effect system of the present invention is described below by referring to FIG. 3.

Figure 1:
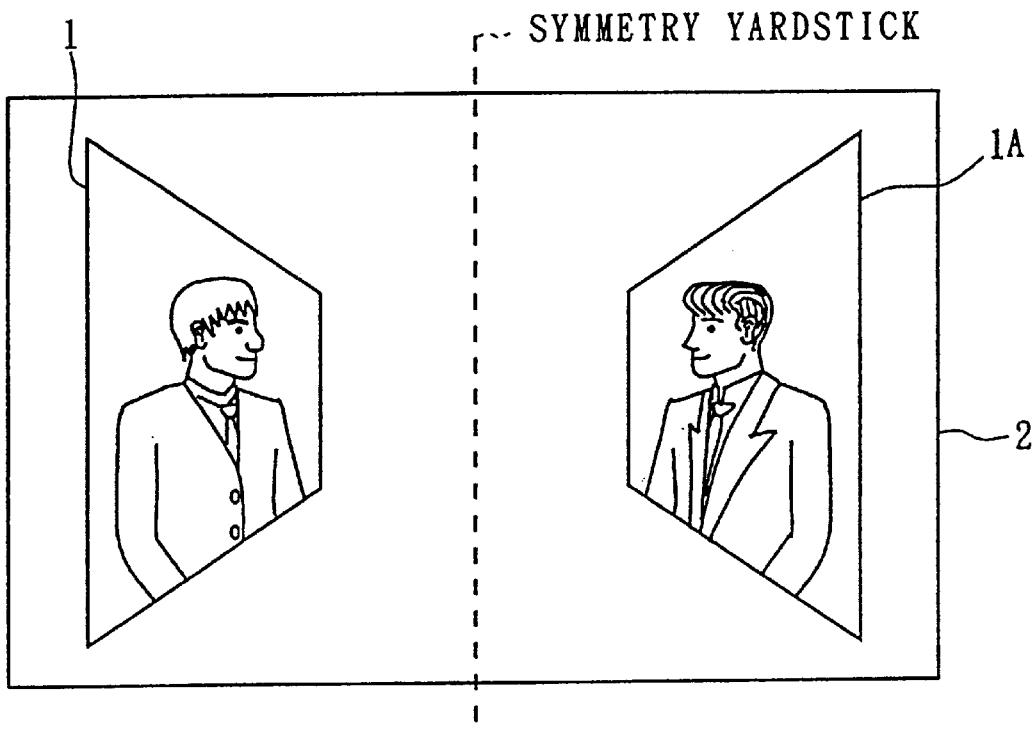
FIG. 1 is a schematic screen diagram for explaining the background art.
Figure 2:
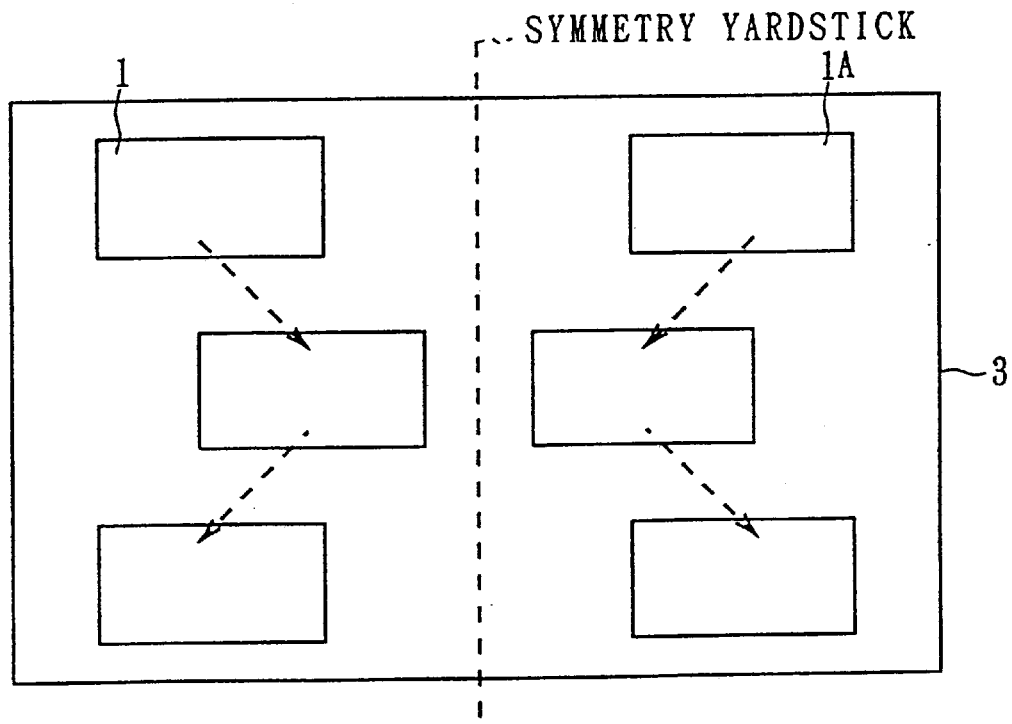
FIG. 2 is a schematic screen diagram for explaining the background art.
Figure 3:
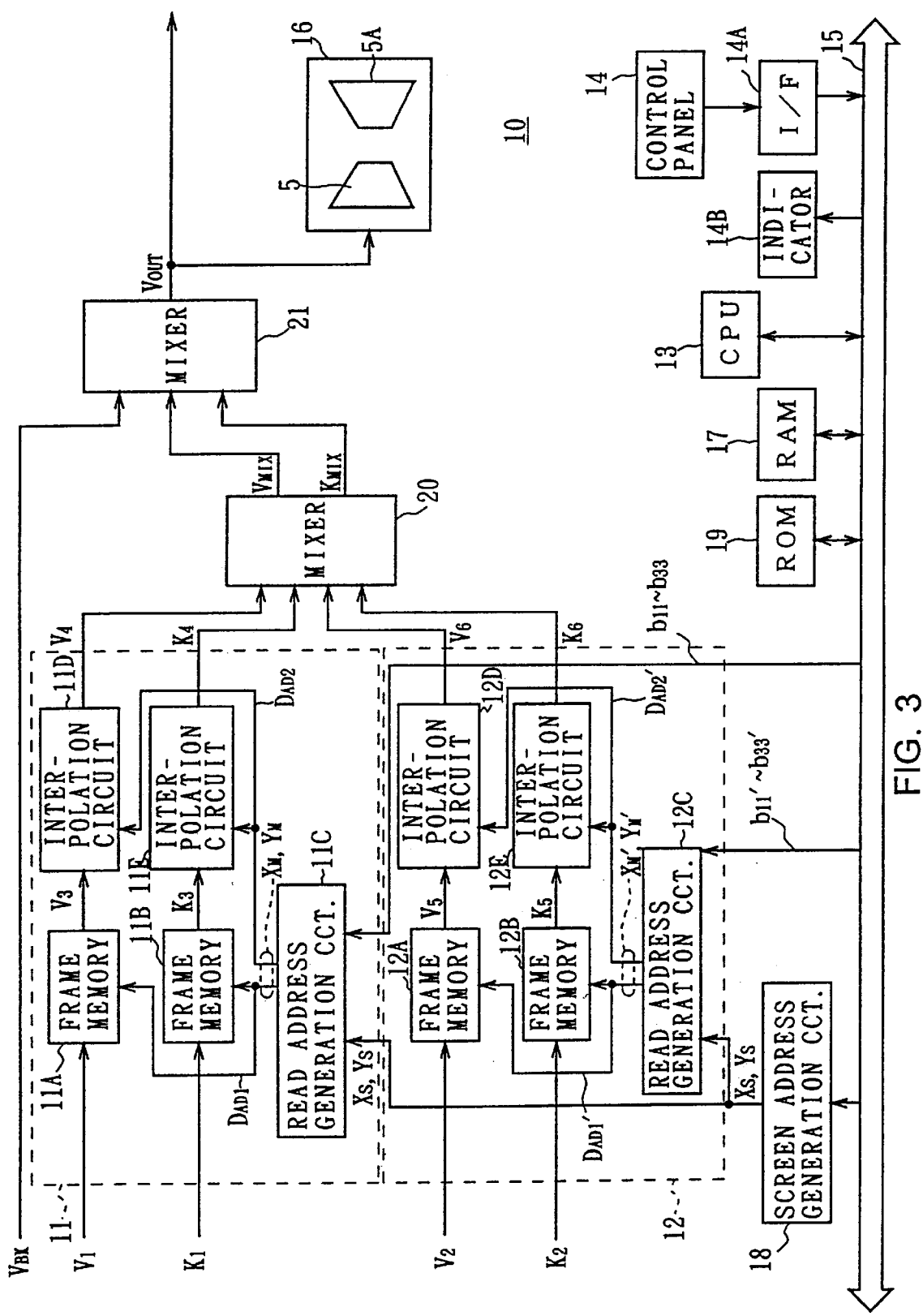
FIG. 3 is a block diagram showing a special effect system of the present invention.

In FIG. 3, symbol 10 denotes a special effect system of the present invention as a whole, which has a first image processing section 11 for generating a main image 5 to which a special effect such as three-dimensional transformation, rotation, or movement is applied and a second image processing section 12 for generating a symmetric image 5A point-symmetric, line-symmetric, or plane-symmetric to the main image 5. The special effect system 10 is provided with a CPU (Central Processing Unit) 13 so as to generate a video signal $V_{out}$ comprising the main image 5 and symmetric image 5A by controlling first and second image processing sections 11 and 12 and other circuit blocks by the CPU 13.

The CPU 13 first receives the input information input by operating the operation unit of a control panel 14 by an operator through an interface circuit (I/F) 14A and a data bus 15 to control each circuit block in accordance with the input information. In this case, parameters related to a special effect to be applied to the main image 5 and data for specifying the symmetry yardstick of the symmetric image 5A are input as the input information. Moreover, the CPU 13 enters these input data values in an effect file (to be described later in detail) and stores the effect file in a RAM (Random Access Memory) 17. In this connection, the CPU 13 displays the input information on an indicator 14B and thereby, the operator can confirm the input contents by viewing the screen of the indicator 14B.

The CPU 13 computes matrix parameters $b_{11}$ to $b_{33}$ of a transformation matrix required to generate the main image 5 in the first image processing section 11 in accordance with the parameters related to a special effect in the effect file and supplies the parameters to the first image processing section 11. Moreover, the CPU 13 computes matrix parameters $b_{11}'$ to $b_{33}'$ of a transformation matrix required to generate the symmetric image 5A in the second image processing section 12 in accordance with the data for specifying the parameters and symmetry yardstick related to a special effect in the effect file and supplies the parameters to the second image processing section 12. Moreover, the CPU 13 uses the RAM 17 as a working memory to store the various data values generated to compute the matrix parameters $b_{11}$ to $b_{33}$ and $b_{11}'$ to $b_{33}'$ and the computed matrix parameters $b_{11}$ to $b_{33}$ and $b_{11}'$ to $b_{33}'$ in the RAM 17.

Furthermore, the CPU 13 controls a screen address generation circuit 18 in accordance with the data related to the display position of the main image 5 among the parameters related to a special effect in the effect file and thereby, makes the circuit 18 generate a screen address ($X_S$, $Y_S$) corresponding to the display position of the main image 5. In this connection, the screen address generation circuit 18 includes a signal generation circuit for generating horizontal and vertical synchronizing signals, generates the screen address ($X_S$, $Y_S$) corresponding to the display position of the main image 5 by addressing the entire screen of a monitor screen 16 in order of luster scan in accordance with the horizontal and vertical synchronizing signals generated by the signal generation circuit and outputs the screen address to the first and second image processing sections 11 and 12.

Furthermore, the CPU 13 is operated in accordance with an operation program stored in ROM (Read Only Memory) 19 and thereby, controls the above-described circuit blocks and computes the matrix parameters $b_{11}$ to $b_{33}$ and $b_{11}'$ to $b_{33}'$.

A first source video signal $V_1$ and a first key signal $K_1$ for keying the first source video signal $V_1$ are input to the first image processing section 11. The first image processing section 11 is provided with two frame memories 11A and 11B so as to input the input first source video signal $V_1$ to the frame memory 11A and the first key signal $K_1$ to the frame memory 11B. The frame memory 11A receives a sequential write address from a not-illustrated write address generation circuit and sequentially stores the input first source video signal $V_1$ in its internal storage area in accordance with the write address. Similarly, the frame memory 11B receives a sequential write address from a not-illustrated write address generation circuit and sequentially stores the input first key signal $K_1$ in its internal storage area in accordance with the write address.

In this connection, at this stage, the first source video signal $V_1$ and the first key signal $K_1$ are only stored but image transformation processing is not applied to the first source video signal $V_1$ or the first key signal $K_1$.

A read address generation circuit 11C generates a read address ($X_M$, $Y_M$) for generating the main image 5 by performing the image transformation processing designated by an operator in accordance with the screen address ($X_S$, $Y_S$) supplied from the screen address generation circuit 18 and the matrix parameters $b_{11}$ to $b_{33}$ of the transformation matrix supplied from the CPU 13, supplies the address data $D_{AD1}$ of the integer part of the read address ($X_M$, $Y_M$) to the frame memories 11A and 11B, and supplies the address data $D_{AD2}$ of the fraction part of the read address to interpolation circuits 11D and 11E.

The frame memory 11A reads a video signal from the storage area specified by the address data $D_{AD1}$ and outputs the read video signal $V_3$ to the interpolation circuit 11D. The interpolation circuit 11D calculates an interpolation coefficient in accordance with the address data $D_{AD2}$ and applies pixel interpolation processing to the read video signal $V_3$ in accordance with the interpolation coefficient.

The following is the reason for performing the interpolation processing by the interpolation circuit 11D. The read address ($X_M$, $Y_M$) generated by the read address generation circuit 11C is not always an integer but it may include a decimal. If the read address ($X_M$, $Y_M$) includes a decimal, it is impossible to perform the read operation because no decimal address is present in the frame memory 11A. Therefore, the read address ($X_M$, $Y_M$) is divided into an integer part and a decimal part to obtain a video signal corresponding to the read address ($X_M$, $Y_M$) including a decimal by applying interpolation processing to the video signal $V_3$ read in accordance with the integer part. Thereby, even when the read address ($X_M$, $Y_M$) includes a decimal, it is possible to obtain a video signal corresponding to the address ($X_M$, $Y_M$).

Thus, a video signal $V_4$ to which the image transformation processing designated by an operator is applied is generated (that is, the video signal $V_4$ of the main image 5 is generated) by reading the video signal $V_3$ from the frame memory 11A in accordance with the integer part of the read address ($X_M$, $Y_M$) generated by the read address generation circuit 11C and applying the interpolation processing to the video signal $V_3$ read in accordance with the decimal part of the read address ($X_M$, $Y_M$).

Similarly, the frame memory 11B reads a key signal from the storage area specified by the address data $D_{AD1}$ and outputs the read key signal $K_3$ to the interpolation circuit 11E. The interpolation circuit 11E calculates an interpolation coefficient in accordance with the address data $D_{AD2}$ and applies the pixel interpolation processing to the read key signal $K_3$ in accordance with the interpolation coefficient. In this connection, the reason of performing the interpolation processing by the interpolation circuit 11E is the same as the above reason.

Thus, a key signal $K_4$ to which the image transformation processing same as the case of the video signal $V_4$ is applied is generated by reading the key signal $K_3$ from the frame memory 11B in accordance with the integer part of the read address ($X_M$, $Y_M$) generated by the read address generation circuit 11C and applying the interpolation processing to the read key signal $K_3$ in accordance with the decimal part of the read address ($X_M$, $Y_M$).

A second source video signal $V_2$ same as or different from the first source video signal $V_1$ and a second key signal $K_2$ for keying the second source video signal $V_2$ are input to the second image processing section 12. The second image processing section 12 is provided with two frame memories 12A and 12B so as to input the input second source video signal $V_2$ to the frame memory 12A and the second key signal $K_2$ to the frame memory 12B. The frame memory 12A sequentially stores the input second source video signal $V_2$ in its internal storage area in accordance with a sequential write address supplied from a not-illustrated write address generation circuit. Similarly, the frame memory 12B receives a sequential write address from a not-illustrated write address generation circuit and sequentially stores the input second key signal $K_2$ in its internal storage area in accordance with the write address.

In this connection, the second image processing section 12 only stores the second source video signal $V_2$ and second key signal $K_2$ at this stage but the image transformation processing is not applied yet to the second source video signal $V_2$ or second key signal $K_2$.

The read address generation circuit 12C generates a read address ($X_M'$, $Y_M'$) for generating the symmetric image 5A for the main image 5 generated by the first image processing section 11 in accordance with the screen address ($X_S$, $Y_S$) supplied from the screen address generation circuit 18 and the matrix parameters $b_{11}'$ to $b_{33}'$ of the transformation matrix supplied from the CPU 13, supplies the address data $D_{AD1}'$ of the integer part of the read address ($X_M'$, $Y_M'$) to the frame memories 12A and 12B, and supplies the address data $D_{AD2}'$ of the decimal part of the address ($X_M'$, $Y_M'$) to the interpolation circuits 12D and 12E.

The frame memory 12A reads a video signal from the storage area specified by the address data $D_{AD1}'$ and outputs the read video signal $V_5$ to the interpolation circuit 12D. The interpolation circuit 12D calculates an interpolation coefficient in accordance with the address data $D_{AD2}'$ and applies the pixel interpolation processing to the read video signal $V_5$ in accordance with the interpolation coefficient. In this connection, the reason of performing interpolation processing by the interpolation circuit 12D is the same as the case of the first image processing section 11.

Thus, a video signal $V_6$ of the symmetric image 5A for the main image 5 to which image transformation is applied is generated by reading the video signal $V_5$ from the frame memory 12A in accordance with the integer part of the read address $(X_M', Y_M')$ generated by the read address generation circuit 12C and applying the interpolation processing to the read video signal $V_5$ from the frame memory 12A in accordance with the decimal part of the read address $(X_M', Y_M')$.

Similarly, the frame memory 12B reads a key signal from the recording area specified by the address data $D_{AD1}'$ and outputs the read key signal $K_5$ to the interpolation circuit 12E. The interpolation circuit 12E calculates an interpolation coefficient in accordance with the address data $D_{AD2}'$ and applies the pixel interpolation processing to the read key signal $K_5$ in accordance with the interpolation coefficient. In this connection, the reason of performing the interpolation processing by the interpolation circuit 12E is the same as the case of the first image processing section 11.

Thus, a key signal $K_6$ to which the image transformation same as the case of the video signal $V_6$ is applied is generated by reading the key signal $K_5$ from the frame memory 12B in accordance with the integer part of the read address $(X_M', Y_M')$ generated by the read address generation circuit 12C and applying the interpolation processing to the read key signal $K_5$ in accordance with the decimal part of the read address $(X_M', Y_M')$.

Thus, the video signals $V_4$ and $V_6$ and key signals $K_4$ and $K_6$ image-transformed by the first and second image processing sections 11 and 12 are output to a first mixer 20.

The first mixer 20 is a circuit for mixing the video signal $V_4$ of the main image 5 with the video signal $V_6$ of the symmetric image 5A and moreover mixing the key signal $K_4$ of the main image 5 with the key signal $K_6$ of the symmetric image 5A. Specifically, the first mixer 20 mixes the video signal $V_4$ with the video signal $V_6$ and mixes the key signal $K_4$ with the key signal $K_6$ by performing the processing shown by the following expression (1) and outputs a resultingly-obtained mixed video signal $V_{MIX}$ and mixed key signal $K_{MIX}$ to a second mixer 21.

$$V_{MIX} = K_4 V_4 + K_6 V_6$$
$$K_{MIX} = K_4 + K_6 \qquad (1)$$

The second mixer 21 is a circuit for mixing the mixed video signal $V_{MIX}$ with a background video signal $V_{BK}$ supplied from an external unit in accordance with the mixed key signal $K_{MIX}$. Specifically, the second mixer 21 mixes the mixed video signal $V_{MIX}$ with the background video signal $V_{BK}$ by performing the processing shown by the following expression (2).

$$V_{OUT} = K_{MIX} V_{MIX} + (1 - K_{MIX}) V_{BK} \qquad (2)$$

Thereby, a video signal $V_{OUT}$ comprising the main image 5 and the symmetric image 5A is generated. The video signal $V_{OUT}$ thus generated is output to an external unit and also displayed on the monitor screen 16.

Figure 4:
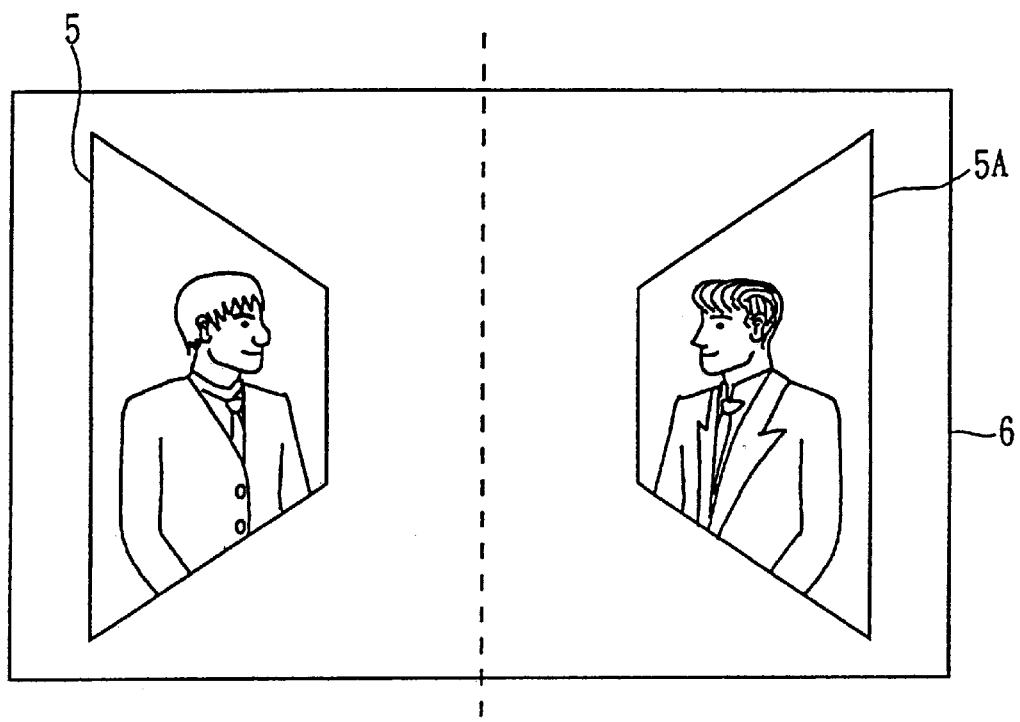
FIG. 4 is a schematic screen diagram for explaining a symmetric image obtained by a special effect system of the present invention.

Thus, in the case of the special effect system 10, an image 6 in which two persons seemingly talk each other shown in FIG. 4 is obtained by inputting the video signal of a predetermined person as the first source video signal $V_1$, the video signal of a person different from the former person as the second source video signal $V_2$, and a parameter of a special effect for rotating the first source video signal $V_1$ by a predetermined angle, and data for specifying line symmetry through the control panel 14. In this case, an operator can easily obtain the symmetric image 5A only by inputting the special effect parameter and the data showing a symmetry yardstick through the control panel 14. It is possible to greatly reduce the labor of the operator compared to the conventional case of calculating and inputting a symmetric position or gradually inputting positional information through an input unit such as a track ball, joy stick, or mouse to designate a symmetric position by eye measure. Moreover, it is possible to obtain the accurate symmetric image 5A because a parameter can be accurately input compared to the conventional case of inputting positional information through an input unit such as a track ball, joy stick, or mouse by eye measure.

(2) Method for generating basic algorithm for three-dimensional image transformation and read address used for the image transformation In this section, a method for generating a basic algorithm for three-dimensional image transformation such as transformation, rotation, or movement and a read address used to perform the image transformation is described.

(2-1) Definition of world coordinate system

Figure 5:
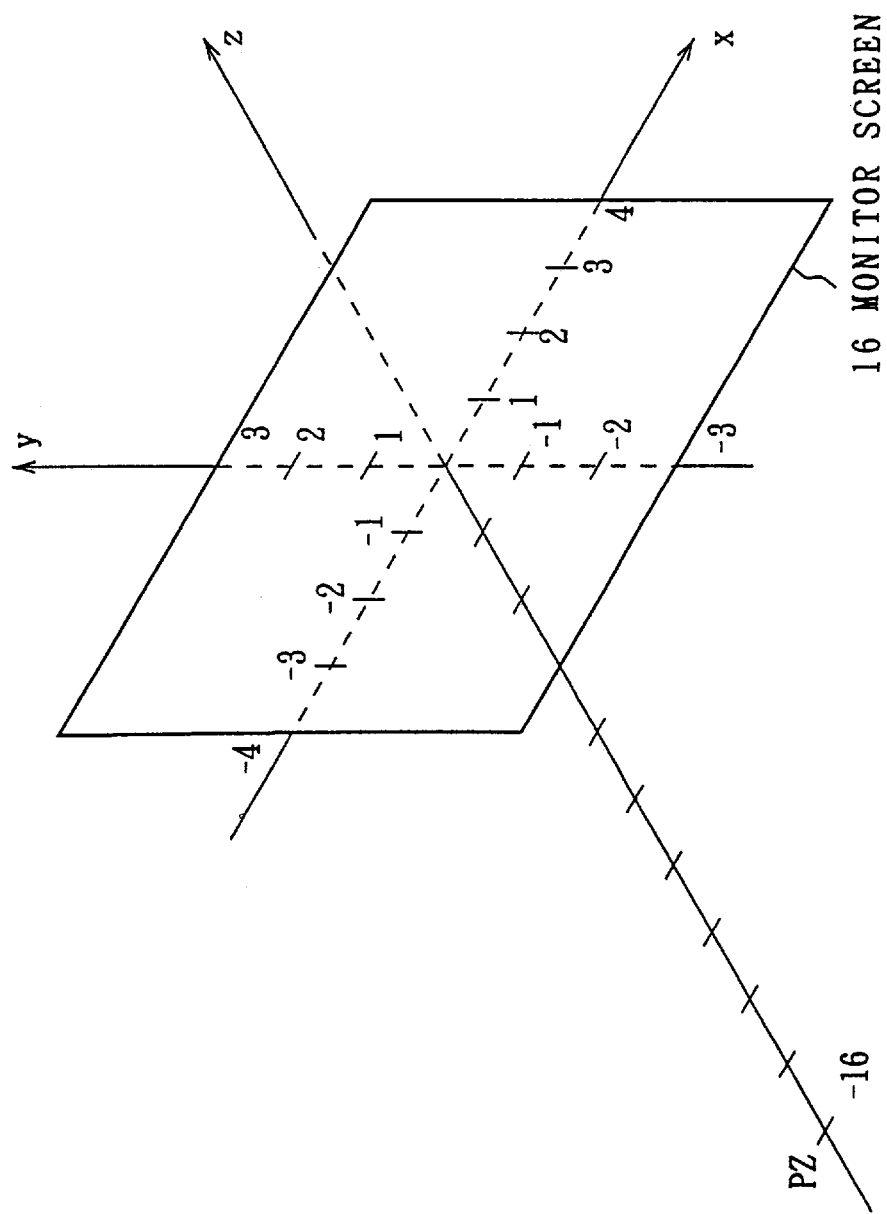
FIG. 5 is a schematic view for explaining a world coordinate system defined for a special effect system of the present invention.

First, a world coordinate system used for explanation of the present invention while referring to FIG. 5. The world coordinate system represents a three-dimensional rectangular coordinate system comprising x-, y-, and z-axes. That is, as shown in FIG. 5, x-axis is defined as the horizontal (right-and-left) direction of the screen plane and y-axis is defined as the vertical (up-and-down) direction of the screen plane by assuming that the screen plane of the monitor screen 16 is present on the xy plane defined by x-axis and y-axis perpendicular to x-axis.

Moreover, the depth direction of the screen plane is defined as the positive direction of z-axis perpendicular to the xy plane and the this side of the screen plane, that is, the side where a viewpoint PZ for viewing the screen plane is present is defined as the negative direction of z-axis.

Moreover, it is defined that the center of the screen plane coincides with the origin of the world coordinate system comprising these x-axis, y-axis, and z-axis.

Continuous virtual coordinate values are set to x-axis from the inside (origin) of the screen area toward the right and left outward directions and virtual coordinate values between "−4" and "+4" are set to x-axis in the screen area from left to right sides when viewing the screen plane from the viewpoint PZ.

Moreover, continuous coordinate values are set to y-axis from the inside (origin) of the screen area toward upper and lower outward directions and virtual coordinate values between "−3" and "+3" are set to y-axis in the screen area from lower to upper sides when viewing the screen plane from the viewpoint PZ.

Furthermore, the viewpoint position PZ of the operator is virtually set to a position where the coordinate value of the position PZ is "−16" on z-axis.

(2—2) Basic algorithm of three-dimensional image transformation

Figure 6A:
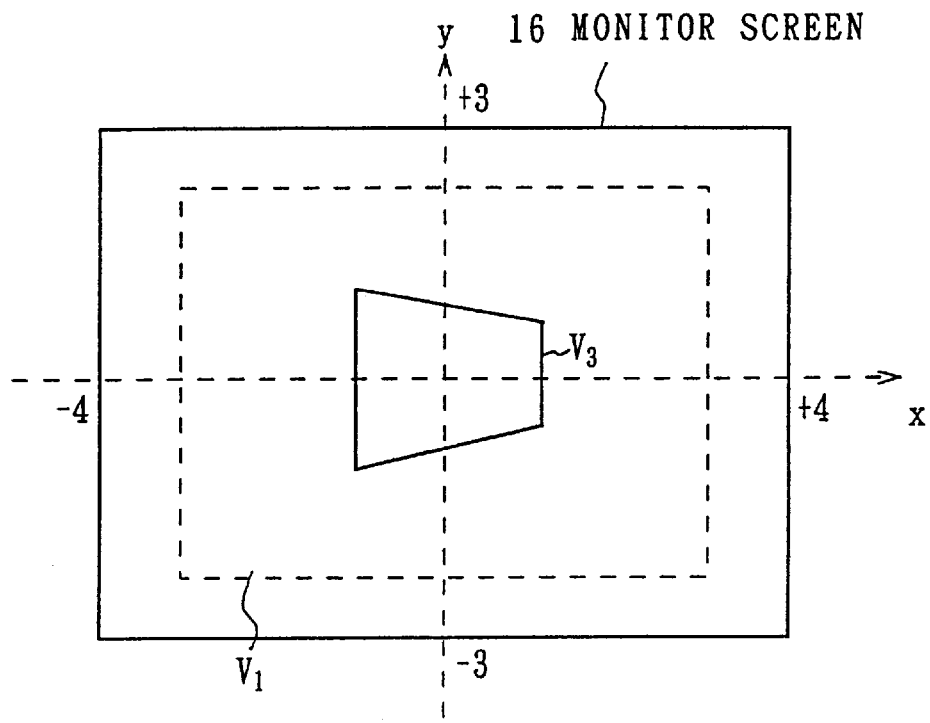
FIGS. 6A and 6B are schematic diagrams for explaining three-dimensional image transformation processing.
Figure 6B:
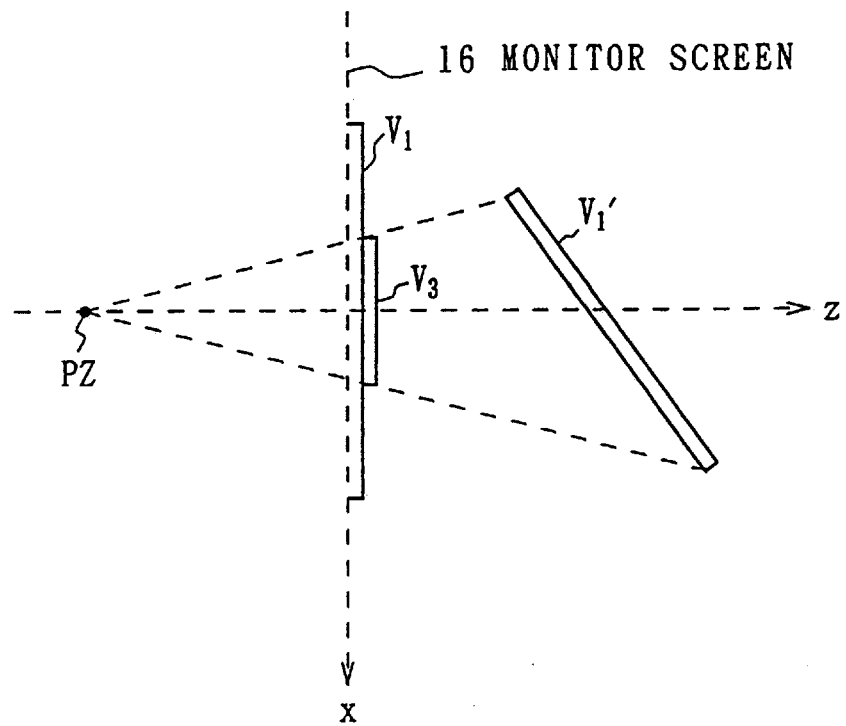

In this section, a basic algorithm for generating the video signal $V_3$ to which three-dimensional image transformation is applied from the source video signal $V_1$ is described by referring to FIGS. 6A and 6B.

The source video signal $V_1$ is directly stored in the frame memory 11A without being image-transformed. Because the source video signal $V_1$ is a two-dimensional video signal, it is present on the screen plane of the monitor screen 16 in a three-dimensional space as shown in FIGS. 6A and 6B.

When the operator designates the three-dimensional image transformation comprising rotation of approx. 45° about y-axis and, translation in the positive direction of z-axis to the source video signal $V_1$ as shown in FIGS. 6A and 6B, it is possible to generate a video signal $V_1'$ to which the designated image transformation is applied by multiplying each pixel of the source video signal $V_1$ by a three-dimensional transformation matrix $T_0$ corresponding to the image transformation.

The three-dimensional transformation matrix $T_0$ can be generally shown by the following expression (3).

$$T_0 = \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \quad (3)$$

Transformation parameters $r_{11}$ to $r_{33}$ used for the transformation matrix $T_0$ are parameters including an element for rotating the source video signal $V_1$ about x-, y-, or z-axis, an element for enlarging or reducing the scale of the source video signal $V_1$ in the x-, y-, and z-axis direction, and an element for skewing the source video signal $V_1$ in the x-, y-, or z-axis direction. Moreover, transformation parameters $l_x$, $l_y$, and $l_z$ are parameters including an element for translating the source video signal $V_1$ in the x-, y-, or z-axis direction and a parameter s is a parameter including an element for uniformly enlarging or reducing the whole of the source video signal $V_1$ in each axis direction of three dimensions.

The transformation matrix $T_0$ is a matrix of four rows and four columns because a coordinate system for rotational transformation and the like and a coordinate system for translational transformation and enlargement/reduction transformation are shown in one coordinate system. In general, this coordinate system is referred to as homogeneous coordinate system.

Because the video signal $V_1'$ coordinate-transformed into a three-dimensional space by making the three-dimensional transformation matrix $T_0$ work is finally displayed on the screen plane of the monitor screen 16, it is necessary to project the signal $V_1'$ on a screen plane based on the viewpoint of an operator. That is, as shown in FIG. 6B, it is necessary to obtain the video signal $V_3$ through-viewed on the xy plane when viewing the video signal $V_1'$ in a three-dimensional space from the virtual viewpoint PZ on z-axis. This projection processing can be executed by making a perspective transformation matrix $P_0$ work. That is, by multiplying each pixel of the video signal $V_1'$ by the perspective transformation matrix $P_0$, it is possible to obtain the video signal $V_3$ obtained by through-viewing the video signal $V_1'$ present in a three-dimensional space onto an xy plane.

The perspective transformation matrix $P_0$ is generally shown by the following expression (4).

$$P_0 = \begin{bmatrix} 1 & 0 & 0 & 0 \\ 0 & 1 & 0 & 0 \\ 0 & 0 & 0 & P_z \\ 0 & 0 & 0 & 1 \end{bmatrix} \quad (4)$$

The parameter $P_Z$ of the perspective transformation matrix $P_0$ is a perspective value for applying the perspective when projecting the video signal $V_1'$ onto an xy plane. In general, a value "116" is set as the reference value of the perspective value $P_Z$. This represents that the z-coordinate value of the virtual viewpoint PZ is "−16". Moreover, an operator can set the perspective value $P_Z$ to a desired value.

Thus, by coordinate-transforming the source video signal $V_1$ into a three-dimensional space by making the transformation matrix $T_0$ corresponding to the image transformation designated by an operator work on the signal $V_1$ and performing the projection processing from the three-dimensional space to an xy plane, it is possible to apply the desired image transformation designated by the operator to the source video signal $V_1$ and generate the video signal $V_3$ to which the image transformation is applied.

The contents of the image transformation processing described above are summarized as shown below. That is, the image transformation processing comprises the spatial image transformation step of obtaining the three-dimensional-transformation video signal $V_1'$ from the source video signal $V_1$ in accordance with the three-dimensional transformation matrix $T_0$ and the perspective transformation step of obtaining the perspective-transformation video signal $V_3$ from the three-dimensional-transformation video signal $V_1'$ in accordance with the perspective transformation matrix $P_0$. Therefore, a transformation matrix T for obtaining the video signal $V_3$ from the source video signal $V_1$ at a stroke is shown by the following expression (5) in accordance with a multiplication expression between the three-dimensional-transformation matrix $T_0$ and the perspective transformation matrix $P_0$.

$$T = T_0 \cdot P_0 \quad (5)$$

$$= \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \begin{bmatrix} 1 & 0 & 0 & 0 \\ 0 & 1 & 0 & 0 \\ 0 & 0 & 0 & P_z \\ 0 & 0 & 0 & 1 \end{bmatrix}$$

$$= \begin{bmatrix} r_{11} & r_{12} & r_{13} & r_{13}P_z \\ r_{21} & r_{22} & r_{23} & r_{23}P_z \\ r_{31} & r_{32} & r_{33} & r_{33}P_z \\ l_x & l_y & l_z & l_zP_z + s \end{bmatrix}$$

Therefore, by multiplying each pixel of the source video signal $V_1$ by the transformation matrix T shown by the expression (5), it is possible to generate the video signal $V_3$ to which desired image transformation is applied.

When generating the video signal $V_3$, the special effect system 10 of the present invention does not multiply the source video signal $V_1$ by the transformation matrix T but actually, the system 10 generates the video signal $V_3$ by obtaining a read address to which the image transformation shown by the transformation matrix T will be applied and reading the source video signal $V_1$ from the frame memory 11A in accordance with the read address.

That is, the special effect system 10 of the present invention generates the video signal $V_3$ to which image transformation is applied by successively writing the source video signal $V_1$ in the frame memory 11A and reading the source video signal $V_1$ in accordance with a read address to which the image transformation shown by the transformation matrix T will be applied.

The source video signal $V_1$ to be written in the frame memory 11A of the special effect system 10 and the video signal $V_3$ read from the frame memory 11A are two-dimensional video data and moreover, the frame memory 11A is a memory for storing two-dimensional data. Therefore, in the case of the operation of an read address used for the read operation from the frame memory 11A, a parameter for computing z-axis-directional data in a three-dimensional space is not practically used. Therefore, the parameter at the third column and third row for computing z-axis-directional data in the transformation matrix T shown in the expression (5) is unnecessary.

That is, when it is assumed that a transformation matrix to be actually required for the operation of a read address is $T_{33}$, the transformation matrix $T_{33}$ becomes a matrix obtained by excluding the third column and third row in the expression (5) and it is shown by the following expression (6).

$$T_{33} = \begin{bmatrix} r_{11} & r_{12} & r_{13}P_z \\ r_{21} & r_{22} & r_{23}P_z \\ l_x & l_y & l_zP_z+s \end{bmatrix} \qquad (6)$$

(2-3) Method for generating read address

Then, a method for generating a read address used for the read operation from the frame memory 11A is described below. First, the relation between position vector on the frame memory 11A and position vector on the monitor screen 16 is described below by referring to FIGS. 7A and 7B.

It is assumed that a two-dimensional address on the frame memory 11A is $(X_M, Y_M)$, position vector on the frame memory 11A is $[X_M Y_M]$, and an address on the monitor screen 16 is $(X_S, Y_S)$ and position vector on the screen 16 is $[X_S Y_S]$. Then, two-dimensional position vector $[X_M Y_M]$ on the frame memory 11A can be shown as vector $[x_m y_m H_0]$ in terms of a homogeneous coordinate system and the position vector $[X_S Y_S]$ on the monitor screen 16 can be shown by vector $[x_s y_s 1]$ in terms of the homogeneous coordinate system. The parameter "$H_0$" of the homogenous coordinate system is a parameter for showing the enlargement/reduction ratio of the magnification of vector.

By making the transformation matrix $T_{33}$ work on the position vector $[x_m y_m H_0]$ on the frame memory 11A, the position vector $[x_m y_m H_0]$ on the frame memory 11A is transformed into position vector $[x_s y_s 1]$ on the monitor screen 16. Therefore, the relation between the position vector $[x_m y_m H_0]$ on the frame memory 11A and the position vector $[x_s y_s 1]$ on the monitor screen 16 is shown by the following expression (7).

$$[x_s \; y_s \; 1] = [x_m \; x_m \; H_0] \cdot T_{33} \qquad (7)$$

The relation between the parameter "$H_0$" of the homogeneous coordinate system used for the position vector $[x_m y_m H_0]$ on the frame memory 11A and the parameter "1" of the homogeneous coordinate system used for the position vector $[x_s y_s 1]$ on the monitor screen 16 represents that the position vector $[x_m y_m]$ on the frame memory 11A is transformed into the position vector $[x_s y_s]$ on the monitor screen 16 by the transformation matrix $T_{33}$ and the enlargement/reduction ratio "$H_0$" of the position vector $[x_m y_m]$ on the frame memory 11A is transformed so that the ratio "$H_0$" becomes equal to the enlargement/reduction ratio "1" of the position vector $[x_s y_s]$ on the monitor screen 16.

Therefore, the expression (7) is a relational expression for obtaining a point on the monitor screen 16 corresponding to a point on the frame memory 11A by the transformation matrix $T_{33}$.

The special effect system 10 of the present invention applies spatial image transformation to the source video signal $V_1$ by storing the source video signal $V_1$ in the frame memory 11A under the state before transformation, reading a point on the frame memory 11A corresponding to a point on the monitor screen 16 obtained by the transformation matrix $T_{33}$, and specifying it by a read address. That is, image transformation is not performed when writing the signal $V_1$ in the frame memory 11A but it is performed when the signal $V_1$ is read from the frame memory 11A.

In the case of the special effect system 10, it is necessary to obtain a point on the frame memory 11A corresponding to a point on the monitor screen 16 instead of performing the operation according to the expression (7) for obtaining a point on the monitor screen 16 corresponding to a point on the frame memory 11A. Therefore, it is necessary to obtain a point on the frame memory 11A corresponding to a point on the monitor screen 16 by transforming the expression (7) and using a relational expression shown by the following expression (8). In this connection, a transformation matrix $T_{33}^{-1}$ is an inverse matrix of the transformation matrix $T_{33}$.

$$[x_m \; y_m \; H_0] = [x_s \; y_s \; 1] \cdot T_{33}^{-1} \qquad (8)$$

Then, a method for actually obtaining the two-dimensional position vector $[X_M Y_M]$ on the frame memory 11A is described below in accordance with the above idea. First, the transformation matrix $T_{33}$ is shown by parameters $a_{11}$ to $a_{33}$ as shown by the following expression (9).

$$T_{33} = \begin{bmatrix} r_{11} & r_{12} & r_{13}P_z \\ r_{21} & r_{22} & r_{23}P_z \\ l_x & l_y & l_zP_z+s \end{bmatrix} = \begin{bmatrix} a_{11} & a_{12} & a_{13} \\ a_{21} & a_{22} & a_{23} \\ a_{31} & a_{32} & a_{33} \end{bmatrix} \qquad (9)$$

Then, the inverse matrix $T_{33}^{-1}$ is shown by parameters $b_{11}$ to $b_{33}$ as shown by the following expression (10).

$$T_{33}^{-1} = \begin{bmatrix} a_{11} & a_{12} & a_{13} \\ a_{21} & a_{22} & a_{23} \\ a_{31} & a_{32} & a_{33} \end{bmatrix}^{-1} = \begin{bmatrix} b_{11} & b_{12} & b_{13} \\ b_{21} & b_{22} & b_{23} \\ b_{31} & b_{32} & b_{33} \end{bmatrix} \qquad (10)$$

Where $$b_{ij} = \frac{a_{ji}}{det(T_{33})}$$

The inverse matrix $T_{33}^{-1}$ thus defined is substituted for the above expression (8) and developed to obtain the following expression (11)

$$[x_m \; y_m \; H_0] = [x_s \; y_s \; 1] \begin{bmatrix} b_{11} & b_{12} & b_{13} \\ b_{21} & b_{22} & b_{23} \\ b_{31} & b_{32} & b_{33} \end{bmatrix} \qquad (11)$$

$$= [\; b_{11}x_s + b_{21}y_s + b_{31} \quad b_{12}x_s + b_{22}y_s + b_{32}$$

$$b_{13}x_s + b_{23}y_s + b_{33} \;]$$

Each element of the position vector $[x_m y_m H_0]$ on the frame memory 11A is shown by the following expression (12) in accordance with the expression (11).

$$x_m = b_{11}x_s + b_{21}y_s + b_{31}$$

$$y_m = b_{12}x_s + b_{22}y_s + b_{32}$$

$$H_0 = b_{13}x_s + b_{23}y_3 + b_{33} \qquad (12)$$

In this case, to transform the position vector $[x_m y_m H_0]$ according to the homogeneous coordinate system on the frame memory 11A into the two-dimensional position vector $[X_M \ Y_M]$ on the frame memory 11A, it is necessary to conform to the following procedure. That is, the parameter "$H_0$" used to transform the two-dimensional position vector $[X_M \ Y_M]$ into a homogeneous coordinate system is a parameter showing the enlargement/reduction ratio of the position vector $(x_m \ y_m)$ of the homogeneous coordinate system. Therefore, to transform the position vector of a homogeneous coordinate system into a two-dimensional position vector, it is necessary to normalize the parameters "$x_m$" and "$y_m$" showing the direction of the position vector of the homogeneous coordinate system enlargement/reduction ratio of the position vector of the homogeneous coordinate system with the parameter "$H_0$" showing the enlargement/reduction ratio of the position vector of the homogeneous coordinate system. Therefore, it is possible to obtain the parameters "$X_M$" and "$Y_M$" of a two-dimensional position vector on the frame memory 11A from the following expression (13).

$$X_M = x_m/H_0$$

$$Y_M = y_m/H_0 \tag{13}$$

Moreover, it is possible to transform the position vector $[x_s \ y_s \ 1]$ according to the homogeneous coordinate system on the monitor screen 16 into the two-dimensional position vector $[X_S \ Y_S]$ with the same idea. Therefore, it is necessary to normalize the parameters "$x_s$" and "$y_s$" showing the direction of the position vector of the homogeneous coordinate system with the parameter "1" showing the enlargement/reduction ratio of the position vector of the homogeneous coordinate system. Therefore, it is possible to obtain the parameters "$X_S$" and "$Y_S$" of a two-dimensional position vector on, the monitor screen 16 by the following expression (14).

$$X_S = x_s$$

$$Y_S = y_s \tag{14}$$

Thus, by substituting the expressions (11) and (14) for the expression (13), the parameters "$X_M$" and "$Y_M$" of the two-dimensional position vector on the frame memory 11A can be shown by the following expressions (15) and (16).

$$X_M = \frac{x_m}{H_0} \tag{15}$$
$$= \frac{b_{11}x_s + b_{21}y_s + b_{31}}{b_{13}x_s + b_{23}y_s + b_{33}}$$
$$= \frac{b_{11}X_S + b_{21}Y_S + b_{31}}{b_{13}X_S + b_{23}Y_S + b_{33}}$$

$$Y_M = \frac{y_m}{H_0} \tag{16}$$
$$= \frac{b_{12}x_s + b_{22}y_s + b_{32}}{b_{13}x_s + b_{23}y_s + b_{33}}$$
$$= \frac{b_{12}X_S + b_{22}Y_S + b_{32}}{b_{13}X_S + b_{23}Y_S + b_{33}}$$

It is possible to obtain the position vector $[X_M \ Y_M]$ on the frame memory 11A by the expressions (15) and (16) and moreover, obtain the read address $(X_M, Y_M)$ on the frame memory 11A.

Then, the parameters $b_{11}$ to $b_{33}$ of the inverse matrix $T_{33}^{-1}$ are obtained. It is possible to the parameters $b_{11}$ to $b_{33}$ of the inverse matrix $T_{33}^{-1}$ can be shown by the following expressions (17) to (25).

$$b_{11} = \frac{-a_{32}a_{23} + a_{22}a_{33}}{W_1} \tag{17}$$

$$b_{12} = \frac{a_{32}a_{13} - a_{12}a_{33}}{W_1} \tag{18}$$

$$b_{13} = \frac{-a_{22}a_{13} + a_{12}a_{23}}{W_1} \tag{19}$$

$$b_{21} = \frac{a_{31}a_{23} - a_{21}a_{33}}{W_1} \tag{20}$$

$$b_{22} = \frac{-a_{31}a_{13} + a_{11}a_{33}}{W_1} \tag{21}$$

$$b_{23} = \frac{a_{21}a_{13} - a_{11}a_{23}}{W_1} \tag{22}$$

$$b_{31} = \frac{-a_{22}a_{31} + a_{21}a_{32}}{W_1} \tag{23}$$

$$b_{32} = \frac{a_{12}a_{31} - a_{11}a_{32}}{W_1} \tag{24}$$

$$b_{33} = \frac{-a_{12}a_{21} + a_{11}a_{22}}{W_1} \tag{25}$$

In the above expression, a parameter $W_1$ is a value shown by the following expression (26).

$$W_1 = a_{22}a_{31}a_{13} + a_{21}a_{32}a_{13} + a_{12}a_{31}a_{23} - a_{11}a_{32}a_{23} - a_{12}a_{21}a_{33} + a_{11}a_{22}a_{33} \tag{26}$$

In this case, values of the parameters $a_{11}$ to $a_{33}$ are shown by the following expressions (27) to (29) in accordance with the relational expression (9).

$$a_{11} = r_{11}, \ a_{12} = r_{12}, \ a_{13} = r_{13}P_z \tag{27}$$

$$a_{21} = r_{21}, \ a_{22} = r_{22}, \ a_{23} = r_{23}P_z \tag{28}$$

$$a_{31} = l_x, \ a_{32} = l_y, \ a_{33} = l_zP_z + s \tag{29}$$

Therefore, by substituting the expressions (27) to (29) for the expressions (17) to (26), it is possible to transform the expressions (17) to (26) into the following expressions (30) to (39).

$$b_{11} = \frac{-l_y r_{23}P_z + r_{22}(l_zP_z + s)}{W_1} \tag{30}$$

$$b_{12} = \frac{l_y r_{13}P_z + r_{12}(l_zP_z + s)}{W_1} \tag{31}$$

$$b_{13} = \frac{-r_{22}r_{23}P_z + r_{12}r_{23}P_z}{W_1} \tag{32}$$

$$b_{21} = \frac{l_x r_{23}P_z - r_{21}(l_zP_z + s)}{W_1} \tag{33}$$

$$b_{22} = \frac{-l_x r_{13}P_z + r_{11}(l_zP_z + s)}{W_1} \tag{34}$$

$$b_{23} = \frac{r_{21}r_{13}P_z - r_{11}r_{23}P_z}{W_1} \tag{35}$$

$$b_{31} = \frac{-r_{22}l_x + r_{21}l_y}{W_1} \tag{36}$$

$$b_{32} = \frac{r_{12}l_x - r_{11}l_y}{W_1} \tag{37}$$

-continued $$b_{33} = \frac{-r_{12}r_{21} + r_{11}r_{22}}{W_1} \quad (38)$$

$$W_1 = -r_{22}l_x r_{13} P_z + r_{21}l_y r_{13} P_z + r_{12}l_x r_{23} P_z - \quad (39)$$
$$r_{11}l_y r_{23} P_z - r_{12}r_{21}(l_z P_z + s) +$$
$$r_{11}r_{22}(l_z P_z + s)$$

Thus, by substituting the expressions (30) to (39) for the expressions (15) and (16), it is possible to obtain the read address $(X_M, Y_M)$ of the frame memory 11A in accordance with the following expressions (40) and (41).

$$X_M = \frac{1}{H_0}[\{-l_x r_{23} P_z + r_{22}(l_z P_z + s)\}X_S + \quad (40)$$
$$\{l_y r_{13} P_z + r_{12}(l_z P_z + s)\}Y_S +$$
$$(-r_{22}r_{13}P_z + r_{12}r_{23}P_z)]$$

$$Y_M = \frac{1}{H_0}[\{l_x r_{23} P_z - r_{21}(l_z P_z + s)\}X_S + \quad (41)$$
$$\{-l_y + r_{11}(l_z P_z + s)\}Y_S +$$
$$(r_{21}r_{13}P_z - r_{11}r_{23}P_z)]$$

The parameter $H_0$ is obtained from the following expression (42) in accordance with the expression (12).

$$H_0 = (-r_{22}l_x + r_{21}l_y)X_S + (r_{12}l_x - r_{11}l_y)Y_S + (-r_{12}r_{21} + r_{11}r_{22}) \quad (42)$$

Thus, it is possible to show the read address $(X_M, Y_M)$ of the frame memory 11A by using parameters ($r_{11}$ to $r_{33}$, $l_x$, $l_y$, $l_z$, s, and $P_Z$) of the transformation matrix $T_{33}$. Therefore, by supplying the screen address $(X_S, Y_S)$ from the expression (40) to the expression (42) so as to correspond to the luster scan sequence of the monitor screen 16, it is possible to successively obtain the read address $(X_M, Y_M)$ on the frame memory 11A corresponding to the supplied screen address.

Thus, the special effect system 10 of the present invention generates the read address $(X_M, Y_M)$ of the frame memory 11A (and the frame memory 11B) in accordance with the theory described above. Moreover, the special effect system 10 of the present invention obtains the matrix parameters $b_{11}$ to $b_{33}$ of the transformation matrix $T_{33}^{-1}$ by performing the operation of the expression (39) from the above expression (30) in accordance with the special effect parameters ($r_{11}$ to $r_{33}$, $l_x$, $l_y$, $l_z$, s, and $P_Z$) input through the control panel 14 and supplies the matrix parameters to the read address generation circuit 11C to generate the read address $(X_M, Y_M)$ in accordance with the expressions (15) and (16). Thereby, it is possible to generate the video signal $V_3$ (that is, main image) to which the image transformation specified by an operator is applied.

(3) Symmetric image generation algorithm

In this section, an algorithm for generating a symmetric image point-symmetric, line-symmetric, or plane-symmetric to the main image generated by the above image transformation.

It is possible to easily obtain a symmetric image for a main image by making a symmetric transformation matrix work on the main image basically similarly to the case of the image transformation in the above-described three-dimensional space. That is, it is possible to easily obtain a symmetric image by further making a symmetric transformation matrix work on the transformation matrix T used to obtain a main image and making a resultingly-obtained transformation matrix work on the source video signal $V_2$. The symmetric transformation matrix is described in the subsequent sections every symmetric mode (point symmetry, line symmetry, or plane symmetry).

(3-1) Two-dimensional point symmetry

When a main image and a point serving as the symmetry yardstick are present on the xy plane of the above world coordinate system, it is possible to easily generate a symmetric image point-symmetric to the main image by performing two-dimensional point-symmetric transformation.

Figure 8:
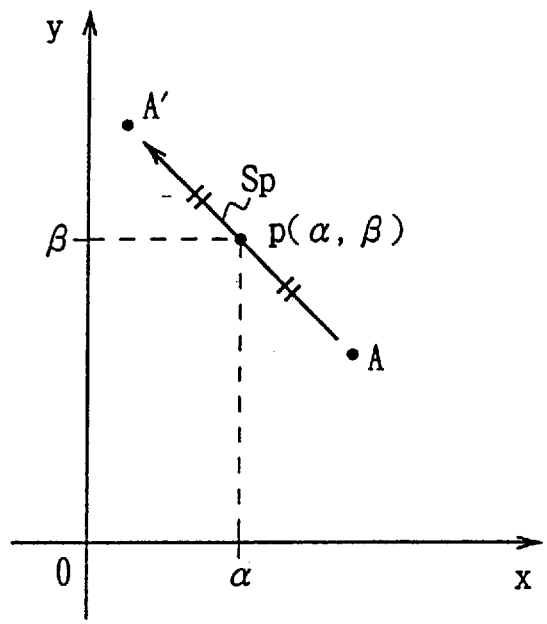
FIG. 8 is a schematic diagram for explaining two-dimensional point-symmetric transformation.
Figure 9:
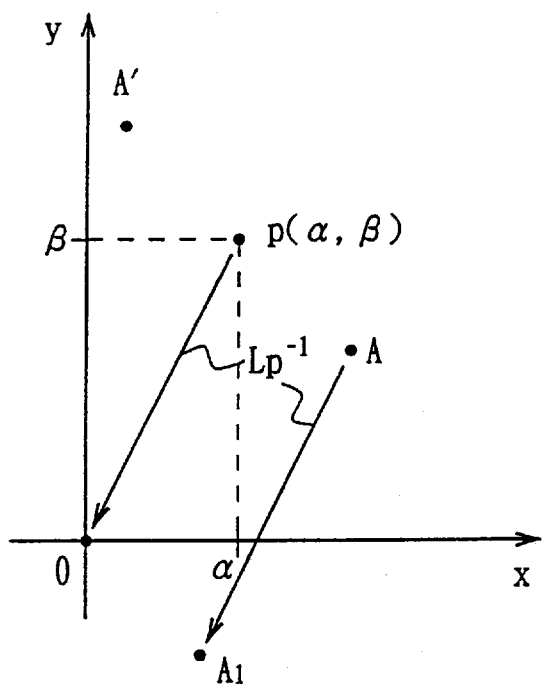
FIG. 9 is a schematic diagram for explaining two-dimensional point-symmetric transformation.
Figure 10:
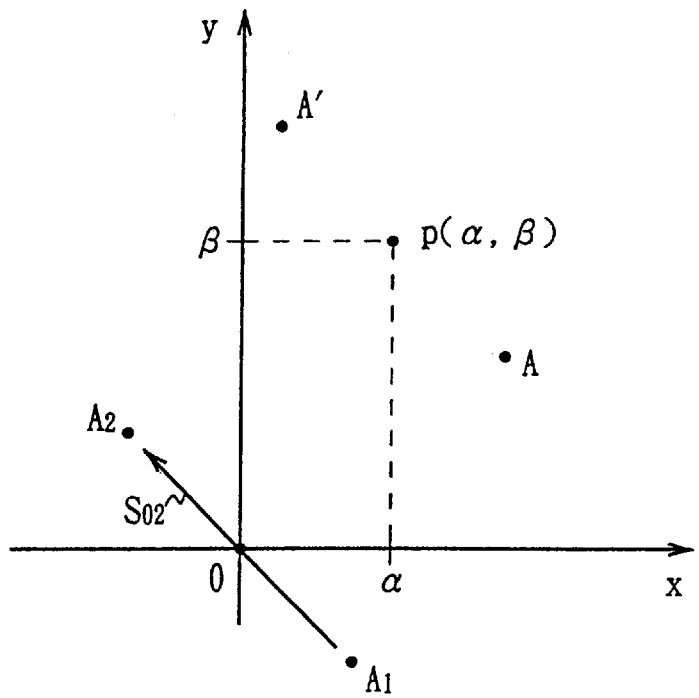
FIG. 10 is a schematic diagram for explaining two-dimensional point-symmetric transformation.
Figure 11:
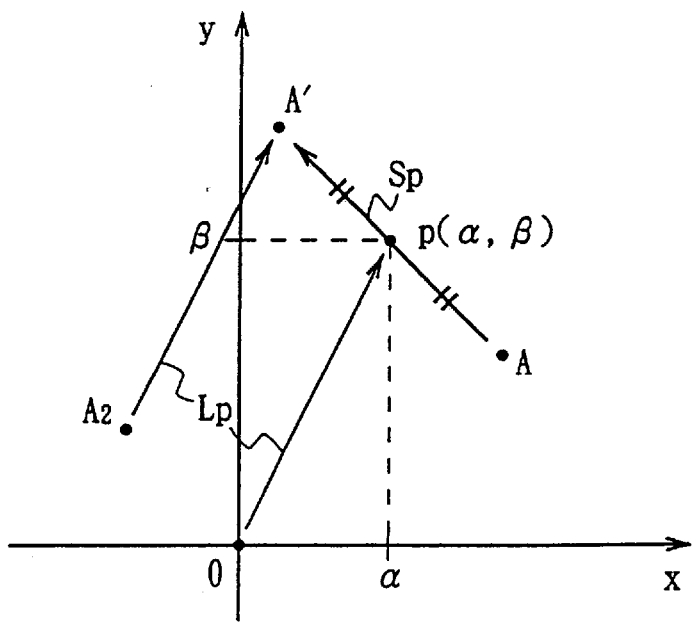
FIG. 11 is a schematic diagram for explaining two-dimensional point-symmetric transformation.

In this case, the two-dimensional point-symmetric transformation can be easily performed by the processing described below in general. That is, to obtain a point A' based on a reference point p ($\alpha$, $\beta$), which is point-symmetric to an optional point A on the xy plane as shown in FIG. 8, the point A is translated so as to translate the reference point p to the origin (0, 0) to obtain a point $A_1$ as shown in FIG. 9. Then, as shown in FIG. 10, a point $A_2$ is obtained which is point symmetric to the point A, to the origin (0, 0) as the reference. Then, a point $A_2$ is translated by the processing reverse to the above processing so as to translate the origin (0, 0) to the reference point p to obtain the point A' as shown in FIG. 11. Thus, it is possible to obtain the point A' point-symmetric to the optional point A by performing a series of these types of processing as shown in the following expression (43).

$$[A \rightarrow A'] = \left[ A \xrightarrow{\text{Translation}} A_1 \xrightarrow{\text{Origin symmetry}} A_2 \xrightarrow{\text{Inverse translation}} A' \right] \quad (43)$$

These types of processing are specifically described below. First, as shown in FIG. 9, it is possible to obtain the point $A_1$ from the point A by assuming a transformation matrix for translation from the origin (0, 0) to the point p ($\alpha$, $\beta$) as Lp and making the inverse matrix $Lp^{-1}$ of the transformation matrix work on the point is. The inverse matrix $Lp^{-1}$ of the transformation matrix Lp from the origin (0, 0) to the point p ($\alpha$, $\beta$) is shown by the following expression (44)

$$Lp^{-1} = \begin{bmatrix} 1 & 0 & 0 & 0 \\ 0 & 1 & 0 & 0 \\ 0 & 0 & 1 & 0 \\ -\alpha & -\beta & 0 & 1 \end{bmatrix} \quad (44)$$

Then, as shown in FIG. 10, it is possible to obtain the point $A_2$ from the point $A_1$ by making a point-symmetric transformation matrix $S_{02}$ using the origin (0, 0) as the point-symmetric reference point work on the point $A_1$. The point-symmetric transformation matrix $S_{02}$ based on the origin (0, 0) is shown by the following expression (45).

$$S_{02} = \begin{bmatrix} -1 & 0 & 0 & 0 \\ 0 & -1 & 0 & 0 \\ 0 & 0 & 1 & 0 \\ 0 & 0 & 0 & 1 \end{bmatrix} \quad (45)$$

Then, as shown in FIG. 11, it is possible to obtain the point A' from the point $A_2$ by making the transformation matrix Lp of translation from the origin (0, 0) to the point p ($\alpha$, $\beta$) work on the point $A_2$. The transformation matrix Lp is shown by the following expression (46).

$$Lp = \begin{bmatrix} 1 & 0 & 0 & 0 \\ 0 & 1 & 0 & 0 \\ 0 & 0 & 1 & 0 \\ \alpha & \beta & 0 & 1 \end{bmatrix} \quad (46)$$

Therefore, it is possible to obtain the point A' from the optional point A at a stroke by making a symmetric transformation matrix Sp obtained by multiplying these transformation matrixes $Lp^{-1}$, $S_{02}$, and Lp in accordance with the processing sequence work on the point A.

$$Sp = Lp^{-1} \cdot S_{02} \cdot Lp \quad (47)$$

$$= \begin{bmatrix} 1 & 0 & 0 & 0 \\ 0 & 1 & 0 & 0 \\ 0 & 0 & 1 & 0 \\ -\alpha & -\beta & 0 & 1 \end{bmatrix} \cdot \begin{bmatrix} -1 & 0 & 0 & 0 \\ 0 & -1 & 0 & 0 \\ 0 & 0 & 1 & 0 \\ 0 & 0 & 0 & 1 \end{bmatrix} \cdot \begin{bmatrix} 1 & 0 & 0 & 0 \\ 0 & 1 & 0 & 0 \\ 0 & 0 & 1 & 0 \\ \alpha & \beta & 0 & 1 \end{bmatrix}$$

$$= \begin{bmatrix} -1 & 0 & 0 & 0 \\ 0 & -1 & 0 & 0 \\ 0 & 0 & 1 & 0 \\ 2\alpha & 2\beta & 0 & 1 \end{bmatrix}$$

The symmetric transformation matrix Sp is a matrix for obtaining a symmetric image point-symmetric to a main image. Therefore, it is possible to obtain a symmetric image from the input source video signal $V_2$ by making the transformation matrix T used to obtain a main image from the source video signal $V_1$ and the symmetric transformation matrix Sp work on the source video signal $V_2$. That is, it is possible to obtain a symmetric image from the source video signal $V_2$ by making a four-row four-column symmetric transformation matrix $T_{2p}$ shown in the following expression (48) work on the source video signal $V_2$.

$$T_{2p} = T \cdot Sp = T_0 \cdot P_0 \cdot Sp \quad (48)$$

$$= \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \cdot \begin{bmatrix} 1 & 0 & 0 & 0 \\ 0 & 1 & 0 & 0 \\ 0 & 0 & 0 & P_z \\ 0 & 0 & 0 & 1 \end{bmatrix} \begin{bmatrix} -1 & 0 & 0 & 0 \\ 0 & -1 & 0 & 0 \\ 0 & 0 & 1 & 0 \\ 2\alpha & 2\beta & 0 & 1 \end{bmatrix}$$

$$= \begin{bmatrix} 2\alpha r_{13} P_z - r_{11} & 2\beta r_{13} P_z - r_{12} & r_{13} & r_{13} P_z \\ 2\alpha r_{23} P_z - r_{21} & 2\beta r_{23} P_z - r_{22} & r_{23} & r_{23} P_z \\ 2\alpha r_{33} P_z - r_{31} & 2\beta r_{33} P_z - r_{32} & r_{33} & r_{33} P_z \\ 2\alpha(l_z P_z + s) - l_x & 2\beta(l_z P_z + s) - l_y & l_z & l_z P_z + s \end{bmatrix}$$

The special effect system 10 of the present invention generates the video signal $V_6$ of a symmetric image from the source video signal $V_2$ by actually obtaining a read address to which the image transformation shown by the symmetric transformation matrix $T_{2p}$ will be applied and reading the source video signal $V_2$ from the frame memory 12A in accordance with the read address instead of multiplying the source video signal $V_2$ by the symmetric transformation matrix $T_{2p}$.

That is, the special effect system 10 of the present invention generates the video signal $V_6$ of a symmetric image by successively writing the source video signal $V_2$ in the frame memory 12A and reading the source video signal $V_2$ in accordance with a read address to which the image transformation shown by the symmetric transformation matrix $T_{2p}$ will be applied.

In this case, the source video signal $V_2$ written in the frame memory 12A and the video signal $V_6$ read from the frame memory 12A of the special effect system 10 are two-dimensional video data and the frame memory 12A is a memory for storing two-dimensional data. Therefore, in the case of the operation of a read address used for the read operation from the frame memory 12A, a parameter for computing the z-axis-directional data in a three-dimensional space is not practically used. Therefore, the parameter of the third column and third row for computing the z-axis-directional data is unnecessary.

That is, when assuming a symmetric transformation matrix actually required for the operation of a read address as $T_{2p(33)}$, the symmetric transformation matrix $T_{2p(33)}$ becomes a three-row three-column matrix excluding the third column and third row of the expression (48) and it is shown by the following expression (49).

$$T_{2p(33)} = \begin{bmatrix} 2\alpha r_{13} P_z - r_{11} & 2\beta r_{13} P_z - r_{12} & r_{13} P_z \\ 2\alpha r_{23} P_z - r_{21} & 2\beta r_{23} P_z - r_{22} & r_{23} P_z \\ 2\alpha(l_z P_z + s) - l_x & 2\beta(l_z P_z + s) - l_y & l_z P_z + s \end{bmatrix} \quad (49)$$

Moreover, in the case of the special effect system 10 of the present invention, it is necessary to obtain a point on the frame memory 12A corresponding to a point on the monitor screen 16 instead of obtaining a point on the monitor screen 16 corresponding to a point on the frame memory 12A as described in the section of the read-address generation method for the above-described three-dimensional image transformation. Therefore, the special effect system 10 of the present invention requires not the symmetric transformation matrix $T_{2p(33)}$ but the inverse matrix $T_{2p(33)}^{-1}$ of the symmetric transformation matrix $T_{2p(33)}$.

In this case, by setting the parameters of the symmetric transformation matrix $T_{2p(33)}$ as shown in the following expression (50), the inverse matrix $T_{2p(33)}^{-1}$ is shown by the following expression (51).

$$T_{2p(33)} = \begin{bmatrix} a'_{11} & a'_{12} & a'_{13} \\ a'_{21} & a'_{22} & a'_{23} \\ a'_{31} & a'_{32} & a'_{33} \end{bmatrix} \quad (50)$$

$$T_{2p(33)}^{-1} = \begin{bmatrix} b'_{11} & b'_{12} & b'_{13} \\ b'_{21} & b'_{22} & b'_{23} \\ b'_{31} & b'_{32} & b'_{33} \end{bmatrix} \quad (51)$$

Where $$b_{ij} = \frac{a_{ji}}{\det(T_{2p(33)})}$$

Thus, in the case of the special effect system 10, when a two-dimensional point symmetry is designated by an operator as the symmetric mode of a symmetric image, the CPU 13 obtains the parameters $b_{11}'$ to $b_{33}'$ of the inverse matrix $T_{2p(33)}^{-1}$ in accordance with the designated reference point and supplies the parameters $b_{11}'$ to $b_{33}'$ to the read address generation circuit 12C. The read address generation circuit 12C calculates the read address ($X_M'$, $Y_M'$) of the frame memory 12A by using the parameters $b_{11}'$ to $b_{33}'$ for the symmetric transformation instead of the parameters $b_{11}$ to $b_{33}$ of the operation expressions shown in the expressions (15) and (16). Thus, the special effect system 10 can obtain the video signal V6 of a symmetric image two-dimensionally point-symmetric to a main image by reading the source video signal $V_2$ from the frame memory 12A in accordance with the read address ($X_M'$, $Y_M'$)

(3-2) Three-dimensional point symmetry

Next, in this section, three-dimensional point-symmetry is described. When a main image and a point serving as a symmetry yardstick are present in a three-dimensional space of the above-described world coordinate system, it is possible to easily generate a symmetric image point-symmetric to the main image by performing three-dimensional point-symmetric transformation.

Figure 12:
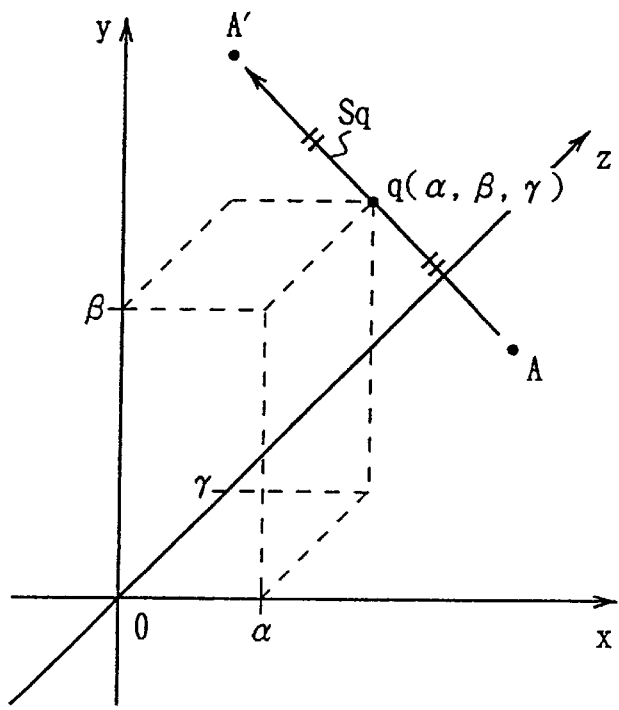
FIG. 12 is a schematic diagram for explaining three-dimensional point-symmetric transformation.
Figure 13:
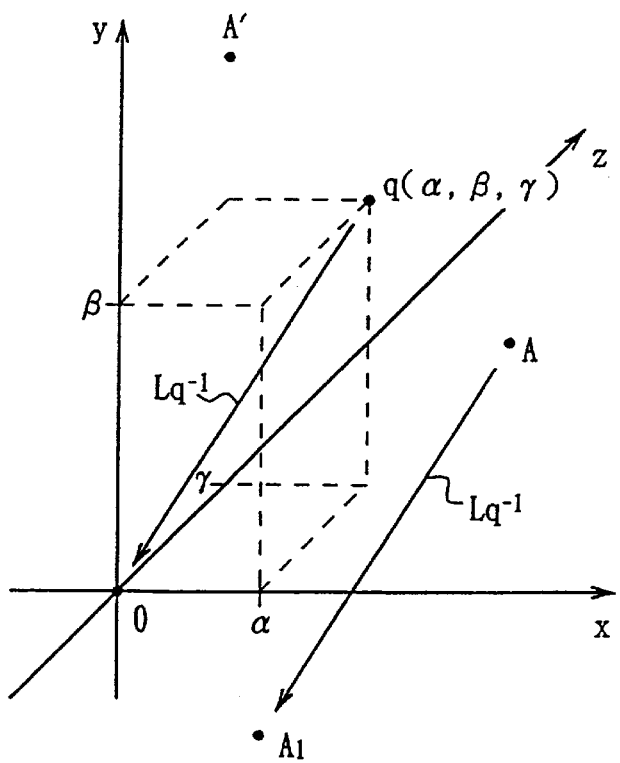
FIG. 13 is a schematic diagram for explaining three-dimensional point-symmetric transformation.
Figure 14:
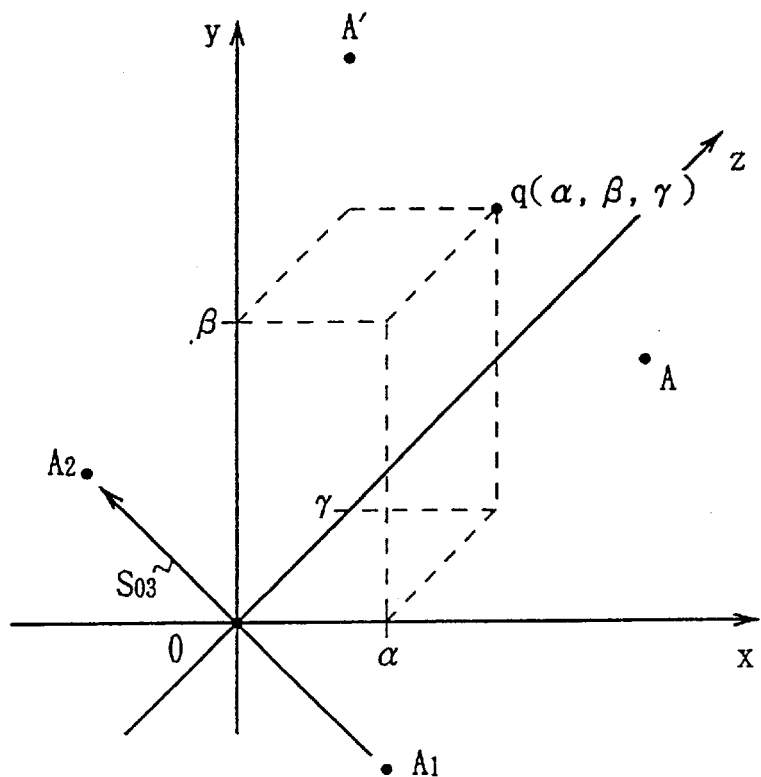
FIG. 14 is a schematic diagram for explaining three-dimensional point-symmetric transformation.
Figure 15:
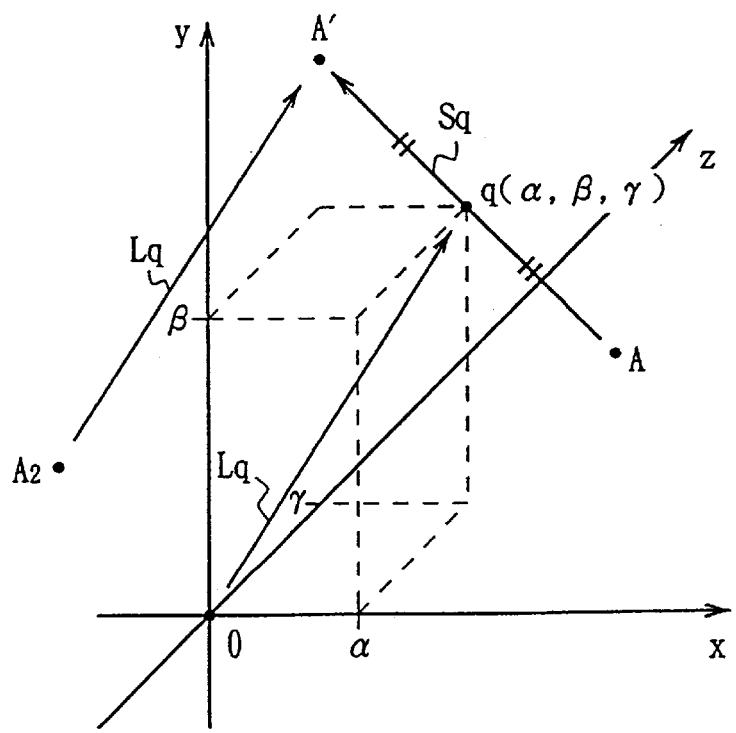
FIG. 15 is a schematic diagram for explaining three-dimensional point-symmetric transformation.

In this case, the three-dimensional point-symmetric transformation can be easily performed by the processing described below in general. That is, to obtain a point A' based on a reference point q ($\alpha$, $\beta$, $\gamma$), which is point-symmetric to an optional point A in a three dimensional space as shown in FIG. 12, the point A is first translated so as to translate the reference point q ($\alpha$, $\beta$, $\gamma$) to the origin (0, 0, 0) to obtain a point $A_1$ as shown in FIG. 13. Then, as shown in FIG. 14, a point-symmetric point $A_2$ based on the origin is obtained for the point A. Then, as shown in FIG. 15, the point A' is obtained by translating the point $A_2$ in accordance with the processing reverse to the above processing to obtain the point A' so as to translate the origin (0, 0, 0) to the reference point q. Thus, as shown in the following expression (52), it is possible to the point A' point-symmetric to the optional point A by performing a series of these types of processing.

$$[A \to A'] = [A \xrightarrow{\text{Translation}} A_1 \xrightarrow{\substack{\text{Origin} \\ \text{symmetry}}} A_2 \xrightarrow{\substack{\text{Inverse} \\ \text{translation}}} A' \quad (52)$$

These types of processing are specifically described below. First, to obtain a point $A_1$ from a point A as shown in FIG. 13, by assuming a transformation matrix of translation from the origin (0, 0, 0) to a point q ($\alpha$, $\beta$, $\gamma$) as Lq, it is possible to obtain the point $A_1$ by making the inverse matrix $Lq^{-1}$ of the transformation matrix Lq work on the point A. The inverse matrix $Lq^{-1}$ of the transformation matrix Lq from the origin (0, 0, 0) to the point q ($\alpha$, $\beta$, $\gamma$) is shown by the following expression (53).

$$Lq^{-1} = \begin{bmatrix} 1 & 0 & 0 & 0 \\ 0 & 1 & 0 & 0 \\ 0 & 0 & 1 & 0 \\ -\alpha & -\beta & -\gamma & 1 \end{bmatrix} \quad (53)$$

Then, as shown in FIG. 14, it is possible to obtain a point $A_2$ from the point $A_1$ by making a point-symmetric transformation matrix $S_{03}$ using the origin (0, 0, 0) as the reference point of point symmetry work on the point $A_1$. The point-symmetric transformation matrix $S_{03}$ based on the origin (0, 0, 0) is shown by the following expression (54).

$$S_{03} = \begin{bmatrix} -1 & 0 & 0 & 0 \\ 0 & -1 & 0 & 0 \\ 0 & 0 & -1 & 0 \\ 0 & 0 & 0 & 1 \end{bmatrix} \quad (54)$$

Then, it is possible to obtain a point A' from the point $A_2$ as shown in FIG. 15 by making the transformation matrix Lq of translation from the origin (0, 0, 0) to the point q ($\alpha$, $\beta$, $\gamma$) work on the point $A_2$. The transformation matrix Lq is shown by the following expression (55).

$$Lq = \begin{bmatrix} 1 & 0 & 0 & 0 \\ 0 & 1 & 0 & 0 \\ 0 & 0 & 1 & 0 \\ \alpha & \beta & \gamma & 1 \end{bmatrix} \quad (55)$$

Therefore, it is possible to obtain the point A' point-symmetric to the optional point A from the point A at a stroke by making a symmetric transformation matrix Sq obtained by multiplying these transformation matrixes $Lq^{-1}$, $S_{03}$, and Lq in accordance with the processing sequence work on the point A as shown by the following expression (56).

$$\begin{aligned} Sq &= Lq^{-1} \cdot S_{03} \cdot Lq \quad (56) \\ &= \begin{bmatrix} 1 & 0 & 0 & 0 \\ 0 & 1 & 0 & 0 \\ 0 & 0 & 1 & 0 \\ -\alpha & -\beta & -\gamma & 1 \end{bmatrix} \cdot \begin{bmatrix} -1 & 0 & 0 & 0 \\ 0 & -1 & 0 & 0 \\ 0 & 0 & -1 & 0 \\ 0 & 0 & 0 & 1 \end{bmatrix} \cdot \begin{bmatrix} 1 & 0 & 0 & 0 \\ 0 & 1 & 0 & 0 \\ 0 & 0 & 1 & 0 \\ \alpha & \beta & \gamma & 1 \end{bmatrix} \\ &= \begin{bmatrix} -1 & 0 & 0 & 0 \\ 0 & -1 & 0 & 0 \\ 0 & 0 & -1 & 0 \\ 2\alpha & 2\beta & 2\gamma & 1 \end{bmatrix} \end{aligned}$$

The symmetric transformation matrix Sq is a matrix for obtaining symmetric image point-symmetric to a main image. Therefore it is possible to obtain a symmetric image from the source video signal $V_2$ by making the transformation matrix T (comprising $T_0$ and $P_0$) used to obtain a main image from the source video signal $V_1$ and the symmetric transformation matrix Sq work on the source video signal $V_2$. That is, it is possible to obtain a symmetric image from the source video signal $V_2$ by making a four-row four-column symmetric transformation matrix $T_{3p}$ shown by the following expression (57) work the source video signal $V_2$.

$$\begin{aligned} T_{3p} &= T_0 \cdot Sq \cdot P_0 \quad (57) \\ &= \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \cdot \begin{bmatrix} -1 & 0 & 0 & 0 \\ 0 & -1 & 0 & 0 \\ 0 & 0 & -1 & 0 \\ 2\alpha & 2\beta & 2\gamma & 1 \end{bmatrix} \cdot \begin{bmatrix} 1 & 0 & 0 & 0 \\ 0 & 1 & 0 & 0 \\ 0 & 0 & 0 & P_z \\ 0 & 0 & 0 & 1 \end{bmatrix} \\ &= \begin{bmatrix} -r_{11} & -r_{12} & 0 & -r_{13}P_z \\ -r_{21} & -r_{22} & 0 & -r_{23}P_z \\ -r_{31} & -r_{32} & 0 & -r_{33}P_z \\ 2\alpha s - l_x & 2\beta s - l_y & 0 & (2\gamma s - l_z)P_z + s \end{bmatrix} \end{aligned}$$

In this connection, though the symmetric transformation matrix Sp is made to work after the three-dimensional image transformation matrix T in the case of two dimensions, the symmetric transformation matrix Sq is inserted between the three-dimensional image transformation matrix T in the case of three dimensions. This is because it is necessary to perform symmetric transformation while a video signal is present in a three-dimensional space in the case of three dimensions.

Also in the case of three-dimensional point symmetry, the source video signal $V_2$ and video signal $V_6$ to be handled are two-dimensional data similarly to the case of two-dimensional point symmetry. Therefore, the parameter for computing z-axis-directional data of the three-dimensional symmetric transformation matrix $T_{3p}$ is not practically used. Therefore, the parameter at the third column and third row for computing the z-axis-directional data of the symmetric transformation matrix $T_{3p}$ shown by the expression (57) is unnecessary.

That is, when assuming a symmetric transformation matrix actually required for the operation of a read address as $T_{3p(33)}$, the symmetric transformation matrix $T_{3p(33)}$ becomes a three-row three-column matrix excluding the third column and third row of the expression (57) and it is shown by the following expression (58).

$$T_{3p(33)} = \begin{bmatrix} -r_{11} & -r_{12} & -r_{13}P_z \\ -r_{21} & -r_{22} & -r_{23}P_z \\ 2\alpha s - l_x & 2\beta s - l_y & (2\gamma s - l_z)P_z + s \end{bmatrix} \quad (58)$$

Moreover, because image transformation is performed in accordance with the read processing from the frame memory 12A similarly to the case of two-dimensional point symmetry in the case of three-dimensional point symmetry, it is necessary to obtain a point on the frame memory 12A corresponding to a point on the monitor screen 16. Therefore, the symmetric transformation matrix $T_{3p(33)}$ is not actually necessary but the inverse matrix $T_{3p(33)}^{-1}$ is necessary of the symmetric transformation matrix $T_{3p(33)}$.

In this case, by setting the parameters of the symmetric transformation matrix $T_{3p(33)}$ as shown in the following expression (59), the inverse matrix $T_{3p(33)}^{-1}$ of the symmetric transformation matrix $T_{3p(33)}$ is shown by the following expression (60).

$$T_{3p(33)} = \begin{bmatrix} a'_{11} & a'_{12} & a'_{13} \\ a'_{21} & a'_{22} & a'_{23} \\ a'_{31} & a'_{32} & a'_{33} \end{bmatrix} \quad (59)$$

$$T_{3p(33)}^{-1} = \begin{bmatrix} b'_{11} & b'_{12} & b'_{13} \\ b'_{21} & b'_{22} & b'_{23} \\ b'_{31} & b'_{32} & b'_{33} \end{bmatrix} \quad (60)$$

Where $$b_{ij} = \frac{a_{ji}}{\det(T_{3p(33)})}$$

Thus, in the case of the special effect system 10, when three-dimensional point symmetry is designated by an operator as the symmetric mode of a symmetric image, the CPU 13 obtains the parameters $b_{11}'$ to $b_{33}'$ of the inverse matrix $T_{3p(33)}^{-1}$ in accordance with a designated reference point and supplies the parameters $b_{11}'$ to $b_{33}'$ to the read address generation circuit 12C. The read address generation circuit 12C calculates the read address ($X_M'$ $Y_M'$) of the frame memory 12A by using the parameters $b_{11}'$ to $b_{33}'$ instead of the parameters $b_{11}$ to $b_{33}$ of the operation expressions shown by the expressions (15) and (16). Thus, the special effect system 10 can obtain the video signal $V_6$ of a symmetric image three-dimensionally point-symmetric to a main image by reading the source video signal $V_2$ from the frame memory 12A in accordance with the read address ($X_M'$ $Y_M'$).

(3—3) Two-dimensional line symmetry

In this section, two-dimensional line symmetry is described. When a main image and a line serving as a symmetry yardstick are present on the xy plane of a world coordinate system, it is possible to easily generate a symmetric image line-symmetric to the main image by performing two-dimensional line-symmetric transformation.

Figure 16:
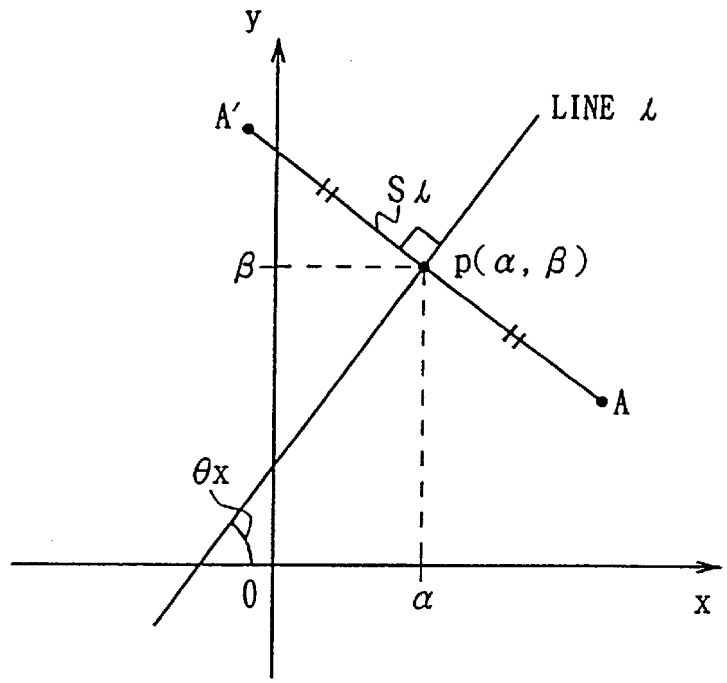
FIG. 16 is a schematic diagram for explaining two-dimensional line-symmetric transformation.
Figure 17:
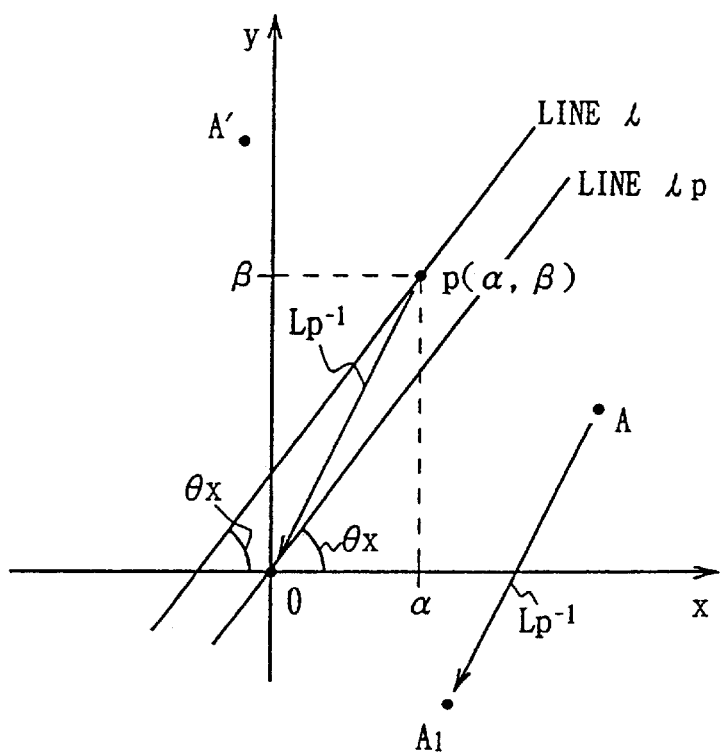
FIG. 17 is a schematic diagram for explaining two-dimensional line-symmetric transformation.
Figure 18:
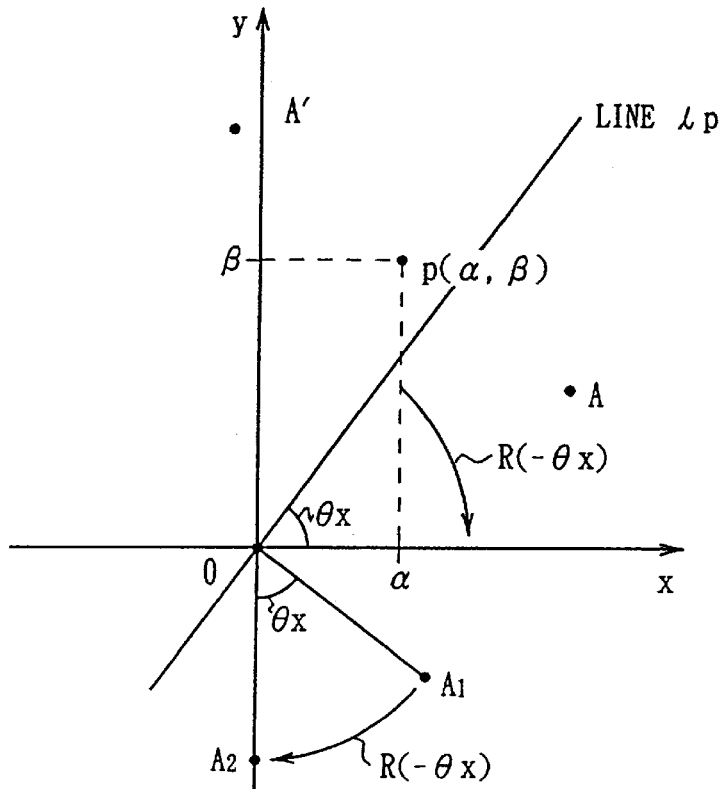
FIG. 18 is a schematic diagram for explaining two-dimensional line-symmetric transformation.
Figure 19:
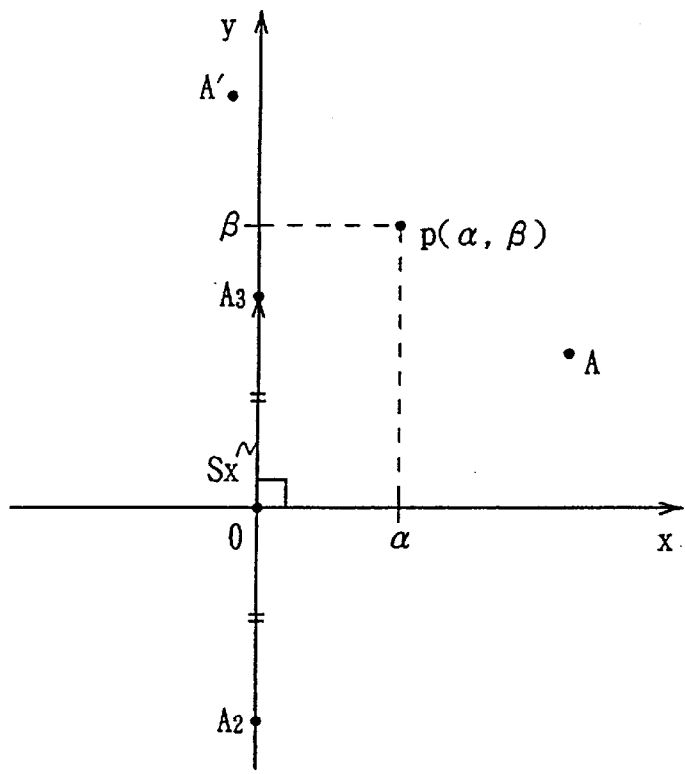
FIG. 19 is a schematic diagram for explaining two-dimensional line-symmetric transformation.
Figure 20:
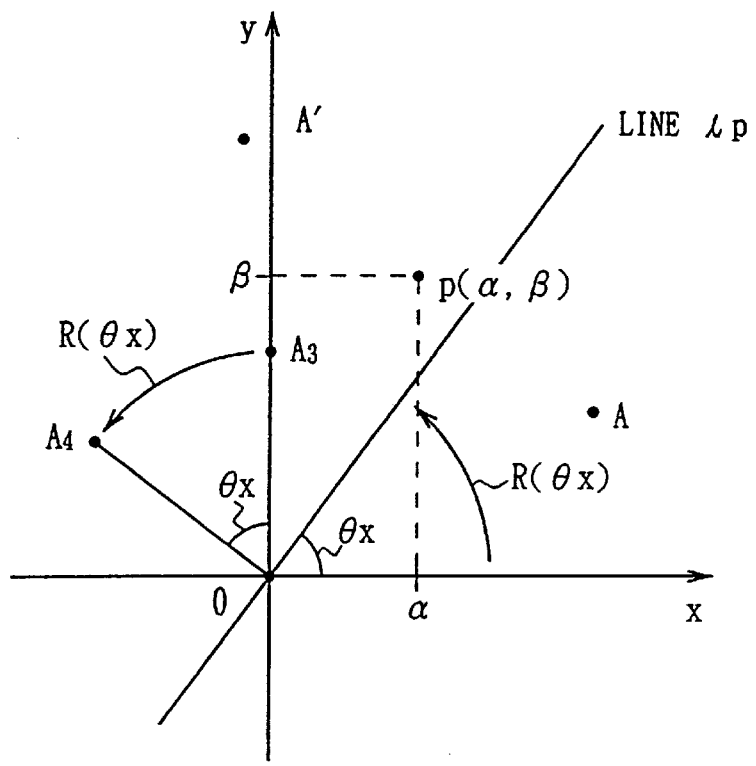
FIG. 20 is a schematic diagram for explaining two-dimensional line-symmetric transformation.
Figure 21:
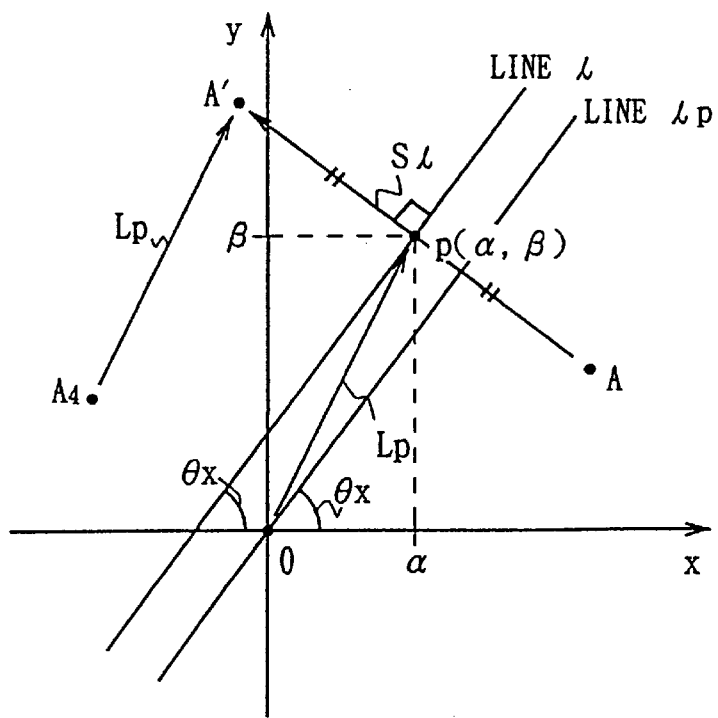
FIG. 21 is a schematic diagram for explaining two-dimensional line-symmetric transformation.

In this case, the two-dimensional line-symmetric transformation can be easily performed by the processing to be described below in general. That is, to obtain a point A' based on a line 1 passing through a point p ($\alpha$, $\beta$) and forming an angle px with x-axis, which is line-symmetric to an optional point A on the xy plane as shown in FIG. 16, a point $A_1$ is obtained by translating the point A so as to translate the line 1 so that the point p ($\alpha$, $\beta$) is superposed on the origin (0, 0) as shown in FIG. 17. Then, as shown in FIG. 18, a point $A_2$ is obtained by rotating the point $A_1$ clockwise about the origin by the angle $\theta x$ formed between a line 1p obtained by translating the line 1 so as to pass through the origin and x-axis (that is, by rotating the point $A_1$ by $-\theta x$). Then, as shown in FIG. 19, a point A line-symmetric to the point $A_2$ is obtained on the basis of x-axis. Then, as shown in FIG. 20, a point $A_4$ is obtained by rotating the point $A_3$ counterclockwise about the origin by the angle $\theta x$ (that is, by rotating the point $A_3$ by $+\theta x$ inversely to the above case). Then, as shown in FIG. 21, a point A' is obtained by translating the point $A_4$ through the processing reverse to the above case so as to translate the line 1p so that the origin (0, 0) is superposed on the point p. Thus, as shown in the following expression (61), it is possible to obtain the point A' line-symmetric to the optional point A by performing a series of these types of processing.

$$[A \to A'] = [A \xrightarrow{\text{Translation}} \quad (61)$$

$$A_1 \xrightarrow{\text{x-axis}} A_2 \xrightarrow{\text{Reverse symmetry}} A_3 \xrightarrow{\text{Inverse rotation}} A_4 \xrightarrow{\text{translation}} A']$$

These types of processing are specifically described below. First, as shown in FIG. 17, the point $A_1$ can be obtained from the point A by assuming the transformation matrix of translation from the origin (0, 0) to the point p ($\alpha$, $\beta$) as Lp and making the inverse matrix $Lp^{-1}$ of the transformation matrix work on the point A. The inverse matrix $Lp^{-1}$ of the transformation matrix from the origin. (0, 0) to the point p ($\alpha$, $\beta$) is shown by the following expression (62)

$$Lp^{-1} = \begin{bmatrix} 1 & 0 & 0 & 0 \\ 0 & 1 & 0 & 0 \\ 0 & 0 & 1 & 0 \\ -\alpha & -\beta & 0 & 1 \end{bmatrix} \quad (62)$$

Then, as shown in FIG. 18, the point $A_2$ can be obtained from the point $A_1$ by making a rotational transformation matrix R($-\theta x$) for rotating the point $A_1$ about the origin (0, 0) by $-\theta x$ work on the point $A_1$. The rotational transformation matrix R($-\theta x$) about the origin (0, 0) is shown by the following expression (63).

$$R(-\theta x) = \begin{bmatrix} \cos(-\theta x) & \sin(-\theta x) & 0 & 0 \\ -\sin(-\theta x) & \cos(-\theta x) & 0 & 0 \\ 0 & 0 & 1 & 0 \\ 0 & 0 & 0 & 1 \end{bmatrix} \quad (63)$$

Then, as shown in FIG. 19, the point $A_3$ can be obtained from the point $A_2$ by making a line-symmetric transformation matrix Sx based on x-axis work on the point $A_2$. The line-symmetric transformation matrix Sx based on x-axis is shown by the following expression (64).

$$Sx = \begin{bmatrix} 1 & 0 & 0 & 0 \\ 0 & -1 & 0 & 0 \\ 0 & 0 & 1 & 0 \\ 0 & 0 & 0 & 1 \end{bmatrix} \quad (64)$$

Then, as shown in FIG. 20, the point $A_4$ can be obtained from the point $A_3$ by making the rotational transformation matrix $R(\theta x)$ for rotating the point $A_3$ by $+\theta x$ about the origin $(0, 0)$ work on the point $A_3$. The rotational transformation matrix $R(\theta x)$ about the origin $(0, 0)$ is shown by the following expression (65).

$$R(\theta x) = \begin{bmatrix} \cos(\theta x) & \sin(\theta x) & 0 & 0 \\ -\sin(\theta x) & \cos(\theta x) & 0 & 0 \\ 0 & 0 & 1 & 0 \\ 0 & 0 & 0 & 1 \end{bmatrix} \quad (65)$$

Then, as shown in FIG. 21, the point A' can be obtained from the point $A_4$ by making the transformation matrix Lp of translation from the origin $(0, 0)$ to the point $p(\alpha, \beta)$ work on the point $A_4$. The transformation matrix Lp is shown by the following expression (66).

$$Lp = \begin{bmatrix} 1 & 0 & 0 & 0 \\ 0 & 1 & 0 & 0 \\ 0 & 0 & 1 & 0 \\ \alpha & \beta & 0 & 1 \end{bmatrix} \quad (66)$$

Therefore, the point A' line-symmetric to an optional point A can be obtained from the point A at a stroke by making a symmetric transformation matrix S1 obtained by multiplying these transformation matrixes $Lp^{-1}$, $R(-\theta x)$, $Sx$, $R(\theta x)$, and Lp in accordance with the processing sequence as shown by the following expression (67).

$$Sl = Lp^{-1} \cdot R(-\theta x) \cdot Sx \cdot R(\theta x) \cdot Lp \quad (67)$$

$$= \begin{bmatrix} 1 & 0 & 0 & 0 \\ 0 & 1 & 0 & 0 \\ 0 & 0 & 1 & 0 \\ -\alpha & -\beta & 0 & 1 \end{bmatrix} \cdot \begin{bmatrix} \cos(-\theta x) & \sin(-\theta x) & 0 & 0 \\ -\sin(-\theta x) & \cos(-\theta x) & 0 & 0 \\ 0 & 0 & 1 & 0 \\ 0 & 0 & 0 & 1 \end{bmatrix} \cdot$$

$$\begin{bmatrix} 1 & 0 & 0 & 0 \\ 0 & -1 & 0 & 0 \\ 0 & 0 & 1 & 0 \\ 0 & 0 & 0 & 1 \end{bmatrix} \cdot \begin{bmatrix} \cos(\theta x) & \sin(\theta x) & 0 & 0 \\ -\sin(\theta x) & \cos(\theta x) & 0 & 0 \\ 0 & 0 & 1 & 0 \\ 0 & 0 & 0 & 1 \end{bmatrix} \cdot$$

$$\begin{bmatrix} 1 & 0 & 0 & 0 \\ 0 & 1 & 0 & 0 \\ 0 & 0 & 1 & 0 \\ \alpha & \beta & 0 & 1 \end{bmatrix}$$

$$= \begin{bmatrix} \cos(2\theta x) & \sin(2\theta x) & 0 & 0 \\ \sin(2\theta x) & -\cos(2\theta x) & 0 & 0 \\ 0 & 0 & 1 & 0 \\ K\alpha & K\beta & 0 & 1 \end{bmatrix}$$

Where $$K\alpha = \alpha \cdot (1 - \cos(2\theta x)) - \beta \cdot \sin(2\theta x)$$

$$K\beta = -\alpha \cdot \sin(2\theta x) + \beta \cdot (1 + \cos(2\theta x))$$

The symmetric transformation matrix S1 is a matrix for obtaining a symmetric image line-symmetric to a main image. Therefore, the symmetric image can be obtained from the input source video signal $V_2$ by making the transformation matrix T used to obtain a main image from the source video signal $V_1$ and the symmetric transformation matrix S1 work on the source video signal $V_2$. That is by making the four-row four-column symmetric transformation matrix $T_{21}$ shown by the following expression (68) work on the source video signal $V_2$, the symmetric image can be obtained from the source video signal $V_2$.

$$T_{21} = T \cdot Sl \quad (68)$$

$$= T_0 \cdot P_0 \cdot Sl$$

$$= \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \cdot \begin{bmatrix} 1 & 0 & 0 & 0 \\ 0 & 1 & 0 & 0 \\ 0 & 0 & 0 & P_z \\ 0 & 0 & 0 & 1 \end{bmatrix} \cdot \begin{bmatrix} \cos(2\theta x) & \sin(2\theta x) & 0 & 0 \\ \sin(2\theta x) & -\cos(2\theta x) & 0 & 0 \\ 0 & 0 & 1 & 0 \\ K\alpha & K\beta & 0 & 1 \end{bmatrix}$$

$$= \begin{bmatrix} r_{11}\cos(2\theta x) + r_{12}\sin(2\theta x) + K\alpha r_{13} P_z & r_{11}\sin(2\theta x) - r_{12}\cos(2\theta x) + K\beta r_{13} P_z & r_{13} & r_{13} P_z \\ r_{21}\cos(2\theta x) + r_{22}\sin(2\theta x) + K\alpha r_{23} P_z & r_{21}\sin(2\theta x) - r_{22}\cos(2\theta x) + K\beta r_{23} P_z & r_{23} & r_{23} P_z \\ r_{31}\cos(2\theta x) + r_{32}\sin(2\theta x) + K\alpha r_{33} P_z & r_{31}\sin(2\theta x) - r_{32}\cos(2\theta x) + K\beta r_{33} P_z & r_{33} & r_{33} P_z \\ l_x\cos(2\theta x) + l_y\sin(2\theta x) + K\alpha(l_z P_z + s) & l_x\sin(2\theta x) - l_y\cos(2\theta x) + K\beta(l_z P_z + s) & l_x & l_z P_z + s \end{bmatrix}$$

Where $$K\alpha = \alpha \cdot (1 - \cos(2\theta x)) - \beta \cdot \sin(2\theta x)$$

$$K\beta = -\alpha \sin(2\theta x) + \beta \cdot (1 + \cos(2\theta x))$$

Also in the case of two-dimensional line symmetry, the source video signal $V_2$ and video signal $V_6$ to be handled are two-dimensional video data similarly to the case of two-dimensional point symmetry. Therefore, a parameter for computing the z-axis-directional data of the symmetric transformation matrix $T_{21}$ is not practically used. Therefore, the parameter of the third column and third row for computing the z-axis-directional data of the symmetric transformation matrix $T_{21}$ shown by the expression (68) is unnecessary.

That is, when assuming a symmetric transformation matrix actually required for the operation of a read address as $T_{21(33)}$, the symmetric transformation matrix $T_{21(33)}$ becomes a three-row three-column matrix excluding the third column and third row of the expression (68) and it is shown by the following expression (69).

$$T_{21(33)} = \begin{bmatrix} r_{11}\cos(2\theta x) + r_{12}\sin(2\theta x) + K\alpha r_{13}P_z & r_{11}\sin(2\theta x) - r_{12}\cos(2\theta x) + K\beta r_{13}P_z & r_{13}P_z \\ r_{21}\cos(2\theta x) + r_{22}\sin(2\theta x) + K\alpha r_{23}P_z & r_{21}\sin(2\theta x) - r_{22}\cos(2\theta x) + K\beta r_{23}P_z & r_{23}P_z \\ l_x\cos(2\theta x) + l_y\sin(2\theta x) + K\alpha(l_zP_z+s) & l_x\sin(2\theta x) - l_y\cos(2\theta x) + K\beta(l_zP_z+s) & l_zP_z+s \end{bmatrix} \quad (69)$$

Where $$K\alpha = \alpha \cdot (1-\cos(2\theta x)) - \beta \cdot \sin(2\theta x)$$
$$K\beta = -\alpha \cdot \sin(2\theta x) + \beta \cdot (1+\cos(2\theta x))$$

Moreover, in the case of two-dimensional line symmetry, image transformation is performed by the read processing from the frame memory 12A similarly to the case of two-dimensional point symmetry. Therefore, it is necessary to obtain a point on the frame memory 12A corresponding to a point on the monitor screen 16. Therefore, in fact, the inverse matrix $T_{21(33)}^{-1}$ of the symmetric transformation matrix $T_{21(33)}$ is necessary though the symmetric transformation matrix $T_{21(33)}$ is not necessary.

In this case, by setting the parameters of the symmetric transformation matrix $T_{21(33)}$ as shown in the expression (70), the inverse matrix $T_{21(33)}^{-1}$ is shown by the following expression (71).

$$T_{21(33)} = \begin{bmatrix} a'_{11} & a'_{12} & a'_{13} \\ a'_{21} & a'_{22} & a'_{23} \\ a'_{31} & a'_{32} & a'_{33} \end{bmatrix} \quad (70)$$

$$T_{21(33)}^{-1} = \begin{bmatrix} b'_{11} & b'_{12} & b'_{13} \\ b'_{21} & b'_{22} & b'_{23} \\ b'_{31} & b'_{32} & b'_{33} \end{bmatrix} \quad (71)$$

Where $$b_{ij} = \frac{a_{ji}}{\det(T_{21(33)})}$$

Thus, in the case of the special effect system 10, when two-dimensional line symmetry is designated by an operator as the symmetric mode of a symmetric image, the CPU 13 obtains the parameters $b_{11}'$ to $b_{33}'$ of the inverse matrix $T_{21(33)}^{-1}$ in accordance with a designated reference line and supplies the parameters $b_{11}'$ to $b_{33}'$ to the read address generation circuit 12C. The read address generation circuit 12C calculates the read address $(X_M', Y_M')$ of the frame memory 12A by using the parameters $b_{11}'$ to $b_{33}'$ for the symmetric transformation instead of the parameters $b_{11}$ to $b_{33}$ for the operation expressions shown in the above-described expressions (15) and (16). Thus, by reading the source video signal $V_2$ from the frame memory 12A in accordance with the read address $(X_M', Y_M')$, the special effect system 10 can obtain the video signal $V_6$ of a symmetric image two-dimensionally line-symmetric to a main image.

(3-4) Three-dimensional line symmetry

In this section, three-dimensional line symmetry is described. When a main image and a line serving as a symmetry yardstick are present in a three-dimensional space, it is possible to easily generate a symmetric image line-symmetric to the main image by performing three-dimensional line-symmetric transformation.

Figure 22:
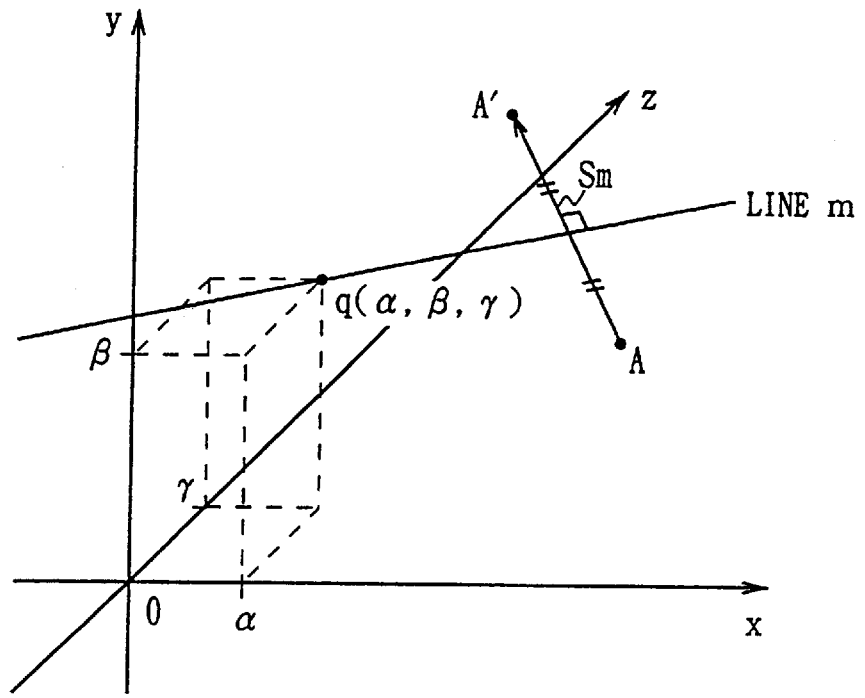
FIG. 22 is a schematic diagram for explaining three-dimensional line-symmetric transformation.
Figure 23:
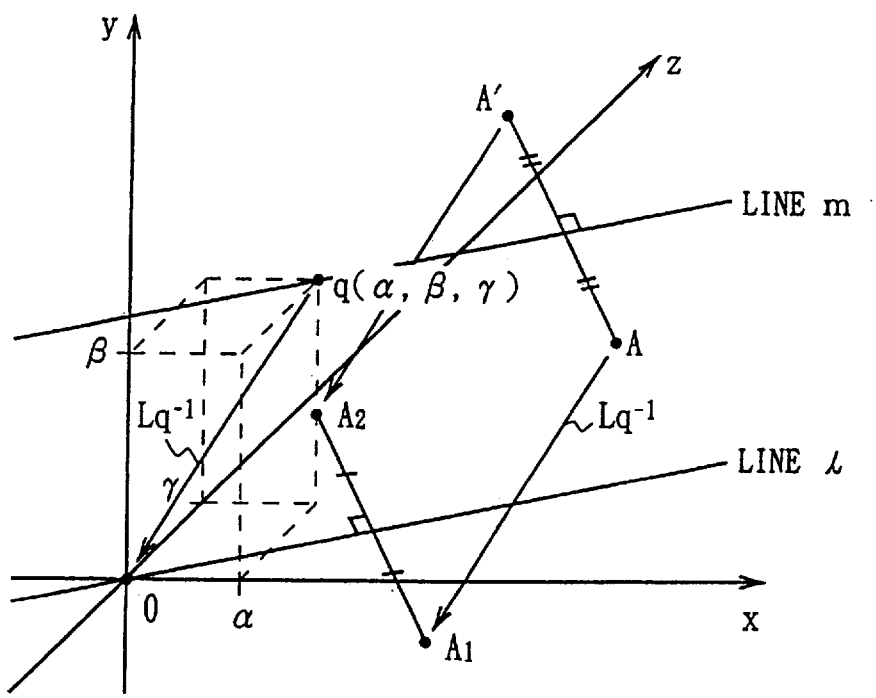
FIG. 23 is a schematic diagram for explaining three-dimensional line-symmetric transformation.
Figure 24:
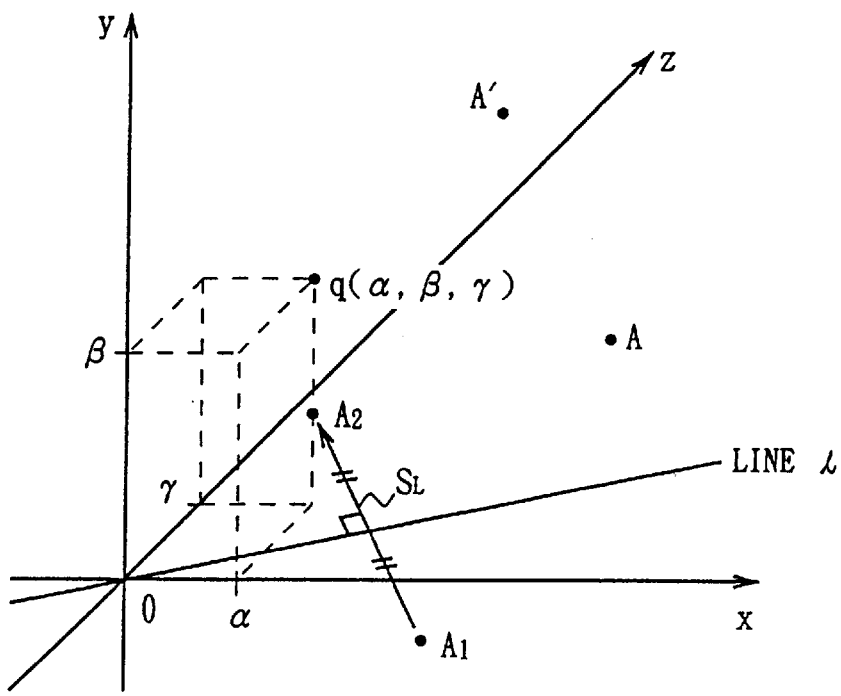
FIG. 24 is a schematic diagram for explaining three-dimensional line-symmetric transformation.
Figure 25:
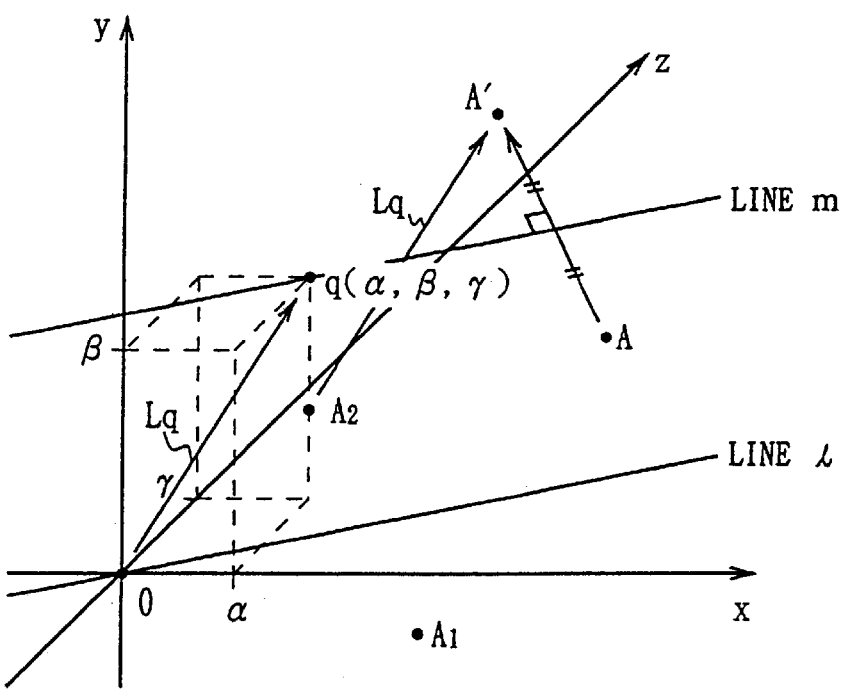
FIG. 25 is a schematic diagram for explaining three-dimensional line-symmetric transformation.

In this case, three-dimensional line-symmetric transformation can be easily performed in accordance with the processing described below in general. That is, to obtain a point A' based on a line m passing through a point q ($\alpha$, $\beta$, $\gamma$) and forming angles $\theta x$, $\theta y$, and $\theta z$ with x-axis, y-axis, and z-axis, which is line-symmetric to an optional point A in a three-dimensional space as shown in FIG. 22, the point A is translated so as to translate the line m so that the point q ($\alpha$, $\beta$, $\gamma$) is superposed on the origin (0, 0, 0) to obtain a point $A_1$ as shown in FIG. 23. Then, as shown in FIG. 24, a line-symmetric point $A_2$ based on a line 1 is obtained by translating the line m so as to pass through the origin. Then, as shown in FIG. 25, the point A' is obtained by translating the point $A_2$ by the processing reverse to the above processing so as to translate the line 1 so that the origin (0, 0, 0) is superposed on the point q. Thus, as shown by the following expression (72), the point A' line-symmetric to the optional point A can be obtained by performing the a series of the above types of processing.

$$[A \to A'] = [A \xrightarrow{\text{Translation}} A_1 \xrightarrow{\substack{\text{Line} \\ \text{symmetry}}} A_2 \xrightarrow{\substack{\text{Inverse} \\ \text{translation}}} A'] \quad (72)$$

Hereafter, these types of processing are specifically described. First, as shown in FIG. 23, the point $A_1$ can be obtained from the point A by assuming the transformation matrix of translation from the origin (0, 0, 0) to the point q ($\alpha$, $\beta$, $\gamma$) as Lq and making the inverse matrix $Lq^{-1}$ of the transformation matrix Lq work on the point A. The inverse matrix $Lq^{-1}$ of the transformation matrix Lq from the origin (0, 0, 0) to the point q ($\alpha$, $\beta$, $\gamma$) is shown by the following expression (73).

$$Lq^{-1} = \begin{bmatrix} 1 & 0 & 0 & 0 \\ 0 & 1 & 0 & 0 \\ 0 & 0 & 1 & 0 \\ -\alpha & -\beta & -\gamma & 1 \end{bmatrix} \quad (73)$$

Then, as shown in FIG. 24, the point $A_2$ can be obtained from the point $A_1$ about the line 1 obtained by translating the line m so as to pass through the origin and making a rotational transformation matrix $S_L$ for rotating the point $A_1$ by an angle $\pi$ work on the point $A_1$. In general, a rotational transformation matrix $R1(\theta)$ for rotating an object by an angle $\theta$ in a three-dimensional space about the line 1 passing through the origin and forming angles $\theta x$, $\theta y$, and $\theta z$ with x-axis, y-axis, and z-axis becomes a four-row four-column matrix and it is shown by the following expression (74).

$$Rl(\theta) = \begin{bmatrix} a^2 + (1-a^2)\cos(\theta) & ab(1-\cos\theta)+c\sin\theta & ac(1-\cos\theta)b - \sin\theta & 0 \\ ab(1-\cos\theta)-c\sin\theta & b^2 + (1-b^2)\cos(\theta) & bc(1-\cos\theta)+a\sin\theta & 0 \\ ac(1-\cos\theta)+b\sin\theta & bc(1-\cos\theta)-a\sin\theta & c^2 + (1-c^2)\cos(\theta) & 0 \\ 0 & 0 & 0 & 1 \end{bmatrix} \quad (74)$$

Where $a=\cos\theta x$, $b=\cos\theta y$, $c=\cos\theta z$

The rotational transformation matrix $S_L$ is transformation processing for rotating an object by an angle $\pi$ in a three-dimensional space about the line 1. Therefore, by substituting $\theta=\pi$ for the expression (74), the rotational transformation matrix $S_L$ is shown by the following expression (75).

$$S_L = Rl(\pi) \quad (75)$$

$$= \begin{bmatrix} 2a^2+1 & 2ab & 2ac & 0 \\ 2ab & 2b^2+1 & 2bc & 0 \\ 2ac & 2bc & 2c^2+1 & 0 \\ 0 & 0 & 0 & 1 \end{bmatrix}$$

Where $a=\cos\theta x$, $b=\cos\theta y$, $c=\cos\theta z$

Then, as shown in FIG. 25, the point A' can be obtained from the point $A_2$ by making the transformation matrix Lq of translation from the origin (0, 0, 0) to the point q ($\alpha$, $\beta$, $\gamma$) work on the point $A_2$. The transformation matrix Lq is shown by the following expression (76).

$$Lq = \begin{bmatrix} 1 & 0 & 0 & 0 \\ 0 & 1 & 0 & 0 \\ 0 & 0 & 1 & 0 \\ \alpha & \beta & \gamma & 1 \end{bmatrix} \quad (76)$$

Therefore, the line-symmetric point A' can be obtained from the point A at a stroke by making the symmetric transformation matrix S1 obtained by multiplying these transformation matrixes $Lq^{-1}$, $S_L$, and Lq in accordance with the processing sequence work on the point A as shown by the following expression (77).

$$Sl = Lq^{-1} \cdot S_L \cdot Lq \quad (77)$$

$$= \begin{bmatrix} 1 & 0 & 0 & 0 \\ 0 & 1 & 0 & 0 \\ 0 & 0 & 1 & 0 \\ -\alpha & -\beta & -\gamma & 1 \end{bmatrix} \cdot \begin{bmatrix} 2a^2+1 & 2ab & 2ac & 0 \\ 2ab & 2b^2+1 & 2bc & 0 \\ 2ac & 2bc & 2c^2+1 & 0 \\ 0 & 0 & 0 & 1 \end{bmatrix} \cdot$$

$$\begin{bmatrix} 1 & 0 & 0 & 0 \\ 0 & 1 & 0 & 0 \\ 0 & 0 & 1 & 0 \\ \alpha & \beta & \gamma & 1 \end{bmatrix}$$

$$= \begin{bmatrix} 2a^2+1 & 2ab & 2ac & 0 \\ 2ab & 2b^2+1 & 2bc & 0 \\ 2ac & 2bc & 2c^2+1 & 0 \\ K_x & K_y & K_z & 1 \end{bmatrix}$$

Where $K_x = -2a(\alpha a + \beta b + \gamma c)$ $K_y = -2b(\alpha a + \beta b + \gamma c)$ $K_z = -2c(\alpha a + \beta b + \gamma c)$ $a=\cos\theta x$, $b=\cos\theta y$, $c=\cos\theta z$ The symmetric transformation matrix S1 is a matrix for obtaining a symmetric image line-symmetric to a main image. Therefore, a symmetric image can be obtained from the input source video signal $V_2$ by making the transformation matrix T (comprising $T_0$ and $P_0$) used to obtain a main image from the source video signal $V_1$ and the symmetric transformation matrix S1 work on the source video signal $V_2$. That is, a symmetric image can be obtained from the source video signal $V_2$ by making the four-row four-column symmetric transformation matrix $T_{31}$ shown by the following expression (78) work on the source video signal $V_2$.

$$T_{31} = T_0 \cdot Sl \cdot P_0 \quad (78)$$

$$= \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \cdot \begin{bmatrix} 2a^2+1 & 2ab & 2ac & 0 \\ 2ab & 2b^2+1 & 2bc & 0 \\ 2ac & 2bc & 2c^2+1 & 0 \\ K_x & K_y & K_z & 1 \end{bmatrix} \cdot \begin{bmatrix} 1 & 0 & 0 & 0 \\ 0 & 1 & 0 & 0 \\ 0 & 0 & 0 & P_z \\ 0 & 0 & 0 & 1 \end{bmatrix}$$

$$= \begin{bmatrix} r_{11}(2a^2+1)+2abr_{12}+2acr_{13} & 2abr_{11}+r_{12}(2b^2+1)+2bcr_{13} & 0 & P_z[2acr_{11}+2bcr_{12}+r_{13}(2c^2+1)] \\ r_{21}(2a^2+1)+2abr_{22}+2acr_{23} & 2abr_{21}+r_{22}(2b^2+1)+2bcr_{23} & 0 & P_z[2acr_{21}+2bcr_{22}+r_{23}(2c^2+1)] \\ r_{31}(2a^2+1)+2abr_{32}+2acr_{33} & 2abr_{31}+r_{32}(2b^2+1)+2bcr_{33} & 0 & P_z[2acr_{31}+2bcr_{32}+r_{33}(2c^2+1)] \\ l_x(2a^2+1)+2abl_y+2acl_z+K_xs & 2abl_x+l_y(2b^2+1)+2bcl_z+K_ys & 0 & P_z[2acl_x+2bcl_y+l_z(2c^2+1)+K_zs] \end{bmatrix}$$

Where $$K_x = -2a(\alpha a + \beta b + \gamma c)$$

$$K_y = -2b(\alpha a + \beta b + \gamma c)$$

$$K_z = -2c(\alpha a + \beta b + \gamma c)$$

$a = \cos\theta x, b = \cos\theta y, c = \cos\theta z$

In the case of three-dimensional line symmetry, the source video signal $V_2$ and video signal $V_6$ to be handled are two-dimensional data similarly to the case of two-dimensional line symmetry. Therefore, a parameter for computing z-axis-directional data of the symmetric transformation matrix $T_{31}$ is not practically used. Therefore, the parameter of third column and third row for computing z-axis-directional data of the symmetric transformation matrix $T_{31}$ shown by the expression (78) is unnecessary.

That is, when assuming a symmetric transformation matrix actually required for the operation of a read address as $T_{31(33)}$, the symmetric transformation matrix $T_{31(33)}$ becomes a three-row three-column matrix excluding the third column and third row of the expression (78) and it is shown by the following expression (79).

$$T_{31(33)} = \begin{bmatrix} r_{11}(2a^2+1)+2abr_{12}+2acr_{13} & 2abr_{11}+r_{12}(2b^2+1)+2bcr_{13} & P_z[2acr_{11}+2bcr_{12}+r_{13}(2c^2+1)] \\ r_{21}(2a^2+1)+2abr_{22}+2acr_{23} & 2abr_{21}+r_{22}(2b^2+1)+2bcr_{23} & P_z[2acr_{21}+2bcr_{22}+r_{23}(2c^2+1)] \\ l_x(2a^2+1)+2abl_y+2acl_z+K_xs & 2abl_x+l_y(2b^2+1)+2bcl_z+K_ys & P_z[2acl_x+2bcl_y+l_z(2c^2+1)+K_zs] \end{bmatrix} \quad (79)$$

where $$K_x = -2a(\alpha a + \beta b + \gamma c)$$

$$K_y = -2b(\alpha a + \beta b + \gamma c)$$

$$K_z = -2c(\alpha a + \beta b + \gamma c)$$

$a = \cos\theta x, b = \cos\theta y, c = \cos\theta z$

Moreover, in the case of three-dimensional line symmetry, image transformation is performed in accordance with the read processing from the frame memory 12A similarly to the case of two-dimensional line symmetry. Therefore, it is necessary to obtain a point on the frame memory 12A corresponding to a point on the monitor screen 16. Therefore, in fact, the symmetric transformation matrix $T_{31(33)}$ is not necessary but the inverse matrix $T_{31(33)}^{-1}$ of the symmetric transformation matrix $T_{31(33)}$ is necessary.

In this case, by setting the parameters of the symmetric transformation matrix $T_{31(33)}$ as shown in the following expression (80), the inverse matrix $T_{31(33)}^{-1}$ of the symmetric transformation matrix $T_{31(33)}$ is shown by the following expression (81).

$$T_{31(33)} = \begin{bmatrix} a'_{11} & a'_{12} & a'_{13} \\ a'_{21} & a'_{22} & a'_{23} \\ a'_{31} & a'_{32} & a'_{33} \end{bmatrix} \quad (80)$$

$$T_{31(33)}^{-1} = \begin{bmatrix} b'_{11} & b'_{12} & b'_{13} \\ b'_{21} & b'_{22} & b'_{23} \\ b'_{31} & b'_{32} & b'_{33} \end{bmatrix} \quad (81)$$

Where $$b_{ij} = \frac{a_{ji}}{\det(T_{31(33)})}$$

Thus, in the case of the special effect system 10, when three-dimensional line symmetry is designated by an operator as the symmetric mode of a symmetric image, the CPU 13 obtains the parameters $b_{11}'$ to $b_{33}'$ of the inverse matrix $T_{31(33)}^{-1}$ in accordance with a designated reference line and supplies the parameters $b_{11}'$ to $b_{33}'$ to the read address generation circuit 12C. The read address generation circuit 12C calculates the read address $(X_M', Y_M')$ of the frame memory 12A by using the parameters $b_{11}'$ to $b_{33}'$ for the symmetric transformation instead of the parameters $b_{11}$ to $b_{33}$ of the operation expressions shown in the expressions (15) and (16). Thus, by reading the source video signal $V_2$ from the frame memory 12A in accordance with the read address $(X_M', Y_M')$, the special effect system 10 can obtain the video signal $V_6$ of a symmetric image three-dimensionally line-symmetric to a main image.

(3-5) Plane symmetry

In this section, plane symmetry is described. When a main image and a plane serving as a symmetry yardstick are present in a three-dimensional space, it is possible to easily generate a symmetric image plane-symmetric to the main image by performing plane symmetric transformation.

Figure 26:
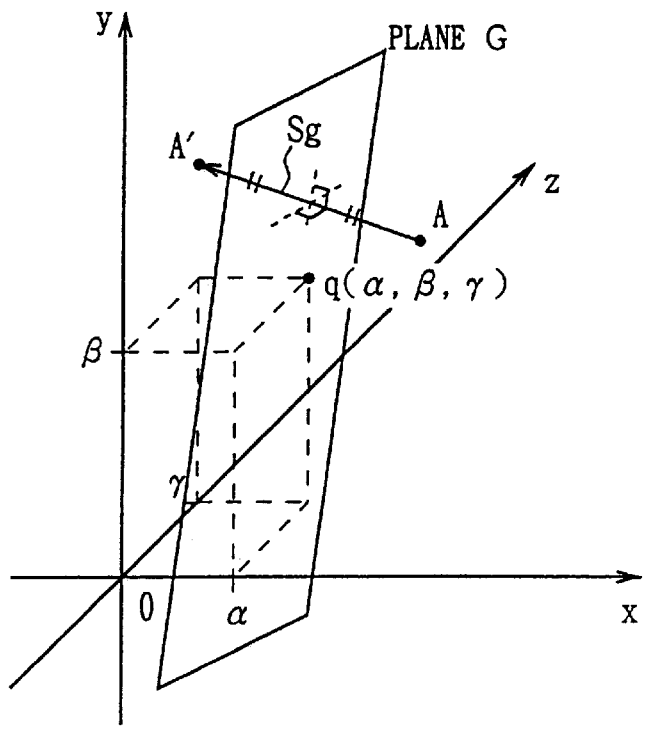
FIG. 26 is a schematic diagram for explaining plane-symmetric transformation.
Figure 28:
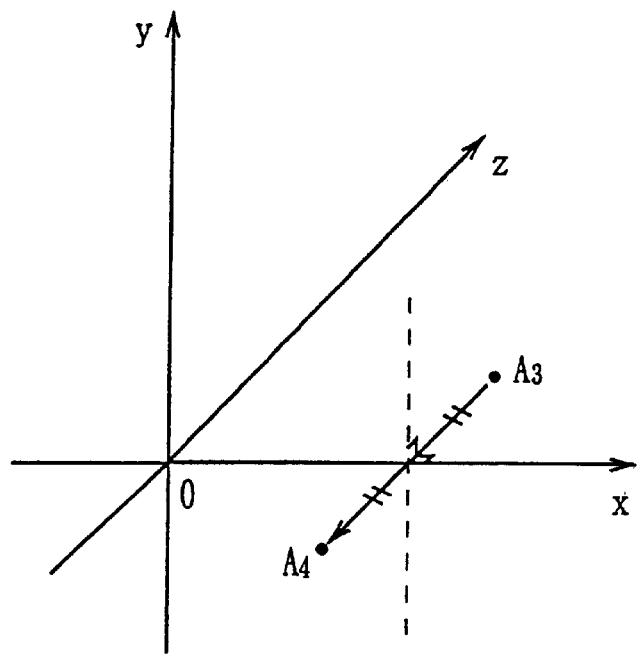
FIG. 28 is a schematic diagram for explaining plane-symmetric transformation.
Figure 29:
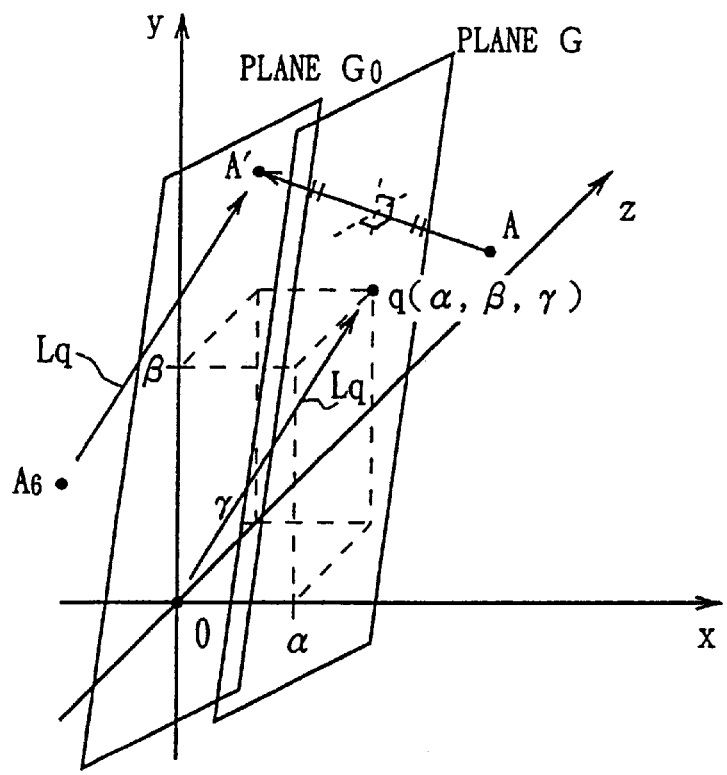
FIG. 29 is a schematic diagram for explaining plane-symmetric transformation.

In this case, the plane symmetric transformation can be easily performed by the processing described below in general. That is, as shown in FIG. 26, to obtain a point A' plane-symmetric to an optional point A in a three-dimensional space, which is based on a plane G passing through a point q ($\alpha$, $\beta$, $\gamma$) and whose normal vector has angles $\theta x$, $\theta y$, and $\theta z$ formed with x-axis, y-axis, and z-axis, a point $A_1$ is obtained by translating the point A so as to translate the plane G so that the point q ($\alpha$, $\beta$, $\gamma$) is superposed on the origin (0, 0, 0). Then, as shown in FIG. 28, a point $A_3$ present in a three-dimensional space is obtained by applying the processing same as the processing for rotating a plane $G_0$ obtained by translating the plane G so as to pass through the origin so that the plane $G_0$ is superposed on the xy plane to the point $A_1$. Then, as shown in FIG. 28, a point $A_4$ plane-symmetric to the point $A_3$ is obtained on the basis of the xy plane. Then, as shown in FIG. 29, a point $A_6$ present in a three-dimensional space is obtained by applying to the point $A_4$ the rotation processing for returning the plane $G_0$ superposed on the xy plane to its original position. Then, the point A' is obtained by translating the point $A_6$ so as to translate the plane $G_0$ so that the origin (0, 0, 0) is superposed on the point q (that is, so as to return the plane $G_0$ to the plane G).

In this connection, the processing for superposing the plane $G_0$ on the xy plane is executed by rotating the plane $G_0$ up to a predetermined angle about x-axis and thereafter rotating it up to a predetermined angle about y-axis. Therefore, the point $A_3$ is obtained from the point $A_1$ by applying the processing for rotating the point $A_1$ about x-axis to the point $A_1$ to obtain the point $A_2$ and thereafter, rotating the point $A_2$ about y-axis. Moreover, similarly, the processing for returning the plane $G_0$ superposed on the xy plane to its original position is executed by reversing the plane $G_0$ on the xy plane about y-axis and thereafter reversing the plane $G_0$ about x-axis. Therefore, the point $A_6$ is obtained from the point $A_4$ by first applying the processing for reversing the point $A_4$ about y-axis to the point $A_4$ to obtain a point $A_5$ about y-axis and thereafter reversing the point $A_5$ about x-axis.

Thus, the above types of processing are arranged as shown by the following expression (82).

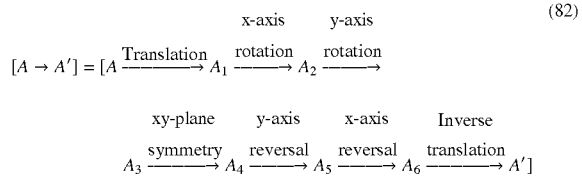

(82)

$$[A \to A'] = [A \xrightarrow{\text{Translation}} A_1 \xrightarrow{\text{x-axis rotation}} A_2 \xrightarrow{\text{y-axis rotation}}$$
$$A_3 \xrightarrow{\text{xy-plane symmetry}} A_4 \xrightarrow{\text{y-axis reversal}} A_5 \xrightarrow{\text{x-axis reversal}} A_6 \xrightarrow{\text{Inverse translation}} A']$$

By performing a series of the types of processing shown by the expression (82), the point A' plane-symmetric to the optional point A can be obtained.

Figure 27:
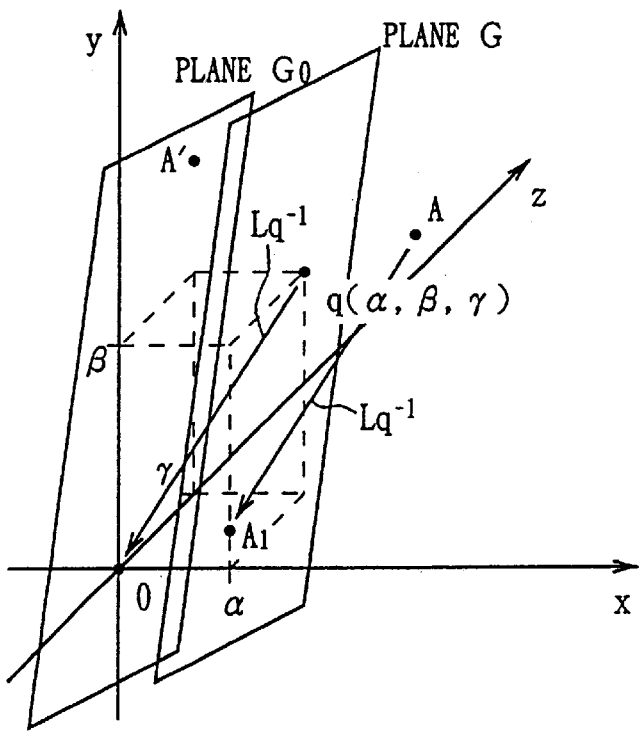
FIG. 27 is a schematic diagram for explaining plane-symmetric transformation.

These types of processing are specifically described below. First, as shown in FIG. 27, the point $A_1$ can be obtained from the point A by assuming a transformation matrix of translation from the origin (0, 0, 0) to the point q ($\alpha$, $\beta$, $\gamma$) as Lq and making the inverse matrix $Lq^{-1}$ of the transformation matrix Lq work on the point A. The inverse matrix $Lq^{-1}$ of the transformation matrix Lq from the origin (0, 0, 0) to the point q ($\alpha$, $\beta$, $\gamma$) is shown by the following expression (83).

$$Lq^{-1} = \begin{bmatrix} 1 & 0 & 0 & 0 \\ 0 & 1 & 0 & 0 \\ 0 & 0 & 1 & 0 \\ -\alpha & -\beta & -\gamma & 1 \end{bmatrix} \quad (83)$$

Next, the process for obtaining the point $A_3$ from the point $A_1$ is described below. First, in the processing until obtaining the point $A_3$, the rotation processing about x-axis and the rotation processing about y-axis are performed. A rotational transformation matrix $Rx(\delta x)$ for the rotation processing about x-axis is shown by the following expression (84) by assuming a rotation angle $\delta x$ and substituting a=1 and b=c=0 for the above expression (74).

$$Rx(\delta x) = \begin{bmatrix} 1 & 0 & 0 & 0 \\ 0 & \cos \delta x & \sin \delta x & 0 \\ 0 & -\sin \delta x & \cos \delta x & 0 \\ 0 & 0 & 0 & 1 \end{bmatrix} \quad (84)$$

Moreover, a rotational transformation matrix $Ry(\delta y)$ for the rotation processing about y-axis is shown by the following expression (85) by assuming a rotation angle as $\delta y$ and substituting a=c=0 and b=1 for the expression (74).

$$Ry(\delta y) = \begin{bmatrix} \cos \delta y & 0 & -\sin \delta y & 0 \\ 0 & 1 & 0 & 0 \\ \sin \delta y & 0 & \cos \delta y & 0 \\ 0 & 0 & 0 & 1 \end{bmatrix} \quad (85)$$

The rotation angle for rotation about x-axis and y-axis is described below. First, it is assumed that the normal vector of the plane G is g=(a, b, c). When the normal vector of the plane G is g, the normal vector of the plane $G_0$ translated in a three-dimensional space has the same vector g. Because the normal vector g is a vector vertical to the planes G and $G_0$, it is possible to superpose the plane $G_0$ on the xy plane and obtain the point $A_3$ by rotating the plane $G_0$ about x-axis and y-axis so that the normal vector g becomes parallel with z-axis. Therefore, it is possible to determine a rotation angle in accordance with the normal vector g.

First, because the normal vector g forms angles $\theta x$, $\theta y$, and $\theta z$ with x-axis, y-axis and z-axis, the relation shown by the following expressions (86) is obtained.

$$a=\cos\theta x, \ b=\cos\theta y, \ c=\cos\theta z \quad (86)$$

Figure 30:
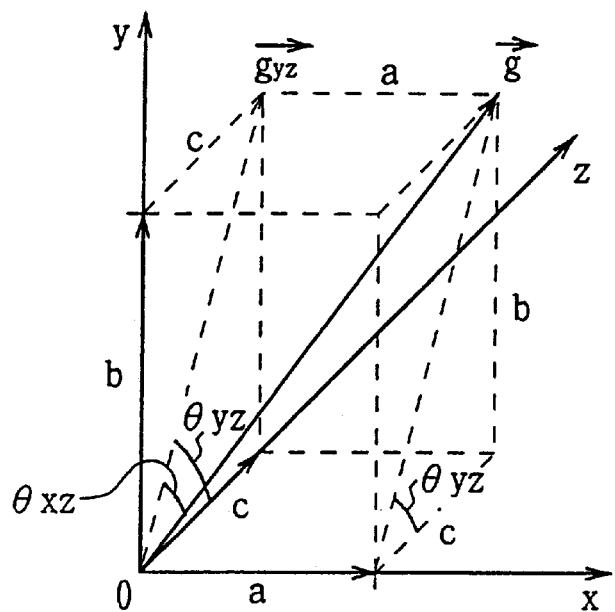
FIG. 30 is a schematic diagram for explaining plane-symmetric transformation.

As shown in FIG. 30, when assuming a vector obtained by projecting the normal vector g on the yz plane as gyz, the angle formed between the vector gyz and z-axis as $\theta yz$, and an angle formed between the vector gyz and vector g as $\theta xz$, the angles $\theta yz$ and $\theta xz$ are shown by the following expressions (87) and (88) respectively.

$$\theta yz = \tan^{-1}(b/c) \quad (87)$$

$$\theta xz = \tan^{-1}[a/\sqrt{(b^2+c^2)}] \quad (88)$$

Moreover, by substituting the value of the expression (86) for the expressions (87) and (88), the angles $\theta yz$ and $\theta xz$ are transformed as shown by the following expressions (89) and (90).

$$\theta yz = \tan^{-1}(\cos \theta y / \cos \theta z) \quad (89)$$

$$\theta xz = \tan^{-1}[\cos\theta x/\sqrt{(\cos^2\theta y + \cos^2\theta z)}] \quad (90)$$

By rotating the normal vector g about x-axis by the angle $\theta yz$ obtained for the yz plane and moreover rotating it about y-axis by the angle $\theta xz$ obtained for the xz plane, the normal vector g is transformed into a vector parallel with z-axis while keeping its magnitude. That is, by performing these types of processing for the plane $G_0$, the plane $G_0$ is superposed on a passing through the origin and with the normal vector parallel 18 z-axis, that is, the xy plane.

Figure 31:
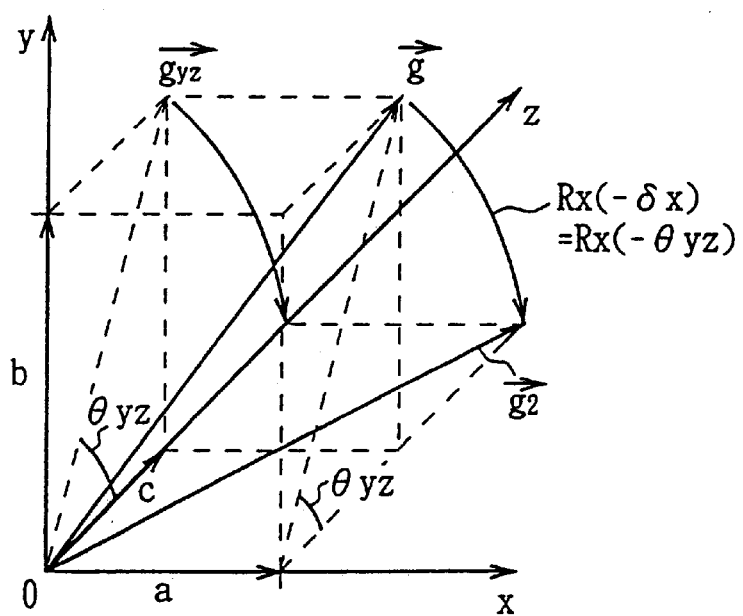
FIG. 31 is a schematic diagram for explaining plane-symmetric transformation.

Therefore, by making the rotational transformation matrix $Rx(-\delta x)$ obtained by substituting $-\delta x$ comprising $\delta x = \theta yz$ for the expression (84) work on the normal vector g as shown in the following expression (91), the component in the y-axis direction becomes "0" and the normal vector g is transformed into a vector $g_2$ on the xz plane as shown in FIG. 31. Therefore, by making the rotational transformation matrix Rx ($-\delta x$) work on the point $A_1$, it is possible to obtain the point $A_2$ from the point $A_1$.

$$Rx(-\delta x) = \begin{bmatrix} 1 & 0 & 0 & 0 \\ 0 & \cos \delta x & -\sin \delta x & 0 \\ 0 & \sin \delta x & \cos \delta x & 0 \\ 0 & 0 & 0 & 1 \end{bmatrix} \quad (91)$$

Figure 32:
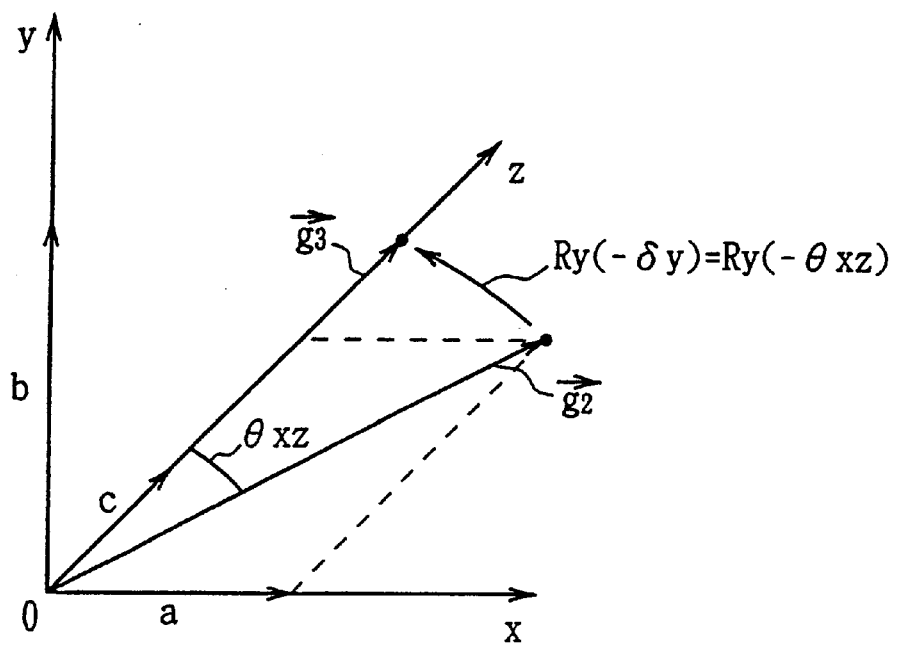
FIG. 32 is a schematic diagram for explaining plane-symmetric transformation.

Similarly, by making the rotational transformation matrix $Ry(-\delta y)$ obtained by substituting $-\delta y$ comprising $\delta y = \theta xz$ for the expression (85) work on the vector $g_2$ as shown by the following expression (92), the component in the x-axis direction becomes "0" and the vector $g_2$ on the xz plane is transformed into a vector $g_3$ parallel with z-axis as shown in FIG. 32. Therefore, by making the rotational transformation matrix $Ry(-\delta y)$ work on the point $A_2$, it is possible to obtain the point $A_3$ from the point $A_2$.

$$Ry(-\delta y) = \begin{bmatrix} \cos \delta y & 0 & \sin \delta y & 0 \\ 0 & 1 & 0 & 0 \\ -\sin \delta y & 0 & \cos \delta y & 0 \\ 0 & 0 & 0 & 1 \end{bmatrix} \quad (92)$$

Then, a point $A_4$ can be obtained from the point $A_3$ thus obtained by applying the plane-symmetric transformation related to the xy plane to the point $A_3$. In this case, the plane-symmetric transformation related to the xy plane can be performed by reversing the code of the value of the z coordinate. Therefore, the transformation matrix $S_{xy}$ of the plane-symmetric transformation is shown by the following expression (93).

$$S_{xy} = \begin{bmatrix} 1 & 0 & 0 & 0 \\ 0 & 1 & 0 & 0 \\ 0 & 0 & -1 & 0 \\ 0 & 0 & 0 & 1 \end{bmatrix} \quad (93)$$

Figure 33:
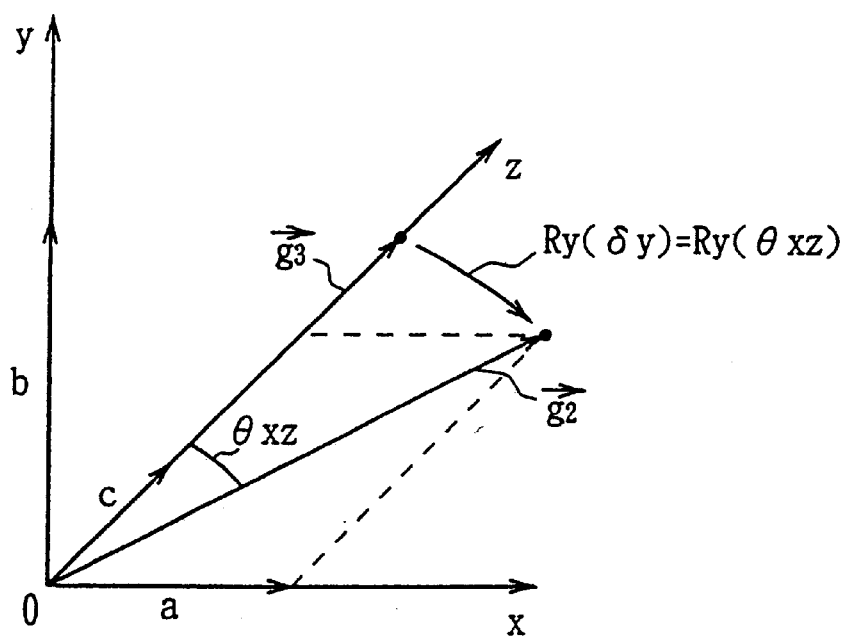
FIG. 33 is a schematic diagram for explaining plane-symmetric transformation.

Then, a point $A_5$ can be obtained from the point $A_4$ obtained by making the plane-symmetric transformation matrix $S_{xy}$ work on the point $A_4$ by rotating the point $A_4$ about y-axis by an angle (+δy) opposite to the case of the above rotation processing. That is, by making the rotational transformation matrix Ry(δy) obtained by substituting δy comprising δy=θxz for the expression (85) work as shown by the following expression (94), the vector $g_3$ parallel with z-axis is returned to the vector $g_2$ as shown in FIG. 33. Therefore, by making the rotational transformation matrix Ry(δy) work on the point $A_4$, it is possible to obtain the point $A_5$ from the point $A_4$.

$$Ry(\delta y) = \begin{bmatrix} \cos\delta y & 0 & -\sin\delta y & 0 \\ 0 & 1 & 0 & 0 \\ \sin\delta y & 0 & \cos\delta y & 0 \\ 0 & 0 & 0 & 1 \end{bmatrix} \quad (94)$$

where $$\delta y = \theta xz = \tan^{-1}[\cos\theta x / \sqrt{(\cos^2\theta y + \cos^2\theta z)}]$$

Figure 34:
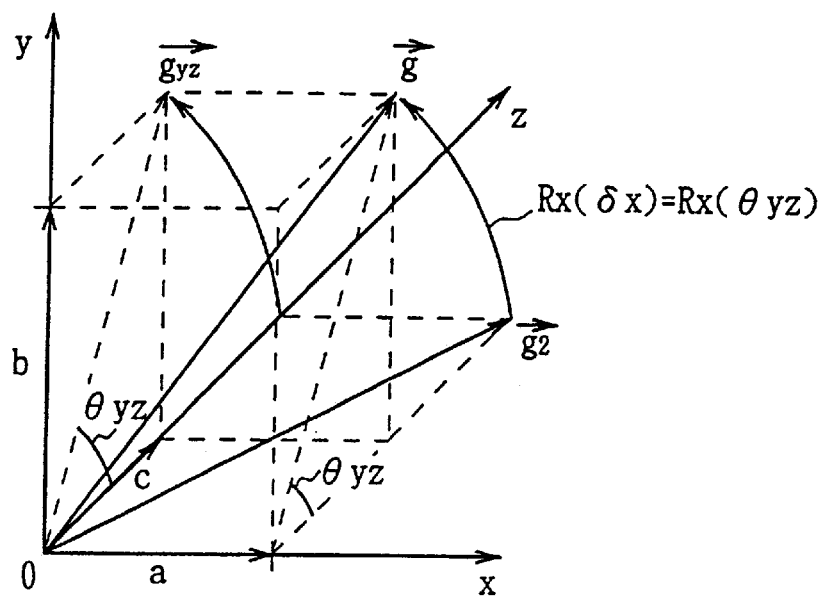
FIG. 34 is a schematic diagram for explaining plane-symmetric transformation.

Then, a point $A_6$ can be obtained from the point $A_5$ by rotating the point $A_5$ about x-axis by an angle (+δx) opposite to the case of the above rotation processing. That is, by making the rotational transformation matrix Rx(δx) obtained by substituting δx comprising δx=θyz for the expression (84) work as shown by the following expression (95), the vector $g_2$ on the xz plane is returned to the normal vector g as shown in FIG. 34. Therefore, by making the rotational transformation matrix Rx(δx) work on the point $A_5$, it is possible to obtain the point $A_6$ from the point $A_5$.

$$Rx(\delta x) = \begin{bmatrix} 1 & 0 & 0 & 0 \\ 0 & \cos\delta x & \sin\delta x & 0 \\ 0 & -\sin\delta x & \cos\delta x & 0 \\ 0 & 0 & 0 & 1 \end{bmatrix} \quad (95)$$

where $$\delta x = \theta yz = \tan^{-1}(\cos\theta y / \cos\theta z)$$

Finally, a point A' can be obtained from the point $A_6$ thus obtained by making the transformation matrix Lq for translation from the origin (0, 0, 0) to the point q (α, β, γ) work on the point $A_6$. The transformation matrix Lq is shown by the following expression (96).

$$Lq = \begin{bmatrix} 1 & 0 & 0 & 0 \\ 0 & 1 & 0 & 0 \\ 0 & 0 & 1 & 0 \\ \alpha & \beta & \gamma & 1 \end{bmatrix} \quad (96)$$

Thus, the point A' plane-symmetric to an optional pint A can be obtained from the point A at a stroke by making a symmetric transformation matrix Sg obtained by multiplying these transformation matrixes $Lq^{-1}$, Rx(-δx), Ry(-δy), $S_{xy}$, Ry(δy), Rx(δx) and Lq in accordance with the processing sequence work on the point A.

$$Sg = Lq^{-1} \cdot Rx(-\delta x) \cdot Ry(-\delta y) \cdot S_{xy} \cdot Ry(\delta y) \cdot Rx(\delta x) \cdot Lq \quad (97)$$

$$= \begin{bmatrix} 1 & 0 & 0 & 0 \\ 0 & 1 & 0 & 0 \\ 0 & 0 & 1 & 0 \\ -\alpha & -\beta & -\gamma & 1 \end{bmatrix} \cdot \begin{bmatrix} 1 & 0 & 0 & 0 \\ 0 & \cos\delta x & -\sin\delta x & 0 \\ 0 & \sin\delta x & \cos\delta x & 0 \\ 0 & 0 & 0 & 1 \end{bmatrix} \cdot$$

$$\begin{bmatrix} \cos\delta y & 0 & -\sin\delta y & 0 \\ 0 & 1 & 0 & 0 \\ \sin\delta y & 0 & \cos\delta y & 0 \\ 0 & 0 & 0 & 1 \end{bmatrix} \begin{bmatrix} 1 & 0 & 0 & 0 \\ 0 & 1 & 0 & 0 \\ 0 & 0 & -1 & 0 \\ 0 & 0 & 0 & 1 \end{bmatrix} \begin{bmatrix} \cos\delta y & 0 & -\sin\delta y & 0 \\ 0 & 1 & 0 & 0 \\ \sin\delta y & 0 & \cos\delta y & 0 \\ 0 & 0 & 0 & 1 \end{bmatrix} \cdot$$

$$\begin{bmatrix} 1 & 0 & 0 & 0 \\ 0 & \cos\delta x & \sin\delta x & 0 \\ 0 & -\sin\delta x & \cos\delta x & 0 \\ 0 & 0 & 0 & 1 \end{bmatrix} \cdot \begin{bmatrix} 1 & 0 & 0 & 0 \\ 0 & 1 & 0 & 0 \\ 0 & 0 & 1 & 0 \\ \alpha & \beta & \gamma & 1 \end{bmatrix}$$

$$= \begin{bmatrix} \cos 2\delta y & \sin\delta x \cdot \sin 2\delta y & -\cos\delta x \cdot \sin 2\delta y & 0 \\ \sin\delta x \cdot \sin 2\delta y & 1 - 2(\sin\delta x \cdot \cos\delta y)^2 & \sin 2\delta x \cdot \cos^2\delta y & 0 \\ -\cos\delta x \cdot \sin 2\delta y & \sin 2\delta x \cdot \cos^2\delta y & 1 - 2(\cos\delta x \cdot \cos\delta y)^2 & 0 \\ Kx & Ky & Kz & 1 \end{bmatrix}$$

Where $Kx = 2\alpha\sin^2\delta y - (\beta\sin\delta x - \cos\delta x)\cdot\sin 2\delta y$ $Ky = -\alpha\sin\delta x\cdot\sin 2\delta y + (2\beta\sin^2\delta x - \gamma\sin 2\delta x)\cdot\cos^2\delta y$ $Kz = \alpha\cos\delta x\cdot\sin 2\delta y - (\beta\sin 2\delta x - 2\gamma\cos^2\delta x)\cdot\cos^2\delta y$ $\delta x = \theta yz = \tan^{-1}(\cos \theta y / \cos \theta z)$ $\delta y = \theta xz = \tan^{-1}[\cos \theta x / \sqrt{(\cos^2 \theta y + \cos^2 \theta z)}]$ The symmetric transformation matrix Sg is a matrix for obtaining a symmetric image plane-symmetric to a main image. Therefore, a symmetric image can be obtained from the input source video signal $V_2$ by making the transformation matrix T (comprising $T_0$ and $P_0$) used to obtain a main image from the source video signal $V_1$ and the symmetric transformation matrix Sg work on the source video signal $V_2$. That is, by making a four-row four-column symmetric transformation matrix $T_{3g}$ shown by the following expression (98) work on the source video signal $V_2$.

$$T_{3g} = T_0 \cdot Sg \cdot P_0 \tag{98}$$

$$= \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \cdot \begin{bmatrix} \cos 2\delta y & \sin\delta x \cdot \sin 2\delta y & -\cos\delta x \cdot \sin 2\delta y & 0 \\ \sin\delta x \cdot \sin 2\delta y & 1 - 2(\sin\delta x \cdot \cos\delta y)^2 & \sin 2\delta x \cdot \cos^2\delta y & 0 \\ -\cos\delta x \cdot \sin 2\delta y & \sin 2\delta x \cdot \cos^2\delta y & 1 - 2(\cos\delta x \cdot \cos\delta y)^2 & 0 \\ Kx & Ky & Kz & 1 \end{bmatrix} \cdot \begin{bmatrix} 1 & 0 & 0 & 0 \\ 0 & 1 & 0 & 0 \\ 0 & 0 & 0 & P_z \\ 0 & 0 & 0 & 1 \end{bmatrix}$$

Where $Kx = 2\alpha\sin^2\delta y - (\beta\sin\delta x - \cos\delta x) \cdot \sin 2\delta y$ $Ky = -\alpha\sin\delta x \cdot \sin 2\delta y + (2\beta\sin^2\delta x - \gamma\sin 2\delta x) \cdot \cos^2\delta y$ $Kz = \alpha\cos\delta x \cdot \sin 2\delta y - (\beta\sin 2\delta x - 2\gamma\cos^2\delta x) \cdot \cos^2\delta y$ $\delta x = \theta yz = \tan^{-1}(\cos \theta y / \cos \theta z)$ $\delta y = \theta xz = \tan^{-1}[\cos \theta x / \sqrt{(\cos^2 \theta y + \cos^2 \theta z)}]$ Also in the case of the plane symmetry, the source video signal $V_2$ and video signal $V_6$ to be handled are two-dimensional video data. Therefore, a parameter of the symmetric transformation matrix $T_{3g}$ for computing z-axis-directional data from the symmetry transformation matrix $T_{3g}$ shown in the expression (98) is not practically used. Therefore, a three-row three-column transformation matrix $T_{3g(33)}$ excluding the parameter of the third column and third row for computing z-axis-directional data from the symmetry transformation matrix $T_{3g}$ shown in the expression (98) is used for the operation of a read address.

Moreover, in the case of the plane symmetry, image transformation is performed in accordance with the read processing from the frame memory 12A similarly to the case of the line symmetry. Therefore, it is necessary to obtain a point on the frame 12A corresponding to a point on the monitor screen 16. Therefore, in fact, the symmetric transformation matrix $T_{3g(33)}$ is not necessary but the inverse matrix $T_{3g(33)}^{-1}$ of the symmetric transformation matrix $T_{3g(33)}$ is necessary.

In this case, by setting the parameters of the symmetric transformation matrix $T_{3g(33)}$ as shown in the following expression (99), the inverse matrix $T_{3g(33)}^{-1}$ of the symmetric transformation matrix $T_{3g(33)}$ is shown by the following expression (100).

$$T_{3g(33)} = \begin{bmatrix} a'_{11} & a'_{12} & a'_{13} \\ a'_{21} & a'_{22} & a'_{23} \\ a'_{31} & a'_{32} & a'_{33} \end{bmatrix} \tag{99}$$

-continued $$T_{3g(33)}^{-1} = \begin{bmatrix} b'_{11} & b'_{12} & b'_{13} \\ b'_{21} & b'_{22} & b'_{23} \\ b'_{31} & b'_{32} & b'_{33} \end{bmatrix} \tag{100}$$

Where $b_{ij} = \dfrac{a_{ji}}{\det(T_{3g(33)})}$

Thus, in the case of the special effect system 10, when plane symmetry is designated by an operator as the symmetric mode of a symmetric image, the CPU 13 obtains the parameters $b_{11}'$ to $b_{33}'$ of the inverse matrix $T_{3g(33)}^{-1}$ in accordance with a designated reference plane and supplies the parameters $b_{11}'$ to $b_{33}'$ to the read address generation circuit 12C. The read address generation circuit 12C calculates the read address $(X_M', Y_M')$ of the frame memory 12A by using the parameters $b_{11}'$ to $b_{33}'$ for the symmetric transformation instead of the parameters $b_{11}$ to $b_{33}$ of the operation expressions shown in the expressions (15) and (16). Thus, by reading the source video signal $V_2$ from the frame memory 12A in accordance with the read address $(X_M', Y_M')$, the special effect system 10 can obtain this video signal $V_6$ of a symmetric image plane-symmetric to a main image.

(3-5-1) Plane symmetry of plane parallel with z-axis

Figure 35:
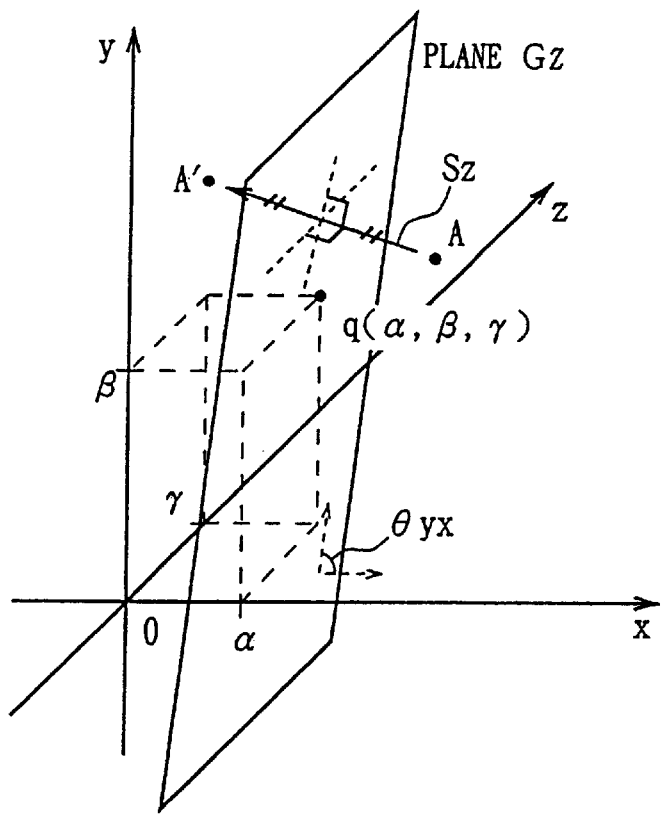
FIG. 35 is a schematic diagram for explaining plane-symmetric transformation based on a plane parallel with z-axis.
Figure 38:
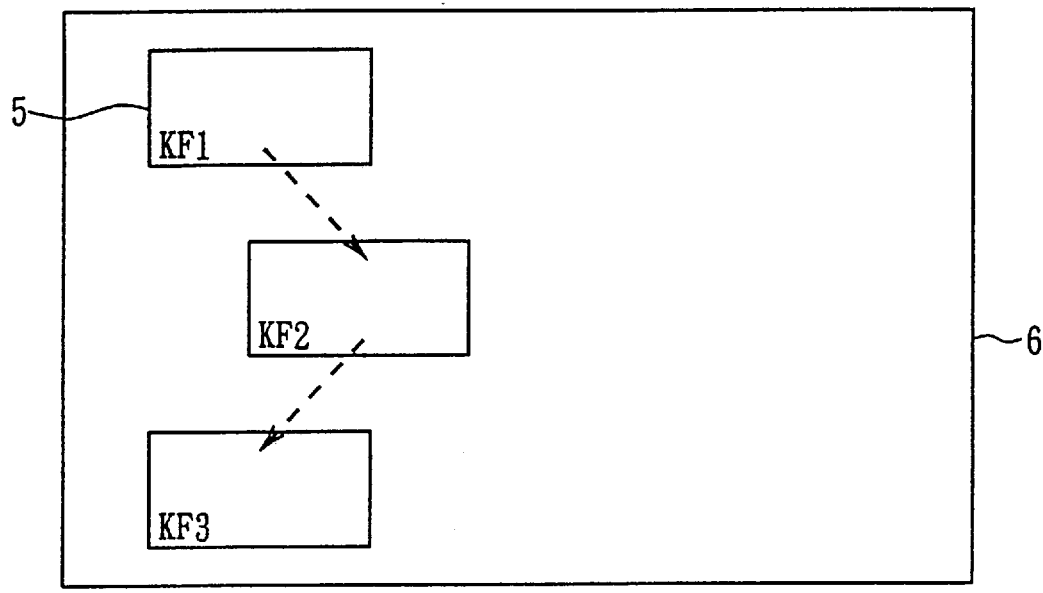
FIG. 38 is a screen diagram for explaining a case of continuously moving a main image in accordance with key frames.
Figure 40:
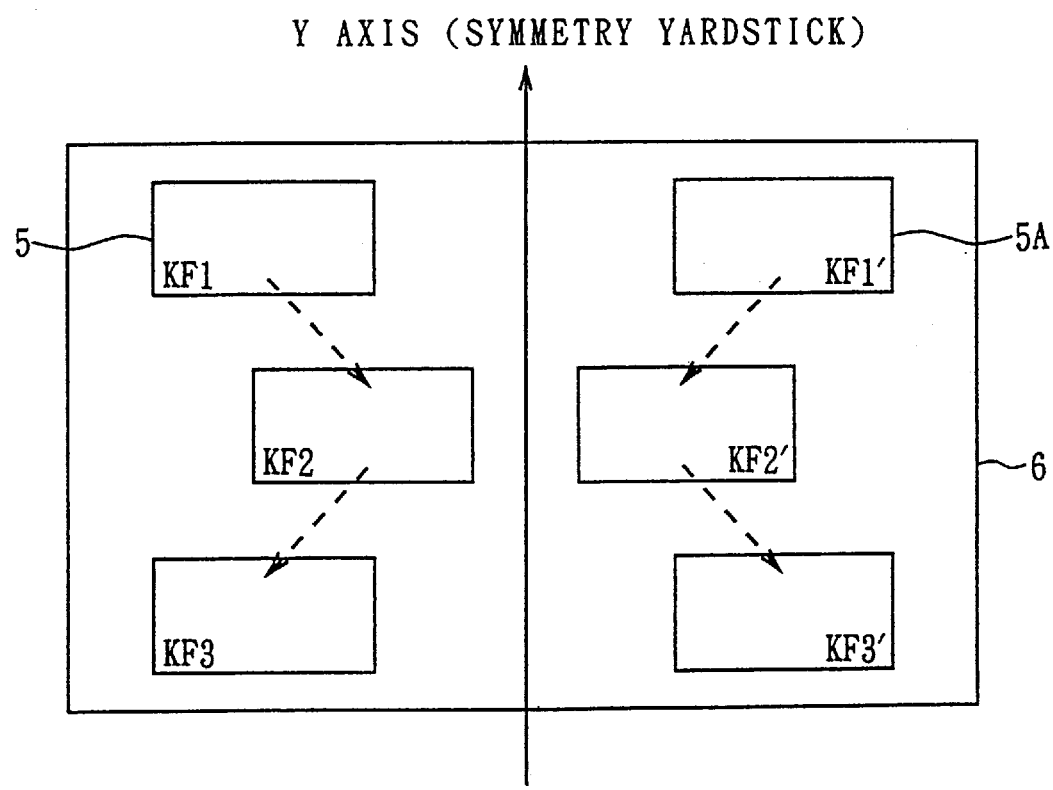
FIG. 40 is a screen diagram for explaining a case of moving a main image and a symmetric image symmetrically to y-axis.

As shown in FIG. 35, A plane-symmetric transformation matrix Sz of a plane Gz passing through a point q ($\alpha$, $\beta$, $\gamma$) and parallel with z-axis can be easily obtained by assuming that a three-dimensional coordinate system is projected on a plane z=y and considering the system as line symmetry on the plane z=y. That is, when assuming each angle formed between the plane Gz and the xz plane as $\theta yx$, the transformation matrix Sz is shown by the following expression (101) by extending the line-symmetric transformation matrix S1 shown by the expression (67) to a three-dimensional space.

$$Sz = Lq^{-1} \cdot R(-\theta yx) \cdot Sx \cdot R(\theta yx) \cdot Lq \tag{101}$$

$$= \begin{bmatrix} 1 & 0 & 0 & 0 \\ 0 & 1 & 0 & 0 \\ 0 & 0 & 1 & 0 \\ -\alpha & -\beta & -\gamma & 1 \end{bmatrix} \cdot \begin{bmatrix} \cos(-\theta yx) & \sin(-\theta yx) & 0 & 0 \\ -\sin(-\theta yx) & \cos(-\theta yx) & 0 & 0 \\ 0 & 0 & 1 & 0 \\ 0 & 0 & 0 & 1 \end{bmatrix} \cdot$$

$$\begin{bmatrix} 1 & 0 & 0 & 0 \\ 0 & -1 & 0 & 0 \\ 0 & 0 & 1 & 0 \\ 0 & 0 & 0 & 1 \end{bmatrix} \cdot \begin{bmatrix} \cos(\theta yx) & \sin(\theta yx) & 0 & 0 \\ -\sin(\theta yx) & \cos(\theta yx) & 0 & 0 \\ 0 & 0 & 1 & 0 \\ 0 & 0 & 0 & 1 \end{bmatrix} \cdot$$

$$\begin{bmatrix} 1 & 0 & 0 & 0 \\ 0 & 1 & 0 & 0 \\ 0 & 0 & 1 & 0 \\ \alpha & \beta & \gamma & 1 \end{bmatrix}$$

$$= \begin{bmatrix} \cos(2\theta yx) & \sin(2\theta yx) & 0 & 0 \\ \sin(2\theta yx) & -\cos(2\theta yx) & 0 & 0 \\ 0 & 0 & 1 & 0 \\ K\alpha & K\beta & 2\gamma & 1 \end{bmatrix}$$

Where $K\alpha = \alpha \cdot (1-\cos(2\theta yx)) - \beta \cdot \sin(2\theta yx)$ $K\beta = -\alpha \cdot \sin(2\theta yx) + \beta \cdot (1+\cos(2\eta yx))$ Therefore, a symmetric transformation matrix $T_{3gz}$ for obtaining a symmetric image from the source video signal $V_2$ is shown by the following expression (102) by combining the transformation matrix T (comprising $T_0$ and $P_0$) for three-dimensional image transformation with the symmetric transformation matrix Sz.

$$T_{3gz} = T_0 \cdot Sz \cdot P_0 \qquad (102)$$

$$= \begin{bmatrix} r_{11} & r_{12} & r_{13} & 0 \\ r_{21} & r_{22} & r_{23} & 0 \\ r_{31} & r_{32} & r_{33} & 0 \\ l_x & l_y & l_z & s \end{bmatrix} \cdot$$

$$\begin{bmatrix} \cos(2\theta yx) & \sin(2\theta yx) & 0 & 0 \\ \sin(2\theta yx) & -\cos(2\theta yx) & 0 & 0 \\ 0 & 0 & 1 & 0 \\ K\alpha & K\beta & 2\gamma & 1 \end{bmatrix} \begin{bmatrix} 1 & 0 & 0 & 0 \\ 0 & 1 & 0 & 0 \\ 0 & 0 & 0 & P_z \\ 0 & 0 & 0 & 1 \end{bmatrix}$$

Where $K\alpha = \alpha \cdot (1-\cos(2\theta yx)) - \beta \cdot \sin(2\theta yx)$ $K\beta = -\alpha \cdot \sin(2\theta yx) + \beta \cdot (1+\cos(2\theta yx))$ Thus, it is possible to generate a symmetric image using a plane parallel with z-axis as a reference plane in the CPU 13 by obtaining the parameters $b_{11}'$ to $b_{33}'$ of the inverse matrix $T_{3gz(33)}^{-1}$ of the transformation matrix $T_{3gz(33)}$ excluding the third column and third row of the symmetric transformation matrix $T_{3gz}$ and supplying the parameters $b_{11}'$ to $b_{33}'$ to the read address generation circuit 12C similarly to the case of the above plane symmetry.

(4) Effect file

In this section, an effect file is described in which parameters for image transformation input through the control panel, 14 are entered.

The parameters input through the control panel 14 include a parameter related to a special effect and a parameter for specifying a symmetry yardstick. When these parameters are input, the special effect system 10 forms an effect file according to a predetermined format in a RAM 17 to enter the parameters input to the effect file. The effect file is a data file into which data groups for specifying the processing contents of the image transformation to be applied to the source video signal $V_1$ or $V_2$.

FIG. 36 shows the format of an effect file. The structure of the effect file is roughly divided into two types of areas. One is a key frame data area for entering parameters related to a special effect and the other is a symmetric mode area for entering the data for specifying a symmetry yardstick. The key frame data area is divided into areas for entering size data, position data, and rotation data. Parameters for a special effect input through the control panel 14 are respectively entered in their corresponding area.

In other words, the parameters for a special effect input through the control panel 14 include size data, position data, and rotation data. In this case, the size data represents the data for specifying the size of a main image and for specifying the enlargement or reduction processing in the image transformation to be applied to the main image. Moreover, the position data represents the data for specifying a position on the monitor screen 16 where a main image is displayed and for specifying the translation processing in the image transformation to be applied to the main image. Furthermore, the rotation data represents the data for specifying the rotation processing in the image transformation to be applied to a main image.

When parameters for these special effects are entered in an effect file, the CPU 13 computes parameters $r_{11}$ to $r_{33}$, $l_x$, $l_y$, $l_z$, $P_z$ and s of the transformation matrix $T_{33}$ of the image transformation to be applied to a main image in accordance with the size data, position data, and rotation data entered in the effect file, computes the matrix parameters $b_{11}$ to $b_{33}$ of the inverse matrix $T_{33}^{-1}$ of the transformation matrix $T_{33}$ in accordance with the parameters, and supplies the parameters $b_{11}$ to $b_{33}$ to the read address generation, circuit 11C.

Moreover, in the case of the special effect system 10, several symmetric modes to be relatively easily used are previously prepared so that a desired symmetric mode can be selected and specified from the prepared symmetric modes. Therefore, areas for entering the prepared symmetric modes are prepared for the symmetric mode area of an effect file. Therefore, when a symmetric mode is designated by an operator, the start information for starting the designated symmetric mode is entered in a corresponding area. Specifically, when origin symmetry is designated, the start information such as "on" for starting the origin symmetry is entered in an area for origin symmetry and the non-start information such as "off" is entered in not-designated symmetric mode areas. The prepared symmetric modes include origin-symmetric mode, x-axis-symmetric mode, y-axis-symmetric mode, z-axis-symmetric mode, xy-plane-symmetric mode, yz-plane-symmetric mode, and xz-symmetric mode as shown in FIG. 36. In this connection, symmetric transformation matrixes for these symmetric modes are previously calculated and stored in the memory 17.

When the start information such as "on" for starting a symmetric mode is entered in a symmetric mode area, the CPU 13 reads the symmetric transformation matrix Sp, Sq, S1, or Sg of the symmetric mode in which "on" is entered from the memory 17, obtains the matrix parameters $b_{11}'$ to $b_{33}'$ of transformation matrix $T_{2p(33)}^{-1}$, $T_{3p(33)}^{-1}$, $T_{21(33)}^{-1}$, $T_{31(33)}^{-1}$, or $T_{3g(33)}^{-1}$ for obtaining a symmetric image in accordance with the read symmetric transformation matrix Sp, Sq, S1, or Sg and the matrix parameter of the transformation matrix $T_{33}$ obtained from a parameter for a special effect, and supplies the matrix parameters $b_{11}'$ to $b_{33}'$ to the read address generation circuit 11C.

The special effect system 10 has a two-channel structure capable of simultaneously processing a main image and a symmetric image as shown in FIG. 3. Therefore, when receiving special-effect parameters (size data, position data, and rotation data) to be applied to a main image, the parameters are entered in an effect file and simultaneously, an effect file for a symmetric image is also automatically formed and the size data, position data, and rotation data same as those of the main image are entered in the automatically formed effect file. Thereby, to generate a symmetric image, only by entering a symmetric mode in the automatically-generated effect file for a symmetric image, it is possible to easily generate a symmetric image without entering size data, position data, and rotation data by an operator. In this connection, by setting every symmetric mode to "off" in the effect file for a symmetric image, no symmetric image is generated. Even in this case, however, the effect file for a symmetric image is not erased so that a symmetric image can be generated any time.

In the case of the special effect system 10, as shown in FIG. 37, a plurality of data groups (hereafter referred to as key frames) specifying the above image processing contents can be entered in ones effect file and thereby, an image whose shapes and/or positions are successively changed can be generated in accordance with the entered key frames. For example, by entering three key frames KF1, KF2, and KF3 in which only position data is different in a main-image effect file as shown in FIG. 37, it is possible to obtain an image 6 in which a main image 5 successively continuously moves from the position specified by the key frame KF1 to the position specified by the key frame KF2 and then, successively continuously moves from the position specified by the key frame KF2 to the position specified by the key frame KF3.

Thus, also by entering a plurality of key frames in the main-image effect file, a symmetric-image effect file having the same key frames is automatically generated as described above. That is, by entering three key frames KF1, KF2, and KF3 in a main-image effect file as shown in FIG. 37, a symmetric-image effect file having key frames KF1', KF2', and KF3' having the same data contents as those of the key frames KF1, KF2, and KF3 is automatically generated as shown in FIG. 39. Therefore, it is possible to easily obtain an image in which a symmetric image successively moves on symmetric positions in accordance with the movement of a main image only by entering the symmetry yardstick of the image in an effect file. For example, by entering a y-axis-symmetric mode in a symmetric-image effect file so as to be "on" as shown in FIG. 39, it is possible to easily obtain an image 6 in which a symmetric image 5A successively continuously moves on y-axis-symmetric positions of a main image 5 in accordance with the movement of the main image 5.

In this connection, the CPU 13 calculates size data, position data, and rotation data to be continuously changed in accordance with the data of the key frames KF1, KF2, and KF3 for the spaces between the key frames KF1 and KF2 and the space between the key frames KF2 and KF3 and calculates a transformation matrix for image transformation in accordance with the calculated size data, position data, and rotation data. Thereby, an operator only needs to enter a key frame only for a key point portion for deforming and/or moving an image and therefor, he can easily obtain a continuously-changing image without entering every key frame related to deformation and/or movement of the image.

In this section, a case is described in which an origin-symmetric mode, x-axis-symmetric mode, y-axis-symmetric mode, z-axis-symmetric mode, xy-plane-symmetric mode, yz-plane-symmetric mode, and xz-plane-symmetric mode are prepared as symmetric modes and a desired symmetry yardstick is selected out of the symmetric modes and entered. In the case of the special effect system 10, however, it is also possible to obtain a symmetric image by specifying an optional point, line, or plane as a symmetry yardstick.

To specify an optional point, line, or plane as a symmetry yardstick, by inputting a parameter for specifying the point, line, or plane serving as the symmetry yardstick, the parameter is entered in an effect file. Therefore, the CPU 13 reads the parameter from the effect file and computes the inverse matrix parameters $b_{11}'$ to $b_{33}'$ of a symmetric transformation matrix. Thereby, only by inputting a parameter for specifying an optional point, line, or plane, it is possible to easily obtain a symmetric image using the optional point, line, or plane as a symmetry yardstick.

(5) Description of operations and advantages of special effect system

In the case of the special effect system 10 having the above structure, to apply three-dimensional image transformation, that is, a special effect to the input source video signal $V_1$, an operator inputs desired special-effect parameters (size data, position data, and rotation data) through the control panel 14. The CPU 13 of the special effect system 10 enters the special-effect parameters in an effect file to compute the matrix parameters $b_{11}$ to $b_{33}$ of the transformation matrix $T_{33}^{-1}$ for image transformation in accordance with the special-effect parameters and supplies the parameters $b_{11}$ to $b_{33}$ to the read address generation circuit 11C of the image processing section 11.

The read address generation circuit 11C generates the read address $(X_M, Y_M)$ for applying a designated special effect to the source video signal $V_1$ in accordance with the matrix parameters $b_{11}$ to $b_{33}$ and the screen address $(X_S, Y_S)$ supplied from the screen address generation circuit 18 and supplies the read address $(X_M, Y_M)$ to the frame memory 11A of the first image processing section 11.

The frame memory 11A successively stores the input source video signal $V_1$ in internal storage areas and applies three-dimensional image transformation to the source video signal $V_1$ by reading video data from a storage area designated by the read address $(X_M, Y_M)$ and outputting the data, and thereby generates the video signal $V_3$ of a main image to which a special effect designated by an operator is applied. The video signal $V_3$ of the main image is interpolated through the interpolation circuit 11D and thereafter, output to the mixer 20 as the video signal $V_4$.

To generate a symmetric image point-, line-, or plane-symmetric to a main image from the source Video signal $V_2$, an operator inputs the data for specifying a symmetry yardstick through the control panel 14. The CPU 13 calculates the symmetric transformation matrixes Sp, Sq, S1, or Sg in accordance with the data for specifying the symmetry yardstick and the matrix parameter of the transformation matrix $T_{33}$ of three-dimensional image transformation, computes the matrix parameters $b_{11}'$ to $b_{33}'$ of the inverse matrix $T_{2p(33)}^{-1}$, $T_{3p(33)}^{-1}$, $T_{21(33)}^{-1}$, $T_{31(33)}^{-1}$, or $T_{3g(33)}^{-1}$ of the symmetric transformation matrix, and supplies the matrix parameters $b_{11}'$ to $b_{33}'$ to the read address generation circuit 12C of the second image processing section 12.

The read address generation circuit 12C generates the read address $(X_M', Y_M')$ for generating a designated symmetric image in accordance with the matrix parameters $b_{11}'$ to $b_{33}'$ the screen address (Xs, Yx) supplied from the screen address generation circuit 18 and supplies the read address $(X_M', Y_M')$ to the frame memory 12A of the second image processing section 12.

The frame memory 12A successively stores the input source video signal $V_2$ in its internal storage areas, applies symmetric image transformation to the source video signal $V_2$ by reading video data from the storage area specified by the read address $(X_M', Y_M')$ and outputting it, and thereby generates the video signal $V_5$ of a symmetric image for a main image based on the point, line, or plane designated by an operator. The symmetric-image video signal $V_5$ is interpolated through the interpolation circuit 12D and thereafter, output to the mixer 20 as the video signal $V_6$.

The mixer 20 mixes the main-image video signal $V_4$ with the symmetric-image video signal $V_6$ to generate a mixed video signal $V_{MIX}$ and the mixer 21 mixes the mixed video signal $V_{MIX}$ with a background video signal $V_{BK}$. Thereby, a video signal $V_{OUT}$ comprising a main image and a symmetric image point-, line-, or plane-symmetric to the main image is generated.

Thus, in the case of the special effect system 10, a symmetric image point-, line-, or plane-symmetric to a main image to which three-dimensional image transformation is applied can be generated only by designating a point, line, or plane serving as the symmetry yardstick of the symmetric image without calculating and inputting a symmetric position by an operator as ever. Moreover, it is possible to generate a more accurate symmetric image because an accurate symmetric position can be calculated in accordance with a designated point, line, or plane compared to the conventional case of designating a symmetric position by eye measure while viewing a screen by using an input unit such as a track ball, joy stick, or mouse.

Furthermore, in the case of the special effect system 10, even when entering a plurality of key frames to continuously move an image, the effect file of a symmetric image having key frames for a main image is automatically generated by entering the key frames respectively in an effect file. Therefore, only by entering a symmetry yardstick in the effect file of the symmetric image, it is possible to easily obtain a symmetric image successively continuously moving on symmetric positions in accordance with the movement of the main image and moreover easily obtain the symmetric image without designating a symmetric position each time as ever.

According to the above structure, the matrix parameters $b_{11}'$ to $b_{33}'$ for symmetric image transformation are computed in accordance with a point, line, or plane serving as a designated symmetry yardstick and made to work on the read address $(X_M', Y_M')$ from the frame memory 12A and generate a symmetric image. Therefore, it is possible to easily generate an accurate symmetric image only by designating a point, line, or plane serving as a symmetry yardstick and generate an accurate symmetric image without requesting an operator to perform troublesome operations.

In the above description, a case is described in which an origin-symmetric mode, x-axis-symmetric mode, y-axis-symmetric mode, z-axis-symmetric mode, xy-plane-symmetric mode, yz-plane-symmetric mode, and xz-plane-symmetric mode are prepared as symmetric modes to be relatively easily used. However, it is also possible to use symmetric modes other than the above modes as the prepared symmetric modes. In short, by preparing symmetric modes to be relatively easily used and storing the symmetric transformation matrixes of the symmetric modes in a memory, an operator can easily obtain a symmetric image only by selecting the prepared symmetric modes.

Moreover, when preparing the symmetric modes to be relatively easily used, it is possible to easily designate a desired symmetric mode by providing exclusive keys for specifying the symmetric modes such as an origin-symmetric mode key, x-axis-symmetric mode key, y-axis-symmetric mode key, z-axis-symmetric mode key, xy-plane-symmetric mode key, yz-plane-symmetric mode key, and xz-plane-symmetric mode key for the control panel 14.

Furthermore, in the case of the above description, a case is described in which the first source video signal $V_1$ is input to the first image processing section 11 and the second source video signal $V_2$ different from the first source video signal $V_1$ is input to the second image processing section 12. However, it is also possible to input the same source video signal to the first and second image processing sections 11 and 12. Thus, it is possible to obtain a complete symmetric image including image contents. For example, by inputting the same source video signal and designating the y-axis-symmetric mode, it is possible to obtain a symmetric image seemingly reflected by a mirror.

INDUSTRIAL APPLICABILITY

The present invention can be used to generate a television broadcasting signal to which a special effect is applied in a broadcasting station.

What is claimed is:

1. A special effect system for applying image transformation to an input source video signal, comprising:
   first image processing means for generating the video signal of a main image by performing an image transformation on an input first source video signal in accordance with a first image transformation matrix; and
   second image processing means for generating the video signal of a symmetric image point-symmetric, line-symmetric, or plane-symmetric to said main image by receiving a second source video signal which is the same as or different from said first source video signal and performing an image transformation on said second source video in accordance with a transformation matrix obtained by combining the image transformation matrix used to generate said main image with a symmetric image transformation matrix for a point, line, or plane specified as a symmetry yardstick.

2. A special effect system for applying image transformation to an input source video signal, comprising:
   control means for computing a first matrix parameter for image transformation in accordance with a specified special-effect parameter and computing a second matrix parameter for obtaining a point-symmetric, line-symmetric, or plane-symmetric image in accordance with said special effect parameter and the specified point, line, or plane serving as a symmetry yardstick;
   first read address generation means for receiving said first matrix parameter and generating a first read address for image transformation in accordance with said first matrix parameter;
   second read address generation means for receiving said second matrix parameter and generating a second read address for obtaining a point-symmetric, line-symmetric, or plane-symmetric image in accordance with said second matrix parameter;
   first memory means for successively storing an input first source video signal in its internal storage areas and successively reading said first source video signal from a storage area specified by said first read address and thereby, applying image transformation specified by said special effect parameter to said first source video signal to generate the video signal of a main image; and
   second memory means for receiving a second source video signal same as or different from said first source video signal, successively storing said second source video signal in its internal storage areas and successively reading said second source video signal from a storage area specified by said second read address, and thereby generating the video signal of a symmetric image point-symmetric, line-symmetric, or plane-symmetric to said main image.

3. The special effect system according to claim 2, wherein said control means, when the point, line, or plane prepared as said symmetry yardstick is specified, reads a symmetric transformation matrix corresponding to said specified symmetry yardstick from third memory means and computes said second matrix parameter in accordance with said symmetric transformation matrix.

4. The special effect system according to claim 2, wherein said control means computes said first matrix parameter in accordance with said special effect parameter entered in the effect file of a main image and computes said second matrix parameter in accordance with said special effect parameter entered in the effect file of a symmetric image and said symmetry yardstick.

5. The special effect system according to claim 4, wherein said control means, when entering said special effect parameter in the effect file of said main image, forms a symmetric-image effect file having said special effect parameter in accordance with the effect file of said main image and, when said symmetry yardstick is specified, enters said specified symmetry yardstick in the effect file of said symmetric image.

6. The special effect system according to claim 4, wherein said control means, when a plurality of said special effect parameters are entered in the effect file of said main image, computes said first matrix parameter in which positions and/or shapes of said main image are continuously changed in accordance with said entered special-effect parameters.

7. The special effect system according to claim 4, wherein said control means, when a plurality of said special effect parameters are entered in the effect file of said symmetric image,. computes said second matrix parameter in which positions and/or shapes of said symmetric image are continuously changed in accordance with said entered special effect parameters and said symmetry yardstick.

8. An image processing method comprising the steps of:
performing an image transformation on a first input source video signal in accordance with a first image transformation matrix, thereby generating the video signal of a main image; and
performing an image transformation on a second source video signal which is the same as or different than said first source video signal, in accordance with a transformation matrix obtained by combining the image transformation matrix used to generate said main image with a symmetric image transformation matrix for a point, line, or plane specified as a symmetry yardstick, thereby generating the video signal of a symmetric image point-symmetric, line-symmetric, or plane-symmetric to said main image.

9. A symmetric image generation method for generating a symmetric image point-symmetric, line-symmetric, or plane-symmetric to a main image generated by applying image transformation to a video signal, comprising the step of:
applying image transformation to an input source video signal in accordance with a transformation matrix obtained by combining the image transformation matrix used to generate said main image with a symmetric transformation matrix for the point, line, or plane specified as a symmetry yardstick and thereby, generating a symmetric image point-symmetric, line-symmetric, or plane-symmetric to said main image.

10. Image processing apparatus for processing first and second video signals, the apparatus comprising:
first processing means for performing a first video transformation on said first video signal in accordance with a first transformation matrix to generate a first transformed video signal, wherein said first transformation matrix comprises a three-dimensional transformation matrix having specified three-dimensional effect parameters;
second processing means for performing a second video transformation on said second video signal in accordance with a second transformation matrix to generate a second transformed video signal, wherein said second transformation matrix comprises said three-dimensional transformation matrix and a symmetric transformation matrix having symmetric parameters; and
generating means for generating said three-dimensional effect parameters and said symmetric parameters so that said second transformed video signal represents a symmetric image to an image of said first transformed video signal.

11. Image processing method for processing first and second video signals, comprising the steps of:
performing a first video transformation on said first video signal in accordance with a first transformation matrix to generate a first transformed video signal, wherein said first transformation matrix comprises a three-dimensional transformation matrix having specified three-dimensional effect parameters;
performing a second video transformation on said second video signal in accordance with a second transformation matrix to generate a second transformed video signal, wherein said second transformation matrix comprises said three-dimensional transformation matrix and a symmetric transformation matrix having symmetric parameters; and
generating said three-dimensional effect parameters and said symmetric parameters so that said second transformed video signal represents a symmetric image to an image of said first transformed video signal.

12. Video effect apparatus for generating a video effect on first video and second video signals to generate a processed video signal, the apparatus comprising:
means for performing a first video transformation on said first video signal in accordance with a three-dimensional transformation matrix to generate a first transformed video signal;
means for performing said first video transformation on a first key signal corresponding to said first video signal in accordance with said three-dimensional transformation matrix to generate a first transformed key signal;
means for performing a second video transformation on said second video signal in accordance with said three-dimensional transformation matrix and a symmetric transformation matrix to generate a second transformed video signal;
means for performing a second video transformation on a second key signal corresponding to said second video signal in accordance with said three-dimensional transformation matrix and said symmetric transformation matrix to generate a second transformed key signal; and
means for combining said first and second transformed video signals by using said first and second transformed key signals to generate said processed video signal.

13. A method for generating a video effect on first and second video signals to generate a processed video signal, comprising the steps of:

performing a first video transformation on said first video signal in accordance with a three-dimensional transformation matrix to generate a first transformed video signal;

performing said first video transformation on a first key signal corresponding to said first video signal in accordance with said three-dimensional transformation matrix to generate a first transformed key signal;

performing a second video transformation on said second video signal in accordance with said three-dimensional transformation matrix and a symmetric transformation matrix to generate a second transformed video signal;

performing a second video transformation on a second key signal corresponding to said second video signal in accordance with said three-dimensional transformation matrix and said symmetric transformation matrix to generate a second transformed key signal; and combining said first and second transformed video signals by using said first and second transformed key signals to generate said processed video signal.

* * * * *